United States Patent
Karni et al.

(10) Patent No.: US 11,780,583 B2
(45) Date of Patent: Oct. 10, 2023

(54) SYSTEMS AND METHODS FOR ASSEMBLING LARGE CARGO AND LOADING IT ONTO A CARGO AIRCRAFT

(71) Applicant: ZSM HOLDINGS LLC, Dover, DE (US)

(72) Inventors: Etan D. Karni, Boulder, CO (US); Scott David Rewerts, Summerfield, NC (US); Mark Emil Lundstrom, Boulder, CO (US)

(73) Assignee: ZSM Holdings LLC, Dover, DE (US)

( * ) Notice: Subject to any disclaimer, the term of this patent is extended or adjusted under 35 U.S.C. 154(b) by 0 days.

(21) Appl. No.: 17/850,450

(22) Filed: Jun. 27, 2022

(65) Prior Publication Data

US 2022/0396358 A1 Dec. 15, 2022

Related U.S. Application Data

(63) Continuation of application No. 17/465,786, filed on Sep. 2, 2021, now Pat. No. 11,370,545, which is a (Continued)

(51) Int. Cl.
*B64C 1/22* (2006.01)
*B64D 9/00* (2006.01)

(52) U.S. Cl.
CPC ............... *B64D 9/003* (2013.01); *B64C 1/22* (2013.01)

(58) Field of Classification Search
CPC .... B64D 9/003; B64D 9/00; B64D 2009/006; B64C 1/1415; B64C 1/22
See application file for complete search history.

(56) References Cited

U.S. PATENT DOCUMENTS 2,134,260 A 10/1938 Nickerson
2,998,948 A 9/1961 Sisk
(Continued)

FOREIGN PATENT DOCUMENTS

EP 0196923 B1 1/1989
EP 2907750 A1 8/2015

OTHER PUBLICATIONS

International Search Report and Written Opinion for Application No. PCT/US20/49787, dated Nov. 30, 2020 (20 pages)**.
(Continued)

*Primary Examiner* — Justin M Benedik
(74) *Attorney, Agent, or Firm* — Barnes & Thornburg LLP

(57) ABSTRACT

Methods and systems for efficiently loading cargo transports, such as cargo aircraft, are described. The methods and systems rely upon payload profiles for various payloads where the payloads include repeatable payloads that have the same characteristics. Based on the payload profile, the payload is positioned at a designated location in an interior cargo bay of the cargo transport. The designated location is denoted by one or more pre-formed markings in the interior cargo bay that establish where a payload having the respective payload profile should be positioned in the bay. The payload can then be secured in the bay. Because the designated location accounts for centers of gravity, the payload can be loaded and secured in the bay without having to run various calculations each time a payload is loaded. Systems and methods related to how the payloads are packaged in an efficient, expeditious manner are also provided.

58 Claims, 36 Drawing Sheets

Related U.S. Application Data continuation of application No. PCT/US2021/021795, filed on Mar. 10, 2021.

(56) References Cited

U.S. PATENT DOCUMENTS

| | | | |
|---|---|---|---|
| 3,374,972 A | 3/1968 | Webb, Sr. | |
| 8,121,786 B2 | 2/2012 | Morbey et al. | |
| 8,398,022 B2* | 3/2013 | Cazals | B64D 27/20 244/119 |
| 11,148,780 B2* | 10/2021 | Oonnoonny | B64C 1/069 |
| 2004/0200930 A1 | 10/2004 | Bays-Muchmore et al. | |
| 2007/0025832 A1* | 2/2007 | Rawdon | B64D 9/00 414/401 |
| 2009/0173824 A1 | 7/2009 | Perez-Sanchez | |
| 2010/0252682 A1* | 10/2010 | Pahl | B64C 1/22 244/129.5 |
| 2014/0246112 A1* | 9/2014 | Flynn | F16L 21/035 138/155 |
| 2014/0248112 A1 | 9/2014 | Ruijter et al. | |
| 2015/0183519 A1 | 7/2015 | Llamas Sandin | |
| 2015/0225082 A1* | 8/2015 | Levron | B64D 9/00 244/137.1 |
| 2015/0321596 A1* | 11/2015 | Randall | B60P 3/40 410/44 |
| 2016/0311512 A1 | 10/2016 | Sankrithi | |
| 2016/0369768 A1* | 12/2016 | Van Der Zee | F03D 13/40 |
| 2017/0349263 A1* | 12/2017 | Lopez | B64F 1/322 |
| 2018/0194548 A1* | 7/2018 | Helou, Jr. | B64C 1/22 |
| 2018/0273176 A1* | 9/2018 | Paunicka | B64D 5/00 |
| 2018/0346121 A1* | 12/2018 | Corbett | B64D 9/00 |
| 2020/0122835 A1* | 4/2020 | Daw Perez | B64C 1/20 |
| 2020/0207475 A1 | 7/2020 | Dobberfuhl et al. | |
| 2021/0132625 A1* | 5/2021 | Gillett | G05D 1/101 |

OTHER PUBLICATIONS

International Search Report and Written Opinion for Application No. PCT/US2021/021792, dated May 20, 2021 (12 Pages)**.

International Search Report and Written Opinion for Application No. PCT/US2021/021795, dated May 28, 2021 (21 pages)**.

No Author Listed. "747-400/-400ER Freighters" StartupBoeing. May 2010.**.

No Author Listed. "Wide-Body Air Freight Returns to the U.S." Air & Surface Logistics. Jul. 3, 2014. <url: https://airandsurface.com/wide-body-air-freight/>**.

"No Author Listed. Antonov Airlines Brochure. Jul. 2019. [online] retrieved from <URL: https://www.antonov-airiines.com/wp-content/uploads/2019/07/Antonov-Airlines-brochure.pdf>"**.

No Author Listed. C-130J Super Hercules Brochure, Lockheed Martin. **.

No Author Listed. DHC-4 A Caribou Brochure, The De Havilland Canada. Nov. 1962.**.

No Author Listed. Piasecki H-21 Helicopter, Wikipedia. Website. Accessed Oct. 29, 2021. url: <https://en.wikipedia.org/wiki/Piasecki_H-21 >**.

* cited by examiner

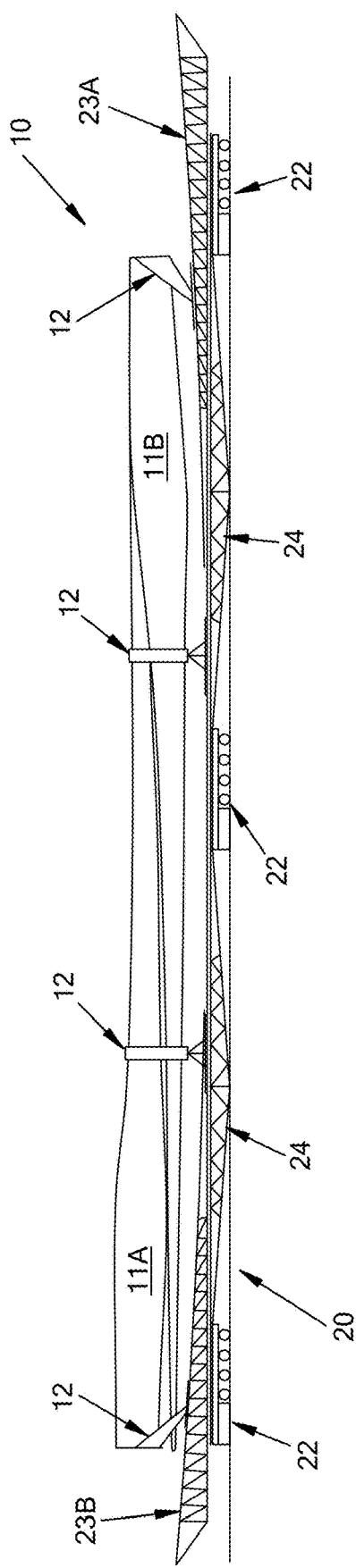
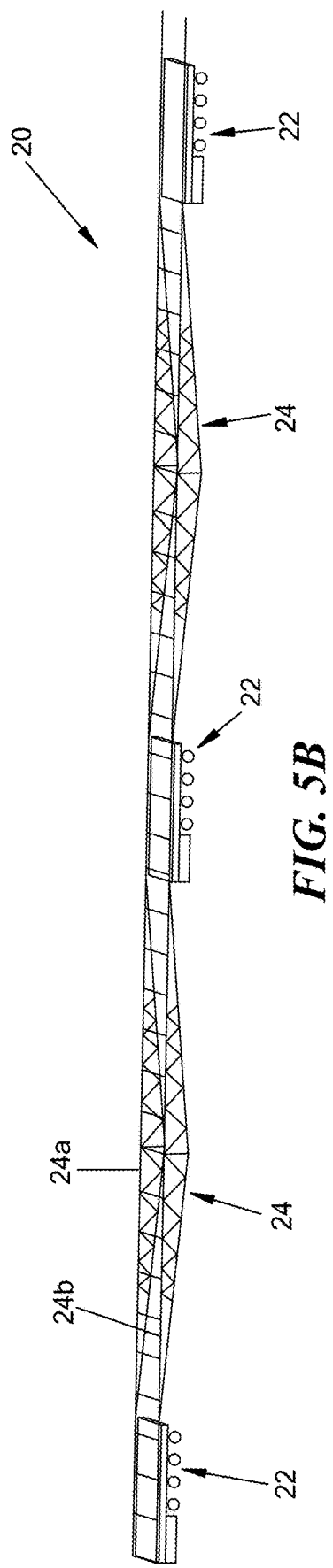

| Cargo Type | (2) XYZ Inc. 95-WRA, -WRB | (2) XYZ Inc. 95-WRC, -WRD | (2) XYZ Inc. 95-WRE, -WRF |
|---|---|---|---|
| Net Weight | 123,456 lbs | 123,345 lbs | 123,567 lbs |
| Loaded CG | FS2575 in. | FS2580 in. | FS2575 in. |
| Style | Style A | Load at Aircraft Datum | |
| Forward Root Fixture | Style A | FS700 in. | |
| Forward Mid Fixture | Style FM1 | FS2000 in. | |
| Aft Mid Fixture | Style AM5 | FS3000 in. | |
| Aft Fixture | Style Z | FS4400 in. | |

*FIG. 11*

| Cargo Type | (2) XYZ Inc. 95-WRA, -WRB | (2) XYZ Inc. 95-WRC, -WRD | (2) XYZ Inc. 95-WRE, -WRF |
|---|---|---|---|
| Net Weight 1002 | 123,456 lbs | 123,345 lbs | 123,567 lbs |
| Loaded CG 1004 | FS2575 in. | FS25780 in. | FS2575 in. |
| | Fixture Style | Load at Upper Blade Datum | Load at Lower Blade Datum |
| Forward Root Fixture 1050 | Style A | STA 0020 in. | STA 3033 in. |
| Forward Mid Fixture 1060 | Style FM1 | STA 1000 in. | STA 2220 in. |
| Aft Mid Fixture 1070 | Style AM5 | STA 2220 in. | STA 1000 in. |
| Aft Fixture 1080 | Style Z | STA 3033 in. | STA 0020 in. |

FIG. 12C

SYSTEMS AND METHODS FOR ASSEMBLING LARGE CARGO AND LOADING IT ONTO A CARGO AIRCRAFT

CROSS-REFERENCE TO RELATED APPLICATIONS

The present application is a continuation of and claims priority to U.S. patent application Ser. No. 17/465,786, filed Sep. 2, 2021, which is a U.S. national stage filing from International Application Number PCT/US2021/021795, filed Mar. 10, 2021, the contents of each which is hereby incorporated by reference in its entirety.

FIELD

The present disclosure relates to methods and systems designed to expedite the process of loading a payload onto a cargo transport, such as a cargo aircraft, and more particularly utilizes techniques prior to assembling the large cargo, such as pre-formed markings within a cargo bay of the transport and/or pre-formed markings associated with the payload, to expedite that process based on a profile of the payload.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites become viable both onshore and offshore. These sites may be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

When making deliveries of the wind turbine components to sites, because of the size of the components that are used (e.g., towers and blades), hundreds of trips are needed just to deliver the large components. Because the entire process of delivering these large components to a site is costly and fraught with complications, once a workable process for delivery is established, it is best to optimize the process to allow for more deliveries in a short time period, thus reducing costs and complications. For example, as recent developments have made the possibility of transporting wind turbine components to sites via air transport, it is desirable to optimize the processes associated with the delivery of the wind turbine components via air transport. If the total number of trips can be reduced and/or the number of trips made during a designated time period (e.g., trips per day) can be reduced, costs and/or complications associated with the component transport can likewise be reduced.

While optimization is desirable, current techniques, and associated systems, for loading cargo onto an aircraft do not appear to be developed with efficiency in mind. When loading cargo onto an aircraft, aspects including the size of the cargo, and perhaps more importantly, the center of gravity (CG) of the cargo, must be monitored and managed. This management is of the cargo itself, and with respect to other CGs, such as the CG of the vehicle in which it is being transported. Failure to properly manage CG can cause either or both of the payload and/or vehicles to undesirably flip or rotate and become damaged, or just more generally cause problems with trying to manage stability and controllability of the vehicle and/or the payload. Wind turbine blades and other complex and/or large structures are particularly difficult to manage because of their complex geometries and constructions resulting in the CG of the blade, or package of blades, not being at a geometric centroid of the blade, or package of multiple blades.

Presently processes for loading aircrafts include taking measurements and inputting relevant loading data can calculating on a per-flight basis relevant parameters that must be acceptable to allow for safe flight. Loads can be shifted to properly balance and weight the aircraft prior to takeoff. On passenger planes, one will recognize this may involve moving passengers to different locations on the plane prior to takeoff; on cargo aircrafts, this may involve moving the cargo to different locations and/or adding weight at locations within the cargo bay to achieve acceptable CG placement. In small aircraft, this may involve moving ballast such as packs of bottled water near a forward or aft portion of the aircraft to adjust the CG; for larger aircraft, other forms of ballasting may be used. However, in all of these instances, the ballasting is done in a reactive, case-by-case manner, resulting in tedious, time-consuming processes that hinder the ability to expedite cargo transport.

Accordingly, there is a need for methods and systems that can be employed to expedite the process for loading a cargo aircraft, allowing for more flights to occur in a shorter time frame than is presently possible using known cargo loading techniques.

SUMMARY

The methods and systems provided for herein relate both to ways of expediting the preassembly or packaging of the cargo or payload to be transported, and ways of expediting the actual loading process. Coordination is provided regarding the payload to be transported and the vehicle doing the transport (e.g., a cargo aircraft) to optimize the amount of time it takes to load the transport vehicle. Payloads are planned and can be repetitive over a number of missions/flights such that the pre-planned payload can be assembled prior to the aircraft arriving. As a result, the pre-planned payload can be loaded once the aircraft is opened and load-ready—without having to make measurements for CG onboard or the like. In coordination with the pre-planned payload, the aircraft can include designated locations for positioning the pre-planned payload within an interior cargo bay of the aircraft. The locations may be set-off, for example, by one or more pre-formed markings. The cargo bay can include different markings and designated locations for different payloads, thus providing for a versatile space that in which many different types, sizes, and configurations of payloads can be transported.

One embodiment of a method of loading a payload onto a cargo aircraft provided includes determining a payload profile of a payload, and positioning the payload at a designated location in an interior cargo bay defined by a fuselage of a cargo aircraft based on the determined payload profile. The designated location is identified by one or more pre-formed markings in the interior cargo bay. The method also includes securing the payload at the designated location.

The one or more pre-formed markings can include a plurality of pre-designated payload markings. The plurality of pre-designated payload markings can include at least one pre-formed marking for each type of payload that the interior cargo bay is configured to receive. In some embodiments, the one or more pre-formed markings can include a plurality of measuring marks formed along a length of the interior cargo bay. The measuring marks can denote specific locations along the length of the interior cargo bay for placement of the payload at the designated location.

Various techniques for loading the payload can be utilized. For example, the payload can be passed through an opening formed in a forward end of the cargo aircraft. Such an opening can be formed due to, for example, a cargo nose door being opened with respect to a main section of the fuselage. The action of positioning the payload at a designated location in an interior cargo bay based on the payload profile can include sliding the payload along one or more rails disposed in the interior cargo bay to reach the designated location. The one or more rails can extend from a forward end to an aft end of the cargo aircraft. In some such embodiments, at least one rail of the one or more rails can include a kinked portion such that a vertical distance between at least a portion of the at least one rail aft of the kinked portion and a plane defined by an interior bottom contact surface of the interior cargo bay in the forward end of the cargo aircraft that is substantially parallel to a centerline of the forward end of the cargo aircraft is greater than a vertical distance between at least a portion of the at least one rail forward of the kinked portion and the plane defined by the interior bottom contact surface of the interior cargo bay in the forward end of the cargo aircraft. As a result, the sliding action can include sliding the payload along at least a portion of the at least one rail that is aft of the kinked portion. At least one rail of the one or more rails can extend continuously along an interior bottom contact surface of the interior cargo bay from the forward end of the cargo aircraft to the aft end of the cargo aircraft. In such embodiments, the action of sliding can further include sliding the payload along at least a portion of the at least one rail that is disposed in the aft end of the cargo aircraft. In some embodiments, the at least one rail of the one or more rails can serve as a primary structural beam of the cargo aircraft.

The payload profile used in conjunction with the present disclosures can include at least one, two, three, or more of the following, in any combination: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload. The method can further include coupling a plurality of payload-receiving fixtures to the payload based on the payload profile. This can include, for example, positioning at least one payload-receiving fixture of the plurality of payload-receiving fixtures at a designated receiving location of the payload, with the designated receiving location being identified by one or more pre-formed markings on the payload. In some such embodiments, the method can further include selecting each payload-receiving fixture of the plurality of payload-receiving fixtures that is coupled to the payload based on a pre-designation for that payload-receiving fixture. The pre-designation can designate a type of payload with which each payload-receiving fixture is configured to be used and/or one or more locations along the payload that the respective payload-receiving fixture is configured to be used. The payload can include various configurations that depend on at least one of dimensions of the payload, shape of the payload, or the payload profile.

In instances in which the payload comprises a package that includes one or more blades of one or more wind turbines, the payload profile can include at least one, two, three, or more of the following, in any combination: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package. The method can further include coupling a plurality of payload-receiving fixtures to the one or more blades based on the payload profile. This can include, for example, positioning at least one payload-receiving fixture of the plurality of payload-receiving fixtures at a designated receiving location of the one or more blades, with the designated receiving location being identified by one or more pre-formed markings on the one or more blades. In some such embodiments, the method can further include selecting each payload-receiving fixture of the plurality of payload-receiving fixtures that is coupled to each blade of the one or more blades based on a pre-designation for that payload-receiving fixture. The pre-designation can designate a type of package in which each payload-receiving fixture is configured to be used and/or one or more locations along each blade of the one or more blades that the respective payload-receiving fixture is configured to be used. The type of package can include various configurations of the one or more blades that depend on at least one of dimensions of the one or more blades, shape of the one or more blades, or the payload profile.

In embodiments that include a package with a wind turbine blade(s), the package can include at least one wind turbine blade, at least two wind turbine blades, at least three wind turbine blades, at least four wind turbine blades, or even more. The lengths of the blade(s) can be at least about 57 meters, at least about 65 meters, at least about 75 meters, at least about 85 meters, at least about 100 meters, or at least about 120 meters, among other possible lengths.

The action of determining a payload profile can include scanning and/or sensing an indicator of the payload to yield the payload profile of the payload. The indicator can include, for example: (1) a unique code associated with the payload, a portion of the payload, or one or more payload-receiving fixtures associated with the payload; and/or (2) a parameter of the payload, or a portion of the payload, that is unique to the payload, or the portion of the payload. In some embodiments, at least one of the actions of positioning the payload at a designated location in an interior cargo bay defined by a fuselage of a cargo aircraft based on the determined payload profile or securing the payload at the designated location can be automated to occur in response to the indicator.

In some embodiments, the method can include applying one or more ballasts to the payload in view of the determined payload profile prior to loading the payload onto the cargo aircraft. This can include, for example, applying or otherwise associating the ballast to one or more payload-receiving fixtures. In some such embodiments, the method can further include weighing and/or balancing the payload. The action of applying or otherwise associating the ballast(s) to the payload can occur in view of at least one of the weight, balance, and/or center of gravity of the payload.

The method can include repeating one or more of the above-identified actions for a single cargo aircraft that makes multiple flights to a same location such that the payload can be positioned and secured at the designated location in the interior cargo bay consistently for the multiple flights. The multiple flights can occur, for example, in a 24-hour day. The flights can be at least two, at least three, at least four, or possibly even more in the 24-hour day.

The actions of positioning the payload at a designated location in an interior cargo bay defined by a fuselage of a cargo aircraft based on the payload profile and securing the payload at the designated location occurs can occur without making an independent determination of the center of gravity of the payload due to the known payload profile.

A method of preparing a payload for transport by a transport vehicle of the present disclosure includes determining a payload profile of a payload and associating a plurality of payload-receiving fixtures with the payload based on the determined payload profile. The method further includes securing the payload with respect to the plurality of payload-receiving fixtures.

The action of associating a plurality of payload-receiving fixtures with the payload based on the determined payload profile can include positioning at least one payload-receiving fixture of the plurality of payload-receiving fixtures at a designated receiving location of the payload. The designated receiving location can be identified by one or more pre-formed markings on the payload. The method can further include selecting each payload-receiving fixture of the plurality of payload-receiving fixtures that are associated with the payload based on a pre-designation for that payload-receiving fixture. The pre-designation can designate a type of payload with which each payload-receiving fixture is configured to be used and/or one or more locations along the payload that the respective payload-receiving fixture is configured to be used. The payload can include various configurations that depend on at least one of dimensions of the payload, shape of the payload, or the payload profile.

The payload profile used in conjunction with the present disclosures can include at least one, two, three, or more of the following, in any combination: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of a transport vehicle are to use in conjunction with loading the payload onto the transport vehicle. The transport vehicle can be a cargo aircraft, among other possible transport vehicles.

In instances in which the payload comprises a package that includes one or more blades of one or more wind turbines, the method can further include selecting each payload-receiving fixture of the plurality of payload-receiving fixtures that is coupled to each blade of the one or more blades based on a pre-designation for that payload-receiving fixture. The pre-designation can designate a type of package in which each payload-receiving fixture is configured to be used and/or one or more locations along each blade of the one or more blades that the respective payload-receiving fixture is configured to be used. The type of package can include various configurations of the one or more blades that depend on at least one of dimensions of the one or more blades, shape of the one or more blades, or the payload profile. Further, in instances in which the payload comprises a package that includes one or more blades of one or more wind turbines, the payload profile can include at least one, two, three, or more of the following, in any combination: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of a transport vehicle to use in conjunction with loading the payload onto the transport vehicle.

In embodiments that include a package with a wind turbine blade(s), the package can include at least one wind turbine blade, at least two wind turbine blades, at least three wind turbine blades, at least four wind turbine blades, or even more. The lengths of the blade(s) can be at least about 57 meters, at least about 65 meters, at least about 75 meters, at least about 85 meters, at least about 100 meters, or at least about 120 meters, among other possible lengths.

The action of determining a payload profile can include scanning and/or sensing an indicator of the payload to yield the payload profile of the payload. The indicator can include, for example: (1) a unique code associated with the payload, a portion of the payload, or one or more payload-receiving fixtures associated with the payload; or (2) a parameter of the payload, or a portion of the payload, that is unique to the payload, or the portion of the payload. In some embodiments, at least one of the actions of associating a plurality of payload-receiving fixtures with the payload based on the determined payload profile or securing the payload with respect to the plurality of payload-receiving fixtures can be automated to occur in response to the indicator.

In some embodiments, the method can include applying one or more ballasts to the payload in view of the determined payload profile. This can include, for example, applying or otherwise associating the ballast to one or more payload-receiving fixtures. In some such embodiments, the method can further include weighing and/or balancing the payload. The action of applying or otherwise associating the ballast(s) to the payload can occur in view of at least one of the weight, balance, and/or center of gravity of the payload.

The method can include repeating one or more of the above-identified actions for a single cargo aircraft that makes multiple flights to a same location such that the each respective payload can be associated with and secured with respect to the same, or akin, pluralities of payload-receiving fixtures consistently for the multiple flights. The multiple flights can occur, for example, in a 24-hour day. The flights can be at least two, at least three, at least four, or possibly even more in the 24-hour day.

The actions of associating a plurality of payload-receiving fixtures with the payload based on the determined payload profile, securing the payload with respect to the plurality of payload-receiving fixtures occurs, and subsequent loading of the payload onto a cargo aircraft can occur without making an independent determination of the center of gravity of the payload due to the known payload profile.

A cargo aircraft provided for includes a fuselage that defines a forward end, an aft end, and an interior cargo bay that spans a majority of a length of the fuselage from the forward end to the aft end. The aircraft also includes one or more pre-formed markings formed in the interior cargo bay. The one or more pre-formed markings are located such that the one or more pre-formed markings designate a desired location at which a particular payload is to be secured for flight. The desired location is dependent on a payload profile of the particular payload.

The one or more pre-formed markings can include a series of one or more pre-formed markings. Each member of the series of one or more pre-formed markings can include at least one pre-formed marking for a designated payload that the interior cargo bay is configured to receive. Further, each member of the series of one or more pre-formed markings can be based on a respective payload profile of the payload associated with that series member. In some embodiments, the one or more pre-formed markings can be configured to allow for similarly configured payloads to be loaded in the interior cargo bay based on the one or more pre-formed markings. As a result, loading of the similarly configured payloads can occur without having to make a center of gravity measurement in conjunction with loading the respective payload in the interior cargo bay.

The one or more pre-formed markings can include a plurality of measuring marks formed along a length of the interior cargo bay. The measuring marks can denote specific locations along the length of the interior cargo bay for placement of a payload.

The cargo aircraft can include one or more rails disposed in the interior cargo bay. The rail(s) can extend from the forward end to the aft end of the cargo aircraft and can be configured to receive the payload such that the payload can be moved along the one or more rails to dispose it the desired location within the cargo bay. In some such embodiments, at least one rail of the one or more rails can include a kinked portion such that a vertical distance between at least a portion of the at least one rail aft of the kinked portion and a plane defined by an interior bottom contact surface of the interior cargo bay in the forward end of the cargo aircraft that is substantially parallel to a centerline of the forward end of the cargo aircraft is greater than a vertical distance between at least a portion of the at least one rail forward of the kinked portion and the plane defined by the interior bottom contact surface of the interior cargo bay in the forward end of the cargo aircraft. At least one rail of the one or more rails can extend continuously along an interior bottom contact surface of the cargo bay from the forward end of the cargo aircraft to the aft end of the cargo aircraft. In some embodiments, at least one rail of the one or more rails can further serve as a primary structural beam of the cargo aircraft.

The cargo aircraft can include a cargo nose door. The cargo nose door can be configured to open a portion of the forward end of the cargo aircraft to load the payload into the cargo bay through an opening exposed by opening the cargo nose door.

The interior cargo bay of the cargo aircraft can include a forward bay portion located in the forward end of the cargo aircraft, an aft bay portion located in the aft end of the cargo aircraft, and a kinked bay portion disposed between the forward bay portion and the aft bay portion. The kinked bay portion can define a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft.

The payload profile used in conjunction with the present disclosures can include at least one, two, three, or more of the following, in any combination: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload. The interior cargo bay can be configured to have a payload disposed in it that has a length of at least about 57 meters, at least about 65 meters, at least about 75 meters, at least about 85 meters, at least about 100 meters, or at least about 120 meters, among other possible lengths.

In instances in which the interior cargo bay is configured to have a package that includes one or more blades of a wind turbine disposed in it, the payload profile can include at least one, two, three, or more of the following, in any combination: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package.

A provided system for loading a payload onto a cargo transport includes a series of one or more pre-formed markings formed in an interior cargo bay of a cargo transport. Each member of the series of one or more pre-formed markings includes at least one pre-formed marking for a designated payload that the interior cargo bay is configured to receive. Further, each member of the series of one or more pre-formed markings is based on a respective payload profile of a payload associated with that series member. The one or more pre-formed markings are located such that the one or more pre-formed markings designate a desired location at which a particular payload is to be secured for transport. The desired location is dependent on a payload profile of the particular payload. The system also includes a payload pre-designation list. The pre-designation list is configured to identify the respective member of the series of one or more pre-formed markings that corresponds to the designated payload. This allows the designated payload to be loaded onto the cargo transport using the respective member of the series of one or more pre-formed markings.

In at least some embodiments, the one or more pre-formed markings can be configured to allow for similarly configured payloads to be loaded in the interior cargo bay based on the one or more pre-formed markings such that loading of the similarly configured payloads is able to occur without having to make a center of gravity measurement in conjunction with loading the respective payload in the interior cargo bay.

The one or more pre-formed markings can include a plurality of measuring marks formed along a length of the interior cargo bay. The measuring marks can denote specific locations along the length of the interior cargo bay for placement of a payload.

The system can also include a plurality of payload-receiving fixtures configured to receive at least portions of the particular payload. In some such embodiments, the system can further include a fixture pre-designation list that is configured to identify a type of payload with which each payload-receiving fixture of the plurality of payload-receiving fixtures is configured to be used and/or one or more locations along the payload that the respective payload-receiving fixture is configured to be used. This can allow for a desired payload-receiving fixture of the plurality of payload-receiving fixtures to be coupled to the payload and/or a desired payload-receiving fixture to be disposed with respect to the payload at one or more designated locations along the payload. The system can further include one or more designated receiving locations identified by way of one or more preformed markings on the payload. The one or more designated receiving locations can correspond to the one or more locations along the payload that the respective payload-receiving fixture is configured to be used.

In some embodiments, the system can include one or more ballasts. The ballast(s) can be configured to mount to at least one payload-receiving fixture of the plurality of payload-receiving fixtures and/or another component of a payload. In some such embodiments, the at least one payload-receiving fixture of the plurality of payload-receiving fixtures can include a carriage configured to receive the ballast(s).

The system can also include one or more rails disposed in the interior cargo bay. The rail(s) can extend from the forward end to the aft end of the cargo transport. Further, the rail(s) can be configured to receive the payload such that the payload can be moved along the rail(s) to dispose it at the desired location within the cargo bay. At least one rail of the one or more rails can include a kinked portion such that a vertical distance between at least a portion of the at least one rail aft of the kinked portion and a plane defined by an interior bottom contact surface of the interior cargo bay in the forward end of the cargo transport that is substantially parallel to a centerline of the forward end of the cargo transport is greater than a vertical distance between at least a portion of the at least one rail forward of the kinked portion and the plane defined by the interior bottom contact surface of the interior cargo bay in the forward end of the cargo transport. In at least some embodiments, at least one rail of the one or more rails can extend continuously along an interior bottom contact surface of the cargo bay from the forward end of the cargo transport to the aft end of the cargo transport. In some embodiments, at least one rail of the one or more rails can further serve as a primary structural beam of the cargo transport.

The payload profile used in conjunction with the present disclosures can include at least one, two, three, or more of the following, in any combination: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload. In embodiments in which the payload comprises a package that includes one or more blades of one or more wind turbines, the payload profile used in conjunction with the present disclosures can include at least one, two, three, or more of the following, in any combination: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package.

BRIEF DESCRIPTION OF DRAWINGS

This disclosure will be more fully understood from the following detailed description taken in conjunction with the accompanying drawings, in which:

FIG. 5A is a side view of one embodiment of a transportation vehicle having a ground support structure, a forward support structure, and a payload disposed thereon;

FIG. 5B is a perspective view of the transportation vehicle of FIG. 5A;

FIG. 11 is a schematic illustration of one exemplary embodiment of a table that includes a plurality of payload profiles;

FIG. 12C is the schematic illustration of the table of FIG. 11 with additional data provided for therein;

DETAILED DESCRIPTION

Figure 1A:
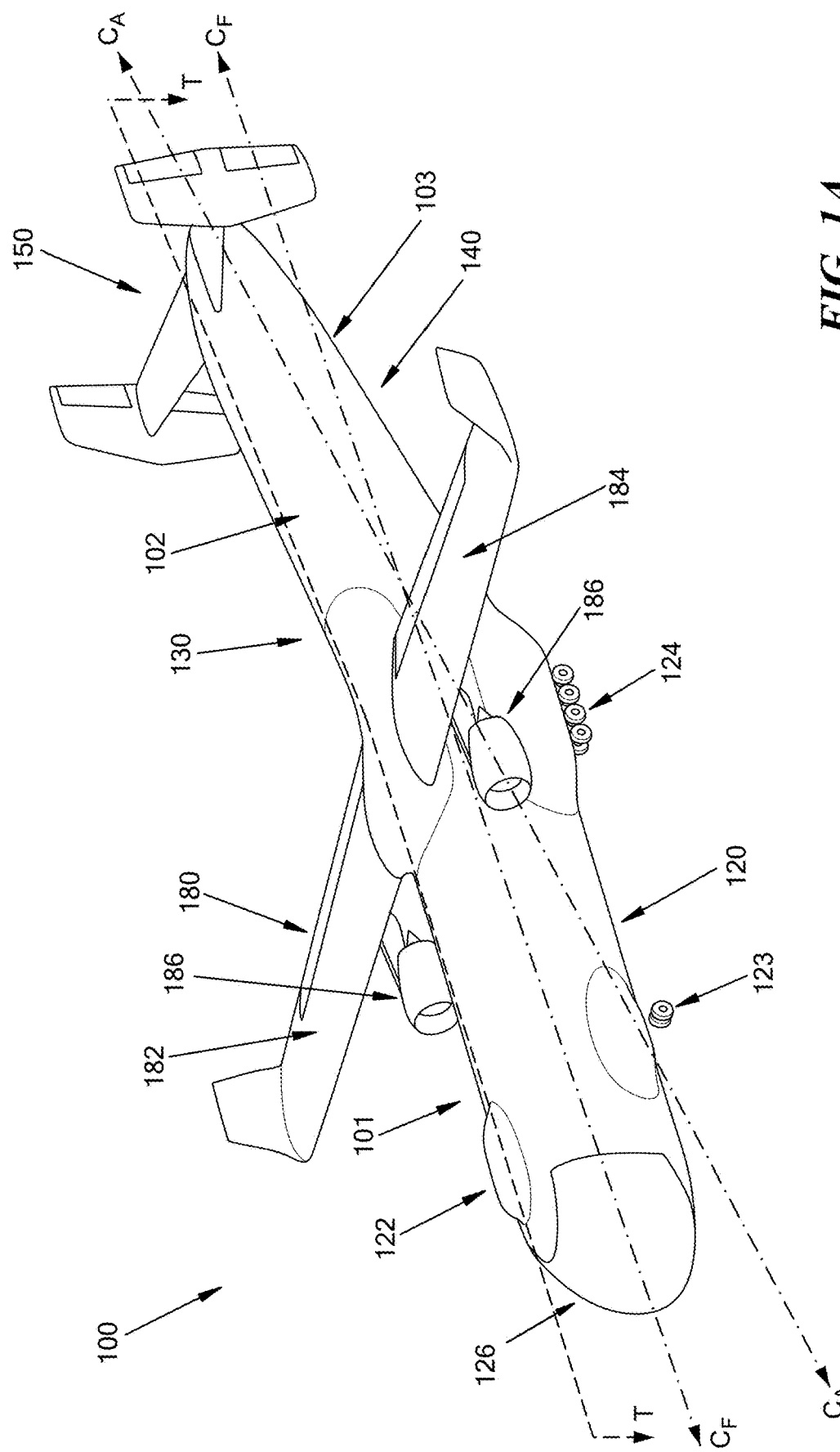
FIG. 1A is an isometric view of one exemplary embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting embodiments and that the scope of the present disclosure is defined solely by the claims. The features illustrated or described in connection with one embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not be to scale or may be somewhat crude renderings of the disclosed components. A person skilled in the art will understand how to implement these teachings and incorporate them into work systems, methods, aircraft, and components related to each of the same, as provided for herein.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward" and "aft," and will give terms of those nature their commonly understood meaning. Further in some instances, terms like forward and proximal or aft and distal may be used in a similar fashion.

The present application is directed to techniques and systems that enable the efficient loading of a cargo aircraft. The techniques and systems are applicable both to the process of preparing a payload for loading onto a cargo aircraft, and to the process of loading the payload onto the aircraft. The aircraft itself can include a plurality of pre-formed markings or indicators within its interior cargo bay to provide guidance as to where the payload should be positioned and/or ultimately secured before flight operations commence, sometime referred to herein as a designated location. These pre-formed markings can be included in the interior cargo bay at a variety of locations (e.g., on a floor, on walls of the interior of the fuselage, on rails, etc.), and they can be indicative of various payloads that are transportable by the cargo aircraft. That is different payloads can have different designated locations, although in at least some instances, different payloads can have similar or the same designated location. By way of non-limiting example, one or more pre-formed markings may indicate a particular location for one type of wind turbine blade package and one or more other pre-formed markings may indicate a different particular location for another type of wind turbine blade package. Such pre-formed markings can likewise indicate locations for other types of cargo besides wind turbine blades (e.g., industrial oil equipment, mining equipment, rockets, military equipment and vehicles, defense hardware, commercial aerospace vehicles, crane segments, aircraft components, space launch rocket boosters, helicopters, generators, or hyperloop tubes). The various pre-formed markings can be considered a series of pre-formed markings. Once the payload is positioned at the designated location, the payload can be secured for transport by the aircraft.

The location of the pre-formed markings, and thus the designated locations, is driven by a payload profile (as described, at least, in the next paragraph, and elsewhere herein). Each payload may have a unique payload profile, but payloads of the same type, i.e., a repeatable payload, such as a combination of the same type of wind turbine blade(s) packaged multiple times, have the same payload profile. Accordingly, once a payload has a designated profile, that profile can be relied upon every time that payload is loaded into the cargo bay. No measurements or load balancing is required; no center of gravity (CG) determinations, weight determinations, load distribution determinations are required. The payload can be loaded onto the aircraft, secured, and the flight can commence. This essentially becomes a "pit crew" situation by which once the aircraft lands, its existing cargo can be removed and the next cargo can be loaded directly onto the aircraft, relying upon the preformed markings to position the payload at the designation location for the next transport. The new payload is secured and another flight can start—the loading of the payload is done quickly, like a pit crew operates in a race car situation.

The payload profile is dependent on the type of payload that is being used. Generally, data or information associated with the payload profile includes one or more of the following, in any combination: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload. More specific to wind turbine blades, sometimes referred to as a package of blades and which constitutes one non-limiting embodiment of a payload with which the present disclosures can be used, the payload profile includes one or more of the following, in any combination: number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package.

Further efficiencies can be realized by relying upon the payload profiles to help drive the process of assembling or packaging the payload prior to flight. Again, much like a "pit crew" situation in which parts that are going to be replaced on a race car are prepped and ready for a fast "change-over" when the race car arrives in the pits, the payloads can be prepped and ready for a fast loading of the aircraft when the aircraft lands or is otherwise moved into a location where it can be loaded. Once it is known what payload is going to be transported, the relevant payload-receiving fixtures to be used with the payload can be used to assemble the payload together based on the payload profile. Further, locations for where those payload-receiving fixtures are placed relative to the payload can also be known. As a result, the payload can be assembled or packaged together so it is ready to "roll" or "slide" (or however the payload package is configured to be moved into the cargo bay) onto the aircraft as quickly as possible. In some instance, packaging the payload can include supplying a ballast to the payload so that the payload has a desirable net center of gravity. The ballasting can be done in conjunction with assembling or packaging the payload prior to flight such that the time-intensive process of determining centers of gravity, weighing, and/or balancing the payload with respect to the cargo aircraft is essentially done ahead of time. The payload profile and/or the pre-formed markings account for ballast and thus allows for the easy loading of the payload without subsequent load balancing or the like.

By providing for these efficiencies, more flights can be achieved in a shorter period of time. This results in valuable cost savings, for example if the aircraft is rented for a period of time and/or personnel are paid on an hourly basis. The more flights that can be achieved in a designated period of time, the better. To better understand the benefits of the loading processes and systems provided for herein, information about some exemplary embodiments of aircraft, payloads, and methods of loading payloads onto aircraft are provided.

Aircraft

The focus of the present disclosures is described with respect to a large aircraft 100, such as an airplane, illustrated in FIGS. 1A-3C, along with the loading of a large payload into the aircraft. Additional details about the aircraft and payload may be described with respect to the other figures of the present disclosure as well. In most illustrated embodiments, a payload 10 is a combination of two wind turbine blades 11A and 11B (FIG. 5A), although a person skilled in the art will appreciate that other payloads are possible (e.g., the payload 10 in FIGS. 11A and 11B can be a single wind turbine blade and include a ballast). Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload—large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 100 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline CA of the aft end 140 of the fuselage 101 with respect to a forward centerline CF of the forward end 120 of the fuselage 101.

Figure 1B:
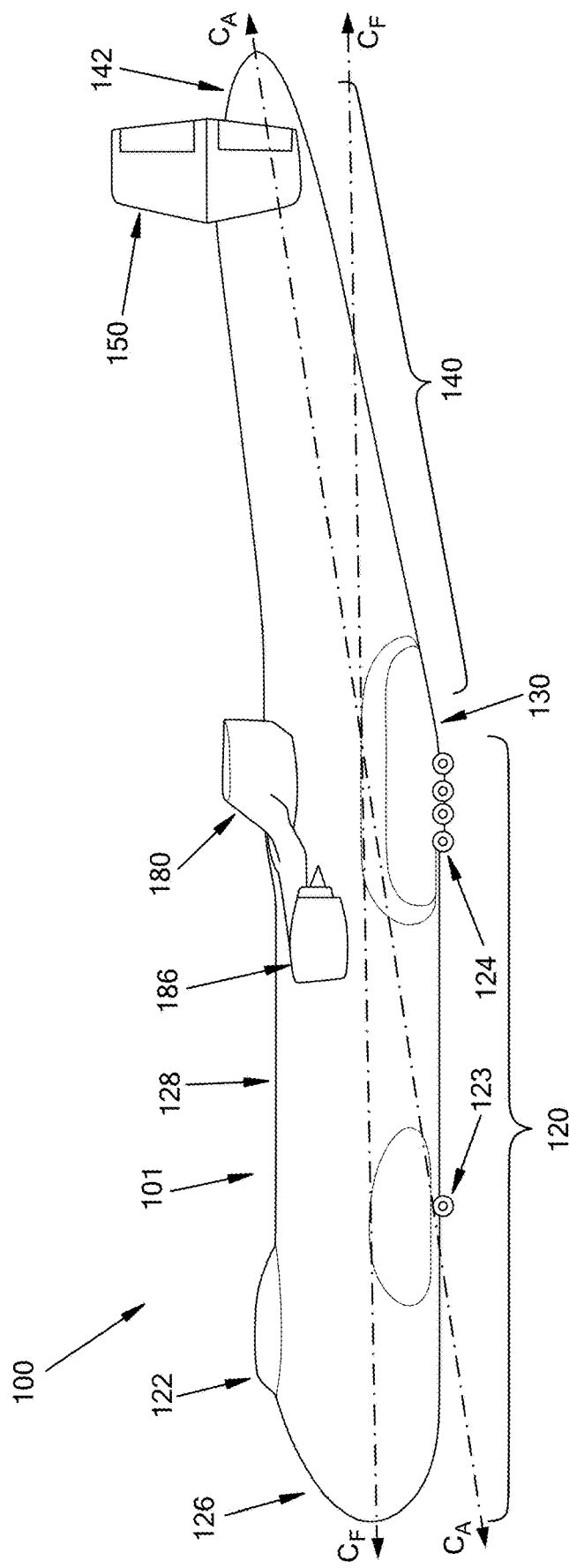
FIG. 1B is a side view of the aircraft of FIG. 1A.
Figure 1C:
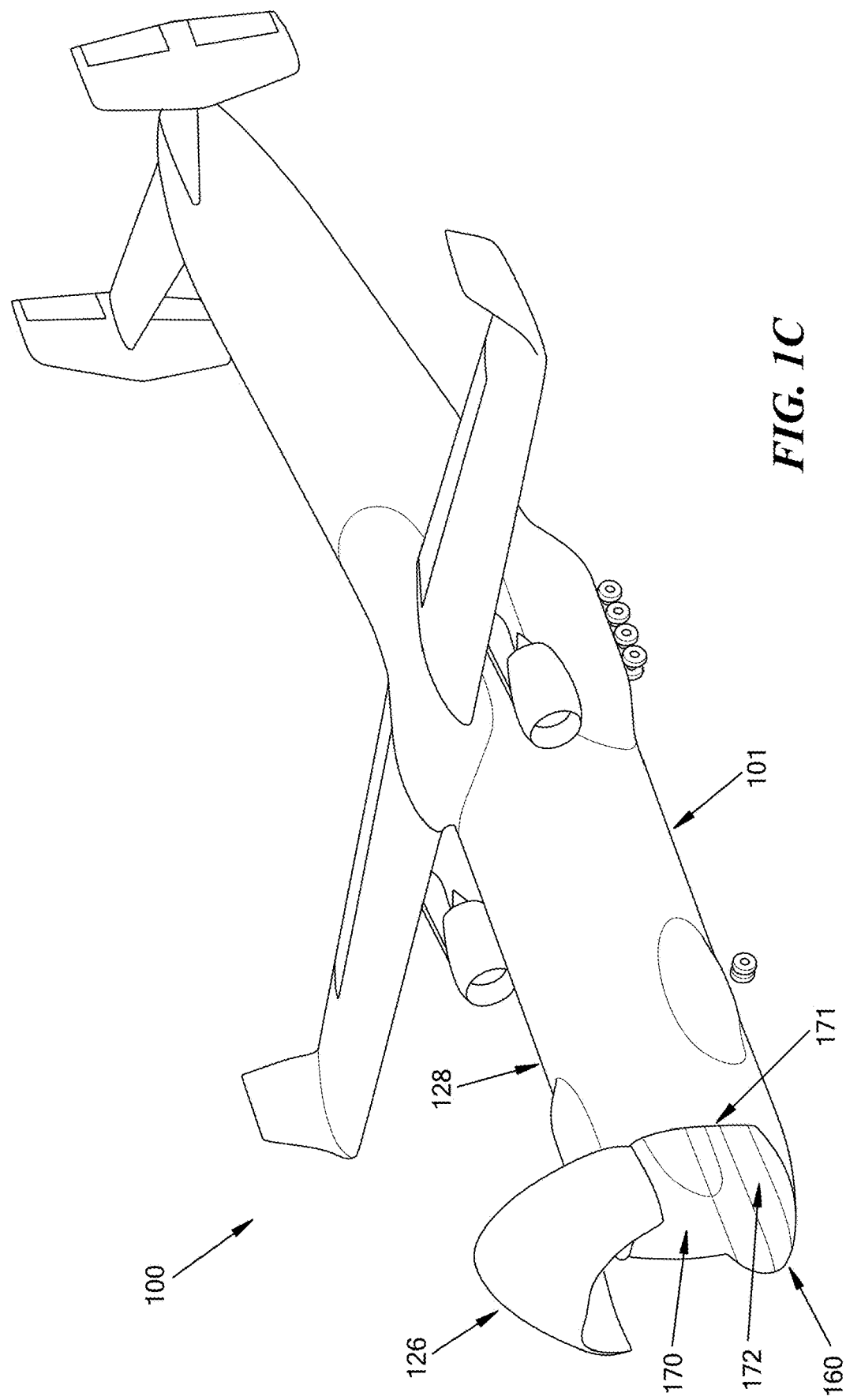
FIG. 1C is an isometric view of the aircraft of FIG. 1A with a nose cone door in an open position to provide access to an interior cargo bay of the aircraft.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 1C, the nose cone 126 is functional as a door, optionally being referred to as the nose cone door, thus allowing access to an interior cargo bay 170 defined by the fuselage 101 via a cargo opening 171 exposed by moving the nose cone door 126 into an open or loading position (the position illustrated in FIG. 1C; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tail cone 142 located at the aft end 140. In the illustrated embodiment of FIG. 1C, the nose cone door 126 is hinged at a top such that it swings clockwise towards the fuselage cockpit 122 and a fixed portion or main section 128 of the fuselage 101. In other embodiments, a nose cone door can swing in other manners, such as being hinged on a left or right side to swing clockwise or counter-clockwise towards the fixed portion 128 of the fuselage. The fixed portion 128 of the forward fuselage 101 is the portion that is not the nose cone 126, and thus the forward fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tail cone 142. While loading through an aft door is possible with the present disclosures, doing so would make loading into and use of the interior cargo bay 170 space in the aft end 140 all the way into the fuselage tail cone 142 much more challenging and difficult to accomplish—a limitation faced in existing cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

Figure 3A:
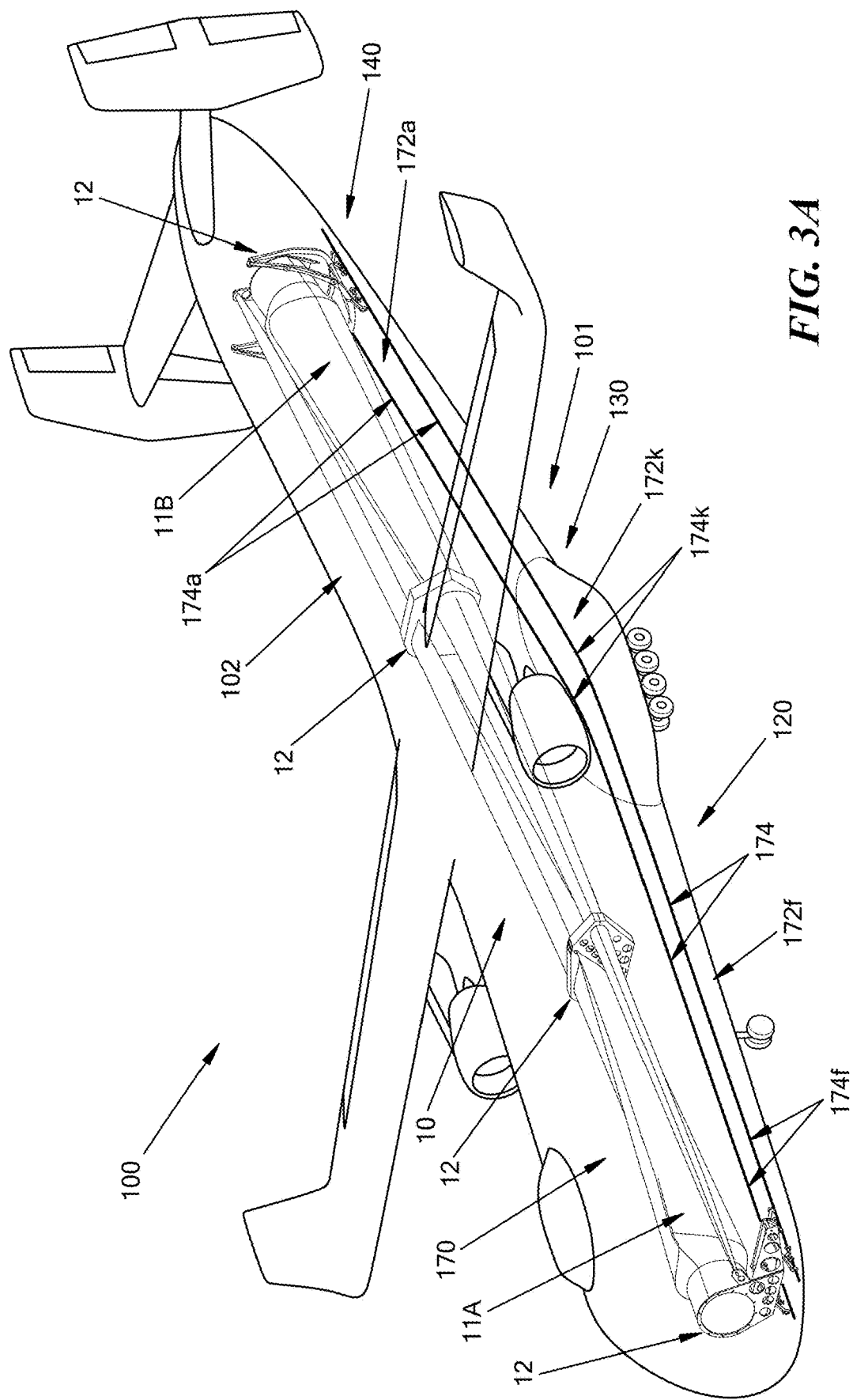
FIG. 3A is an isometric, transparent view of the aircraft of FIG. 1A having a payload disposed therein.
Figure 3B:
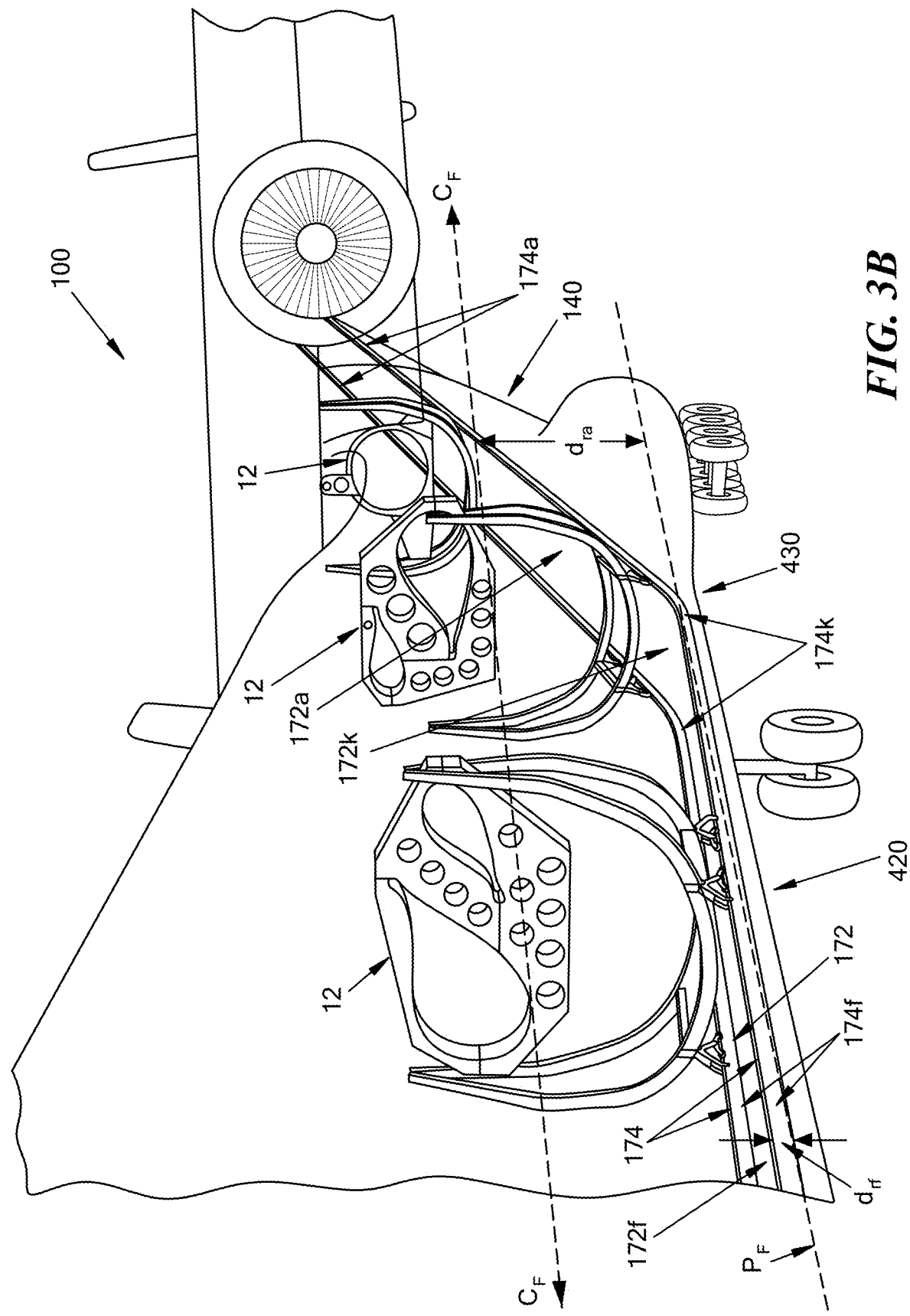
FIG. 3B is a detailed, front-side isometric, transparent view of the aircraft of FIG. 3A with wind turbine blades of the payload hidden from view to better illustrate a pair of rails disposed in the interior cargo bay and exemplary payload-receiving fixtures for holding the wind turbine blades coupled to the rails.
Figure 3C:
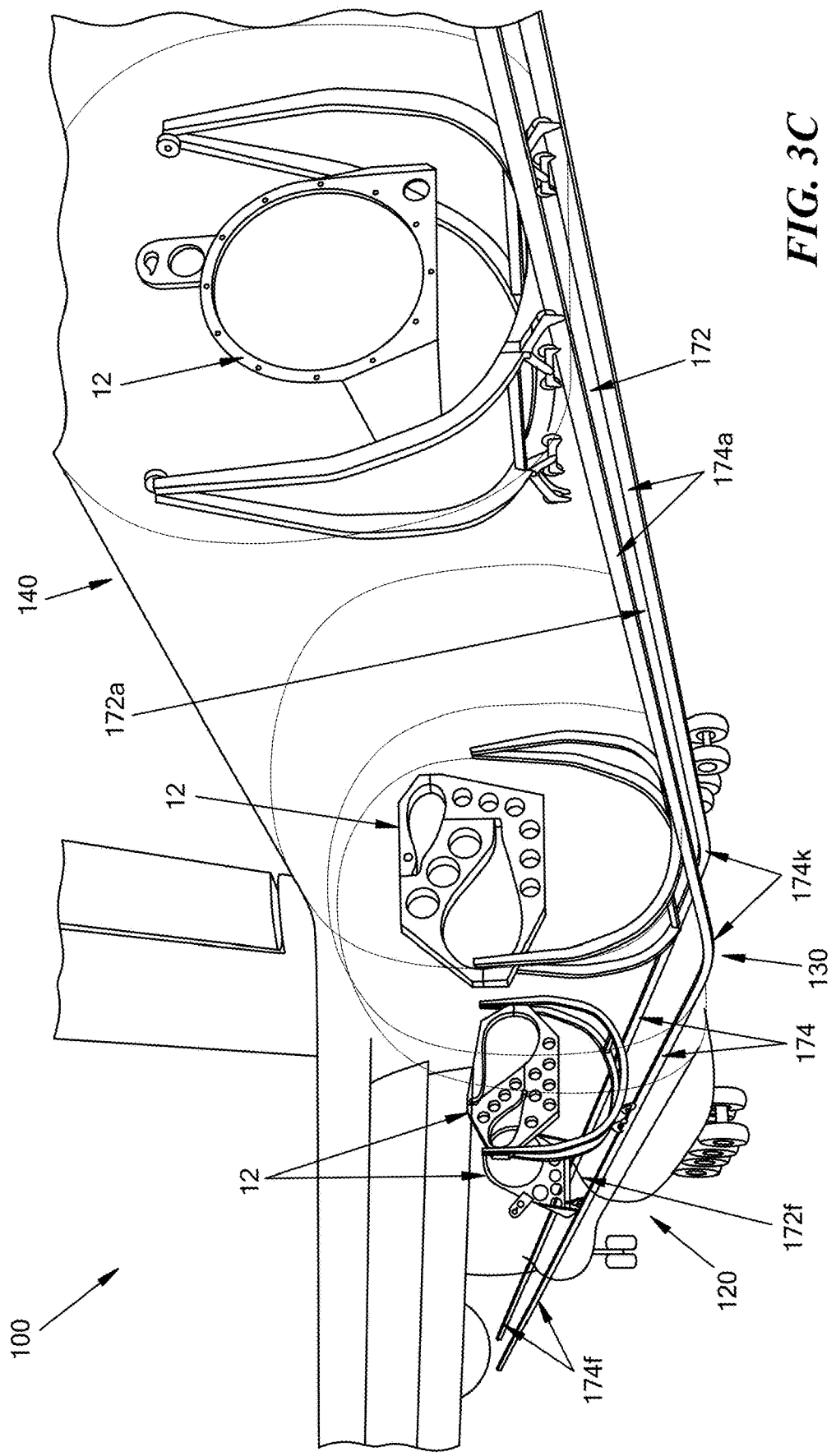
FIG. 3C is a detailed, back-side isometric, transparent view of the aircraft of FIG. 3B.

A bottom contact surface 172 (also referred to herein as a floor) can be located in the interior cargo bay 170, and can also extend in a continuous manner, much like the bay 170 itself, from the forward end 120, through the kinked portion 130, and into the aft end 140. The floor 172 can thus be configured to have a forward end 172f, a kinked portion 172k, and an aft end 172a (FIGS. 3A-3C). In some embodiments, the floor 172 can be configured in a manner akin to most floors of cargo bays known in the art. In some other embodiments, discussed in greater detail below, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170. Additional fixtures and tooling designed to be used in conjunction with such rails are also discussed below at least with respect to FIGS. 3A-3C.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue can be an extension of the floor 172, or it can be its own feature that extends from below or above the floor 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline CF. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art). Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline CF of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline CF. In the illustrated embodiment, the angle defined by the bottom-most outer surface 103 and the centerline CF is larger than an angle defined by the top-most outer surface 102 and the centerline CF, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170. Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other commonly-owned patent applications, are the result of very specific design solutions arrived at by way of engineering.

Figure 2A:
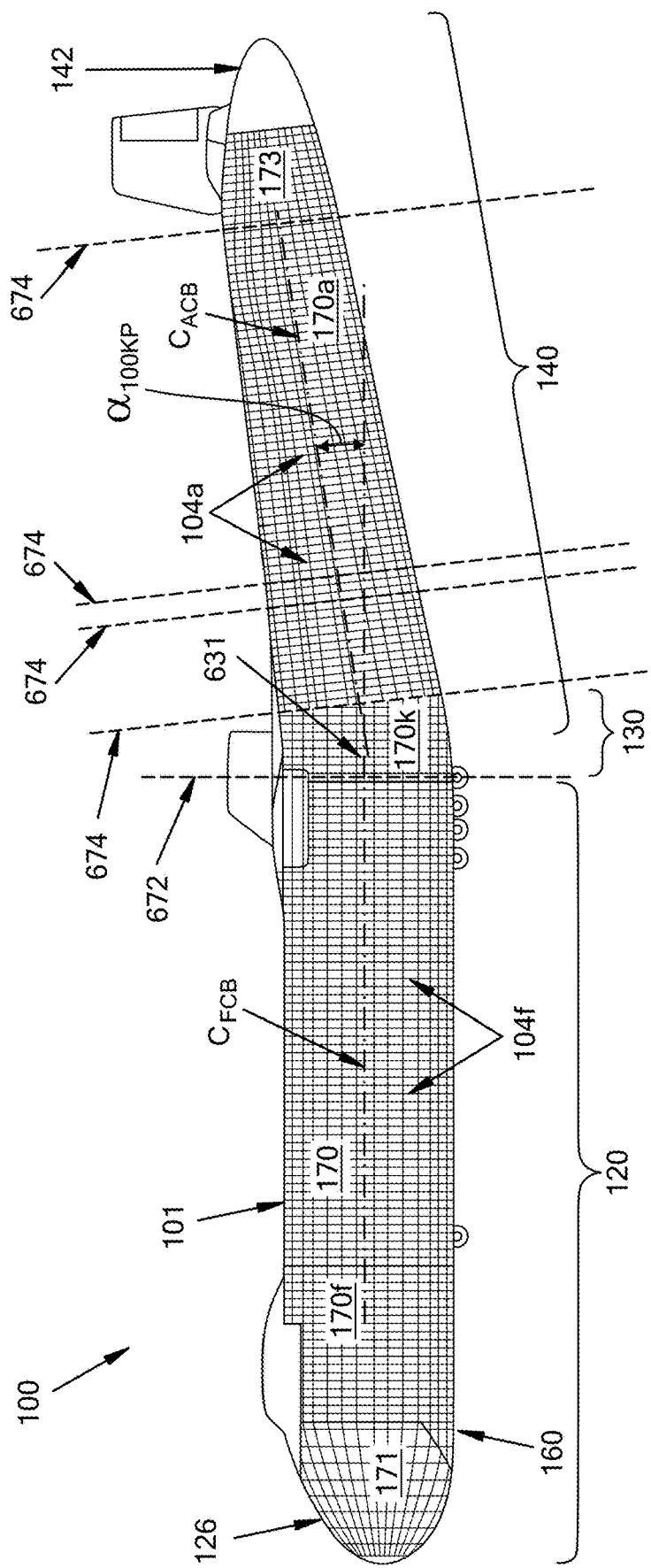
FIG. 2A is a side cross-sectional view of the aircraft of FIG. 1A, including an interior cargo bay of the aircraft.

FIG. 2A shows the aft region 170a of the cargo bay 170 extending through almost all of the aft fuselage 140, which is a distinct advantage of the configurations discussed herein. Moreover, due to the length of the aft fuselage 140, a pitch 674 of structural frames 104a of the aft fuselage 140 can be angled with respect to a pitch 672 of structural frames 104f of the forward fuselage 120 approximately equal to the kink angle $\alpha_{100K}$ of the fuselage 101. In some examples, the kinked region 130 represents an upward transition between the pitch 672 of the structural frames 104f of the forward fuselage 120 and the pitch 674 of the structural frames 104a of the aft fuselage 140. A person skilled in the art will recognize that structural frames 104a, 104f are merely one example of structural features or elements that can be incorporated into the fuselage 101 to provide support. Such elements can be more generally described as circumferentially-disposed structural elements that are oriented orthogonally along the aft centerline $C_{ACB}$ and the forward centerline $C_{FCB}$. In some examples, the location of the cargo bay kink 631 is forward or aft of a fuselage kink such that either the forward cargo region 170f partially extends into the aft fuselage 140 or the aft cargo region 170a partially extends into the forward fuselage 120, however, this generally depends, at least in part, on the distance between the interior of the cargo bay 170 and the exterior of the fuselage, which is typically a small distance for cargo aircraft having a maximally sized cargo bay. Regardless, to fully utilize examples of the present disclosure, the aft region 170a of the cargo bay 170 can be both (1) able to be substantially extended due to the ability of the aft fuselage 140 length to be extended and (2) able to extend along substantially all of the length of the aft fuselage 140 because examples of the present disclosure enable aircraft to have elongated aft fuselages for a fixed tailstrike angle and/or minimized kink angle. Additionally, minimizing the fuselage kink angle for elongated aft fuselages allows the aft region of the cargo bay to extend further along the fuselage while increasing the maximum straight-line payload length for a given overall aircraft length and tailstrike angle, as shown at least in FIG. 2B.

Figure 2B:
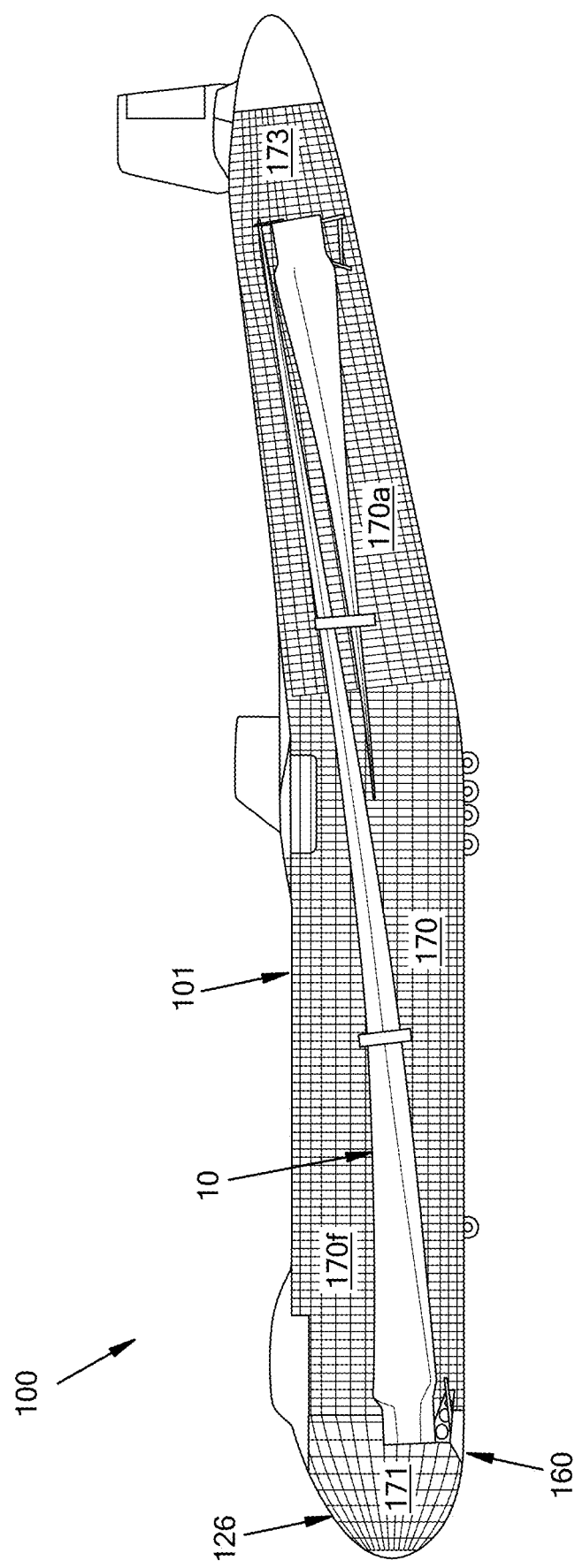
FIG. 2B is the side cross-sectional view of the aircraft of FIG. 2A with an exemplary payload disposed in the interior cargo bay.

FIG. 2B shows a side cross-sectional view of the fuselage 101 of the cargo aircraft 100 of FIG. 1A with a highly elongated payload 10 of two wind turbine blades 11A, 11B disposed substantially throughout the interior cargo bay 170 and extending from the forward end 171 of the forward region 170f to the aft end 173 of the aft region 170a. The payload 10 is described in greater detail below with respect to FIG. 5A and represents one non-limiting embodiment of a payload that can be used in conjunction with the aircraft 100 and other aircrafts provided for herein or otherwise derivable from the present disclosures. Having at least a portion of the aft region 170a being linearly connected to (e.g., within line of sight) of at least a portion of the forward region 170f enables the extension of the aft region 170a to result in an extension in the maximum overall length of a rigid payload capable of being carried inside the interior cargo bay 170. Wind turbine blades, however, are often able to be deflected slightly during transport and so examples of the present disclosure are especially suited to their transport as the ability to slightly deflect the payload 10 during transport enables even long maximum payload lengths to be achieved by further extending the aft end 173 of the aft region 170a beyond the line of sight of the forward-most end 171 of the forward region 170f.

Figure 2C:
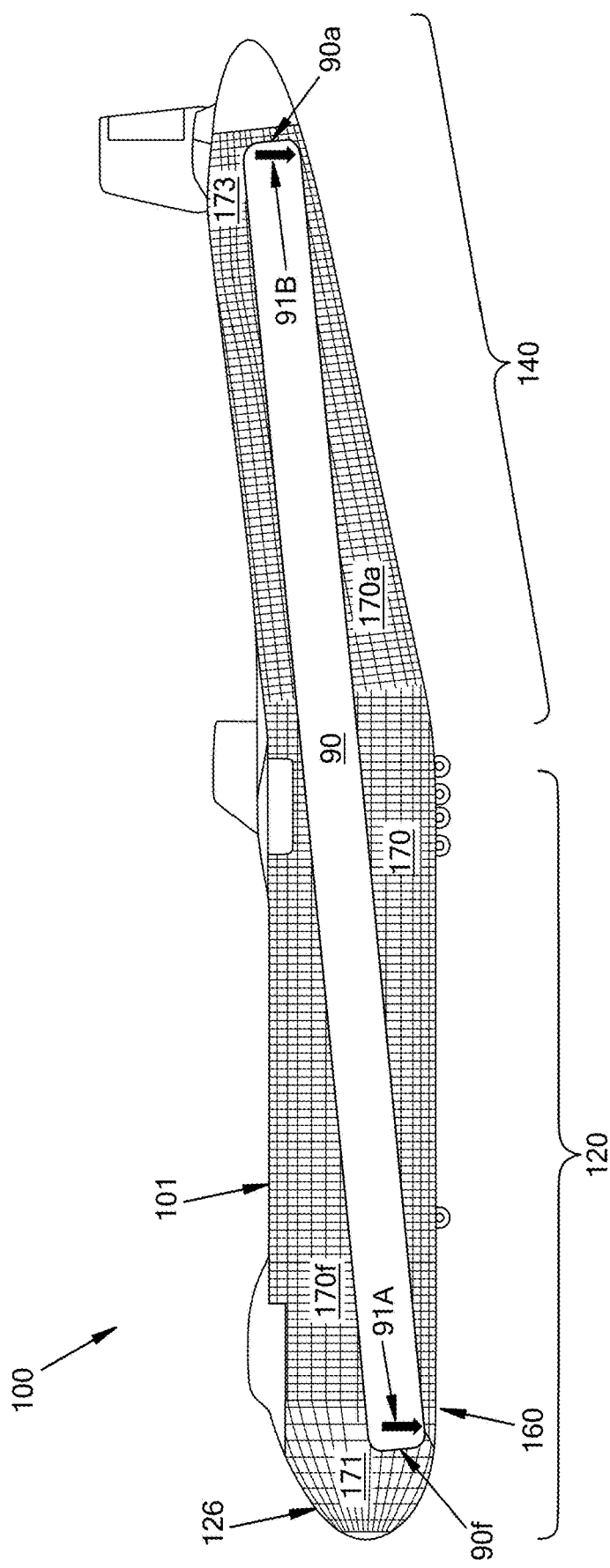
FIG. 2C is the side cross-sectional view of the aircraft of FIG. 2A with a schematic of an exemplary maximum-length payload disposed in the interior cargo bay.

FIG. 2C is the same cross-sectional view of the fuselage 101 of the cargo aircraft 100 of FIG. 2B with a maximum length rigid payload 90 secured in the cargo bay 170. A forward end 90f of the maximum length rigid payload 90 can be secured to the cantilevered tongue 160 in the forward end 171 of the forward region 170f with a first portion of the weight of the payload 90 (shown as vector 91A) being carried by the cantilevered tongue 160 and an aft end 90a of the maximum length rigid payload 90 can be secured to the aft end 173 of the aft region 170a with a second portion of the weight of the payload 90 (shown as vector 91B) being carried by the aft end 173 of the aft region 170a.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Additional details about a kinked fuselage configuration are provided in International Patent Application No. PCT/US2020/049787, entitled "AIRCRAFT FUSELAGE CONFIGURATIONS FOR AVOIDING TAIL STRIKE WHILE ALLOWING LONG PAYLOADS," and filed Sep. 8, 2020, and the content of which is incorporated by reference herein in its entirety.

Rails and Payload-Receiving Fixtures

Hidden from view in the previous figures of the aircraft 100, but illustrated in FIGS. 3A-3C are a pair of rails 174 coupled to, extending from, or otherwise associated with the bottom contact surface 172 of the cargo bay 170. Some of the illustrations may look incomplete or incompatible with other figures, such as having rails extending beyond what looks like the terminal end of a fixed portion of the fuselage (see, e.g., FIG. 3C as filed), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures. Embodiments of the rails and fixtures disclosed herein can be used to dispose an end of a payload into a cargo bay region of a tailcone. In some embodiments, the tailcone includes a rail system configured to form an extension of the rail system in the fuselage 101. In some embodiments, the tailcone includes features configured to secure the end of the payload during flight.

Much like the bay 170 and the bottom contact surface 172, the rails 174 can extend in a continuous manner from the forward end 120, through the kinked portion 130, and into the aft end 140. The rails 174 can thus be configured to have a forward end 174f, a kinked portion 174k, and an aft end 174a. As a result of the kinked portion 174k, a vertical distance $d_{ra}$ between the aft end 174a and a plane $P_F$ defined by an interior bottom contact surface of the interior cargo bay 170 in the forward end 120 of the aircraft 100, i.e., the plane $P_F$ extending longitudinally and laterally through the forward end 172f of the bottom contact surface 172 and that is substantially parallel to the forward centerline CF, is greater than a vertical distance $d_{rf}$ between at least a portion of the forward end 174f and the plane $P_F$. Further, in some embodiments in which the aft end 140 extends above a plane extending substantially through an entirety of the top surface 102 of the forward end 120 of the fuselage 101 such that the plane is substantially parallel to ground, because the rails 174 can extend towards and into the fuselage tail cone 142, a portion of at least one of the rails 174, as shown both rails 174, disposed in the aft bay portion 172a can also be located above the plane extending substantially through an entirety of the top surface 102 of the forward end 420 of the fuselage 101. The angle at which the rails 174 are disposed in the aft bay portion 170a can be akin to a kink angle of the fuselage. More generally, the rails 174 can extend in a manner such that a majority of it disposed in the aft bay portion 170a is disposed at the kink angle. As shown, there are two rails 174 that are substantially parallel to each other across their length, but in other embodiments there can be fewer (e.g., one rail) or more rails and the rails can extend in non-parallel manner, such as having them angle closer together or further apart slightly as they extend towards the aft end 140 to create a desired stopping location that works with fixtures loaded onto the rails 174. In some embodiments, the rail(s) 174 can serve as a primary structural member(s) or beam(s) of the fuselage 101, capable of bearing operational flight and/or ground loads, akin to a keel beam in some aircraft.

A payload, such as the payload 10, can be translated or otherwise moved along the rails 174 from the forward end 174f and towards the aft end 174a until the payload reaches a desired location. That desired location can relate, for example, to placing a center of gravity of the payload within a desired range of a center of gravity of the aircraft. Translation of the payload can be aided by the fixtures 12 illustrated in FIGS. 3A-3C. The fixtures 12 can have a variety of configurations that are configured to both receive a payload, such as wind turbine blades 11A, 11B (of fewer or more blades as desired) and translate along the rails 174 to place the payload at the desired location(s).

A person skilled in the art will recognize other carriages, frames, and receivers that can be used in conjunction with the present disclosures. Further, while payload-receiving fixtures are referred to herein using reference numeral 12, in some embodiments, a payload-receiving fixture may just be a receiver, and thus such usage of the term "payload-receiving fixture" herein, including in the claims, can be directed to just a receiver as provided for herein. Generally, that term in any claim should be read in that manner, unless such interpretation would be incompatible with the remaining portion of the claim, for example, if the claim separately recites a receiver.

Additional details about tooling for cargo management, including rails and payload-receiving fixtures and fuselage configuration for enabling loading and unloading of payloads into aft regions of a continuous interior cargo bay are provided in International Patent Application No. PCT/US2020/049784, entitled "SYSTEMS AND METHODS FOR LOADING AND UNLOADING A CARGO AIRCRAFT," and filed Sep. 8, 2020, and the content of which is incorporated by reference herein in its entirety.

Transport Vehicle, Support Structures, Fixtures, and Aspects Related to the Same A concurrently filed, commonly-owned related application includes disclosures regarding the use of support structures in conjunction with loading and unloading the aircraft 101, the application being entitled "SYSTEMS AND METHODS FOR LOADING AND UNLOADING A CARGO AIRCRAFT UTILIZING A CURVED PATH." The support structures allow for a payload to be moved along a curved path concurrently with a fore-aft motion within the cargo bay during at least a portion of the loading or unloading process, for example, following a "slide aboard" or linear translation of the payload into the cargo bay (or out of the cargo bay during an unloading procedure). translation of the payload into the cargo bay (or out of the cargo bay during an unloading procedure). One or more support structures can be disposed, either removably or permanently, within the cargo bay that can form the curved path for the payload to travel along. As used herein, "curved path" refers to a path defined by a circular arc, such that as the payload moves along the path the payload rotates about an arc center point, resulting in the payload moving along the arc. In other words, as the payload moves along the curved path, the payload remains a fixed radial height (as measured along a radius from the center point of the arc to the curved path) about the curved path, i.e., a portion or portions of the one or more support structures that form the curved path. While the contents of that disclosure are incorporated by reference herein in its entirety, a high-level over related to some of the features regarding how such a process works is provided for purposes of explaining some non-limiting embodiments for how large cargo can be loaded onto an aircraft.

Figure 4:
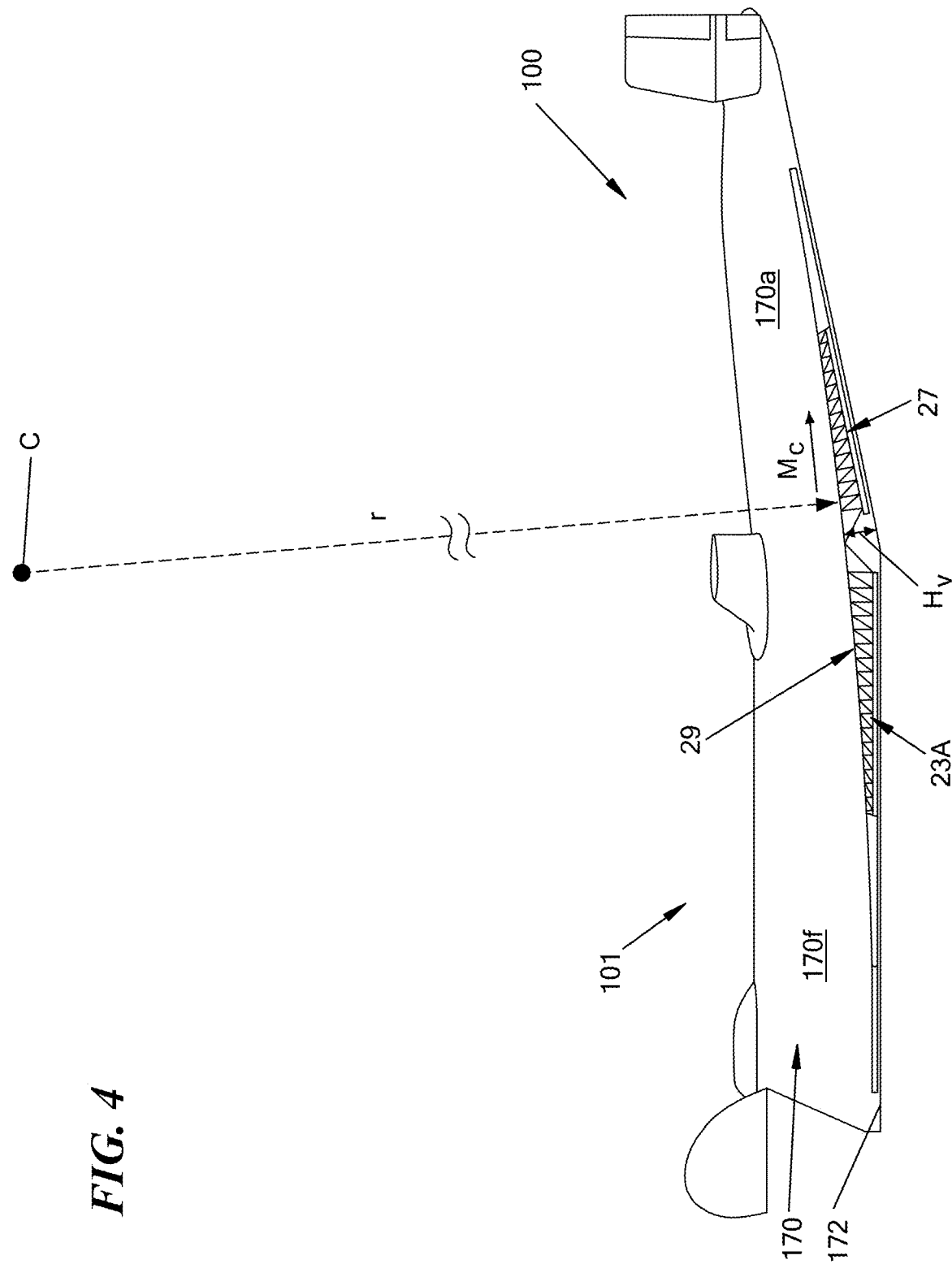
FIG. 4 is a side partial cross-sectional view of the aircraft of FIG. 1C, the fuselage of the aircraft being illustrated in cross-sectional view, with an aft support structure and a forward support structured disposed within the interior cargo bay and with half of the fuselage being removed for illustrative purposes.

FIG. 4 illustrates one embodiment of the aircraft 100 with a curved path extending through at least a portion of the interior cargo bay 170. More particularly, a forward support structure 23A and an aft support structure 27 can form a curved path 29, with motion therealong indicated by arrow Mc, which can extend at least partially through the kinked bay portion 170k into the aft bay 170a. In some embodiments, the curved path can extend from the forward bay, through the kinked bay, and into the aft bay. The forward and aft support structures 23A, 27 can be secured, either permanently or removably, to the bottom contact surface 172 of the interior cargo bay 170. In some embodiments, one or both of the forward and aft support structures 23A, 27 can be secured directly to the bottom contact surface 172 of the interior cargo bay 170. In other embodiments one or both of the forward and aft support structures 23A, 27 can be secured to one or more base rails or similar feature disposed on or connected to the bottom contact surface 172. The forward and aft support structures 23A, 27 can extend a varying vertical distance Hv above the bottom contact surface 172 to which the structures are secured over a length of each structure 23A, 27 such that a top or upper end of each structure forms the curved path. In some embodiments, at least one rail 29, 31 (FIG. 7D) can form or extend along the upper end of each of the forward and aft support structures 23A, 27. The forward and aft support structures 23A, 27 can be disposed within the cargo bay 170 such that the at least one rail 29, 31 of the support structures 23A, 27 align to form the curved path.

The payload can move along the support structures, e.g., by rolling or sliding along the support structures, such that the payload travels along the curved path concurrently with forward-aft motion of the payload. The curved path 29, 31 formed by the forward support structure 23A and aft support structure 27 can be defined by a circular arc, with the path extending along a radial section of the arc relative to an arc center point. To accommodate the large size of the payload 10 and appropriate dimensions of the aircraft 100, the arc center point C can be located well above the aircraft 100. In other words, a radius r of the arc along which the curved path 29, 31 is formed can be very large such that, in some instances, to the naked eye it may appear that a payload is moving along a diagonal as the payload travels in the fore or aft direction along the curved path 29, 31. The large radial dimension can allow for the curved path 29, 31 to be formed as an approximation of a curve using piece-wise linear segments with a negligible amount of deviation from an ideal curved profile. Accordingly, in some embodiments, the at least one rail that forms the curved path can be a series of piecewise-linear rail segments that approximate a curve. By way of non-limiting example, a radial dimension r of the arc, as measured from the upper end of the support structures 23A, 27 that form the curved path to the center point C of the arc, can be between about 800 feet and about 6000 feet, between about 1200 feet and about 200 feet, greater than about 1500 feet, greater than about 2000 feet, or greater than about 2500 feet.

FIGS. 5A-9B illustrate in greater detail components of systems that can be used to load and/or unload a payload. FIG. 5A illustrates one embodiment of a transport vehicle or transport vehicle system 20 that can include a plurality of transports 22 and vehicle support spans or lower trusses 24 and can be utilized to move a payload 10 to a cargo aircraft for loading (or away from the cargo aircraft for unloading). The transport vehicle 20 is shown in greater detail in FIG. 5B. Returning to FIG. 5A, a forward support structure 23A and a ground support structure 23B can be disposed on and selectively coupled to the transport vehicle 20 such that the support structures 23A, 23B can selectively move relative to and along the transport vehicle 20. In some embodiments, the support structures 23A, 23B, 27 can include one or more trusses, but other configurations for support structures are possible. A more detailed discussion of one embodiment of truss-style support structures is set forth below in connection with FIGS. 6D and 6E.

The forward and ground support structures 23A, 23B can be locked or otherwise secured to the transport vehicle such that the support structures remain stationary with respect to the transport vehicle, or can be unlocked or otherwise configured to permit translation of the support structures relative to or along the transport vehicle. The support structures 23A, 23B can include, or otherwise be used with, appropriate features and devices to secure it to the transport vehicle, such as tiedown rings, manual or power-operated locking pins, e.g., that can interface with counterpart components on the transport vehicle such as a clevis pin receptacle or open hook, gear racks, or articulated struts, among others. Such locking features and devices can be applied to various aspects of the present disclosure that utilize selective locking, e.g., locking a payload-receiving fixture to a support structure, locking a support structure to a bottom contact surface of a cargo bay, locking a support structure to a transport vehicle, etc.

The payload 10 can be selectively coupled to the forward and ground support structures 23A, 23B such that the payload can selectively move relative to and along forward and ground support structures 23A, 23B. In some embodiments, the payload 10 can include a plurality of payload-receiving fixtures 12 that can receive a large cargo, such as turbine blades 11A, 11B, such that the large cargo and the fixtures 12 can move as a unit relative to the forward and ground support structures 23A, 23B. Details of one payload-receiving fixture is described below in connection with FIG. 8, although other exemplary fixtures are described in other commonly-owned applications that are now known to those skilled in the art, incorporated by reference, or otherwise able to be derived from the disclosures of this and other commonly-owned applications. Each payload-receiving fixture can be locked or otherwise secured to forward and ground support structures 23A, 23B such that the payload-receiving fixtures remain stationary with respect to the support structures, or can be unlocked or otherwise configured to permit translation of the payload-receiving fixtures 12 relative to or along the support structures. The payload-receiving fixtures can be locked or unlocked using any of the methods or mechanisms described above in connection with the support structures 23A, 23B, or equivalent methods or mechanisms as would be recognized by one skilled in the art.

As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units. As will be described in detail below, a first or forward support structure 23A and a back or ground support structure 23B can be removably coupled to the vehicle 20. The fixtures 12 can be removably coupled to the support structures 23 such that the fixtures 12 can move both with the support structure 23 and relative thereto. It will be appreciated that while two support structures 23A, 23B are illustrated, a greater or fewer number of support structures can be removably coupled to the vehicle 20, so long as the support structures can safely and securely support the payload 10 and accompanying fixtures 12.

FIG. 5B illustrates one embodiment of the transport vehicle 20 in greater detail. The vehicle system 20 can include a plurality of transporters 22 and a support span, as shown trusses 24, extending between each of the transporters 22. The transporters 22 can be wheeled vehicles configured to move along a surface, such as ground, up or down a ramp, and/or in an interior cargo bay of an aircraft, among other surfaces. The transporters 22 can be operated independent of one another, or they can be operable collectively as a single unit. The transporters 22 can be self-propelled and/or self-powered such that an outside mechanism, such as pushing or towing vehicle, does not need to contact the transporters 22, or any part of the system 20, to advance, drive, or otherwise move the transporters 22 and system 20. As shown, the transporters 22 include wheels 22w. Alternatively, or additionally, with respect to any of the transporters provided for herein or otherwise derivable from the present disclosures, other transportation means can be used that allow for movement across a ground, including, for example skis, skids, linked tracks (e.g., tractor tracks, military tank tracks), articulated legs, or air cushions in the manner of a hovercraft. Control of the transporters 22 and/or the system 20 can be performed using any known techniques for controlling a vehicle remotely, including but not limited to one or more controllers or control pads in communication with systems and/or other components provided for on the transporters (e.g., power system, electrical controls, motor, etc.).

Disposed between each transporter 22 can be one or more support spans. In the illustrated embodiment, the support spans are trusses, although a person skilled in the art will recognize a variety of structures that can be used to couple transporters 22 together and provide adequate support for a payload. The trusses 24 can include a plurality of rails 24a, 24b that are disposed substantially parallel to each other, along with various crossbeams that provide additional strength to the truss 24. In embodiments in which base rails are disposed in the aircraft, the rails of the truss can be complementary in size to the base rails on the aircraft to allow for easy transition from one to the other. The length and number of trusses can depend, at least in part, on the number of transporters 22 being used and the size and weight of the payload 10. More generally, fewer or more transporters 22 and trusses 24 can be used as desired. In the illustrated embodiment, the trusses 24 extend across an entire top surface of each transporter 22, although in other embodiments the trusses can extend along only a portion of the top surface of one or more of the transporters 22. Generally the support spans are configured in a manner such that the do not interfere with the operation of the system 20, and thus, for example, a height of the trusses 24 in the illustrated embodiment is such that they do not contact the ground. However, the trusses may optionally be permitted to sag and intentionally contact the ground under some loading situations to alleviate stresses within the trusses and thereby reduce the amount of material required to construct them.

FIGS. 6A-6E provide for a schematic illustration of one exemplary embodiment of loading a large payload 10 into the aircraft 100. For illustrative purposes, the left half of the fuselage 101 (with respect to the aircraft's direction of flight), i.e., the right half of the fuselage 101 when viewed from the front of the aircraft, has been removed from these figures. Further details of moving the payload 10 along the curved path will be described in connection with the same. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 (see FIG. 1C) can be used to help initially receive the payload.

Figure 6A:
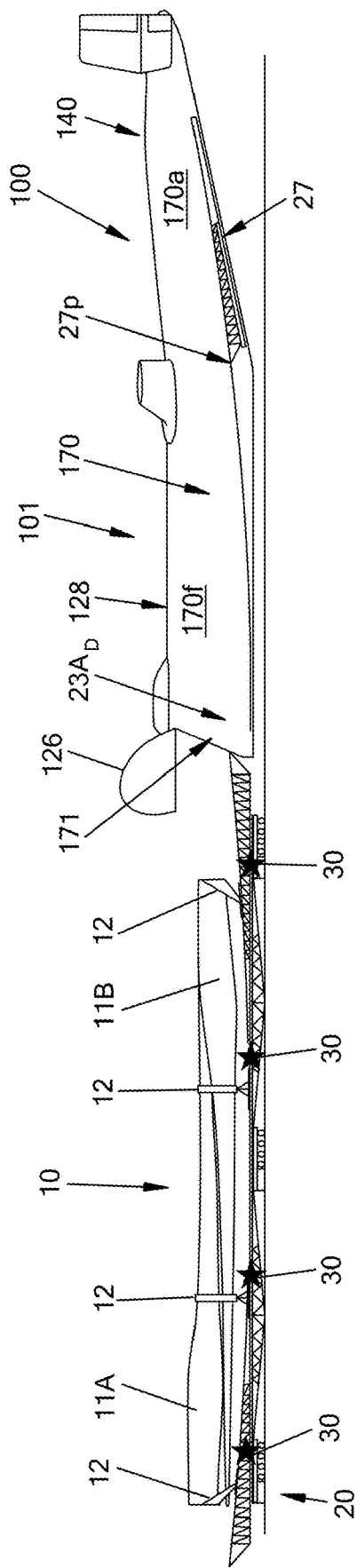
FIG. 6A is a schematic side view of the aircraft of FIG. 1A with an aft support structure disposed therein with a payload, forward support structure, and ground support structure disposed on the transport vehicle of FIG. 5A, the transport vehicle being proximal to the aircraft.

As shown in FIG. 6A, the transport vehicle 20 can be driven or otherwise moved to the forward end 120 of the aircraft 100, proximate to the cargo opening 171. When driving or moving the transport vehicle 20 to the forward end 120 of the aircraft 100, the payload 10 can be locked or otherwise secured to the support structures 23A, 23B and the support structures can be locked or otherwise secured to the transport vehicle 20, such that the payload, support structures, and transport vehicle can move as one unit. An aft support structure 27 can be disposed within the aft portion 170a of the cargo bay 170 such that the aft support structure 27 is secured in a fixed position relative to the cargo bay 170. The aft support structure 27 can be either permanently or removably disposed in the aft cargo bay 170. For example, in some embodiments the aft support structure 27 can be formed integrally with the bottom contact surface 172 of the aft cargo bay 170a. In other embodiments, the aft support structure 27 can be either permanently or removably coupled to the bottom contact surface 172 of the aft cargo bay 170a, e.g., by locking a lower end of the aft support structure 27 to one or more base rails extending along the bottom contact surface of the aft cargo bay, and/or to the bottom contact surface 172 itself. Notably, the aft support structure 27 can remain stationary and securely disposed within the aft cargo bay 170a as the payload 10 is loaded into and/or unloaded from the cargo bay 170, regardless of the permanence and/or mechanism of coupling the aft support structure 27 within the aft cargo bay 170a.

Figure 6B:
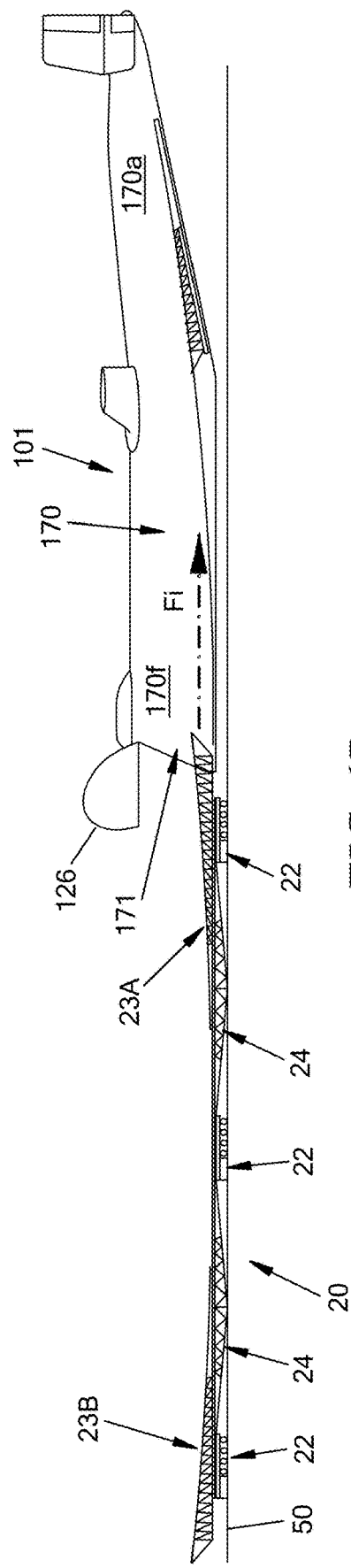
FIG. 6B is a schematic side view of the aircraft of FIG. 6A illustrating a snapshot of translating the forward support structure into the interior cargo bay, with the payload removed for clarity.
Figure 6C:
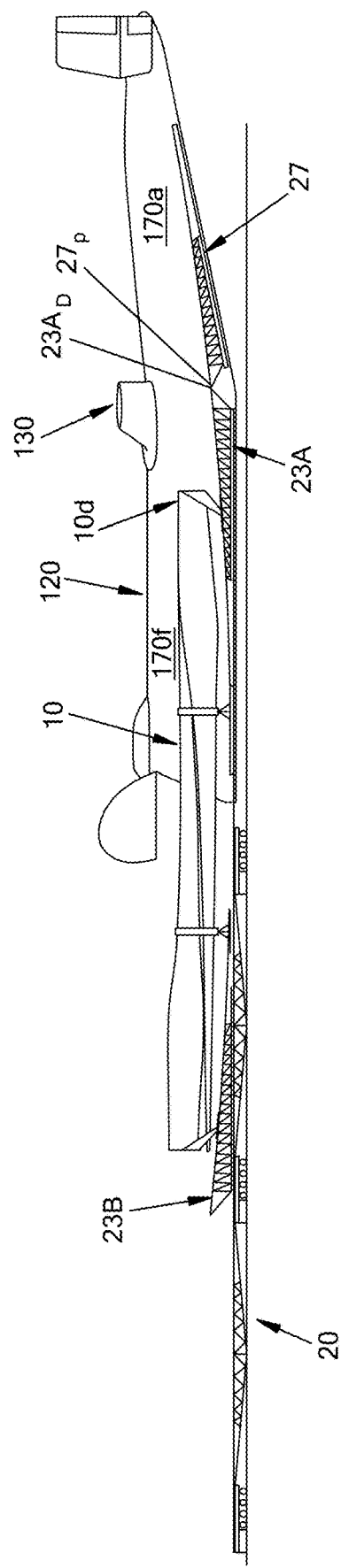
FIG. 6C is a schematic side view of the aircraft of FIG. 6A with the forward support structure disposed within the forward bay of the interior cargo bay and the payload partially disposed within the interior cargo bay following an initial translation into the forward bay.

The payload 10 can be moved from the transport vehicle 20 and into the interior cargo bay 170. From the orientation illustrated in FIG. 6A, i.e., with the transport vehicle 20, support structures 23A, 23B, and payload 10 proximate to the cargo opening 171, the support structures 23A, 23B can be placed in a movably coupled configuration relative to the transport vehicle 20. As a result, the structures 23A, 23B and payload 10 can remain coupled, but they can be movable relative to the transport vehicle 20. For example, the support structures 23A, 23B can be unlocked relative to the transport vehicle 20 at a plurality of locations 30 along a length of the transport vehicle. A person skilled in the art will appreciate that the illustrated locations 30 can be other locations along the length of the transport vehicle 20, and fewer or more locations can be used as desired. FIGS. 6B and 6C illustrate snapshots of an initial "slide aboard" phase in which the payload 10 and forward support structure 23A can be moved through the cargo opening 171 and into the forward portion 170f of the cargo bay 170. More particularly, FIG. 6B (which, for illustrative purposes, does not show the payload 10) shows one embodiment of a start position of the initial "slide aboard" phase just prior to movement of the support structures 23A, 23B and payload 10 relative to the transport vehicle 20. With the support structures 23A, 23B in the movably coupled configuration, the support structures 23A, 23B, together with the payload 10, can move towards the aircraft 100 in the direction of arrow $F_i$ as shown in FIGS. 6B and 6C, relative to the transport vehicle 20. The payload 10, i.e., the fixtures 12, and the blades 11A, 11B received therein, can remain locked or otherwise secured to the support structures 23A, 23B as the support structures move such that the support structures and payload move together as a unit relative to the transport vehicle. In some embodiments, the motion Li of the support structures 23A, 23B and payload 10 can be pure linear translation such that the forward support structure 23A and the payload 10 can linearly translate through the cargo opening 171 and into the forward bay 170f.

Movement of the support structures 23A, 23B and payload 10 can be accomplished using various combinations of one or more winches, pulleys, cables, cranes, and/or power drive units, as described herein and derivable therefrom. For example, a combination of cables, pulleys, and spools can be utilized in the loading and/or unloading the cargo. FIGS. 6A-6E are illustrated without any such cables, pulleys, and spools, etc. for illustrative purposes only. Further details about how such a system works is provided for in disclosures incorporated by reference herein and/or by techniques known to those skilled in the art for accomplishing tasks such as loading large payloads into an aircraft.

FIG. 6C illustrates one embodiment of a final position of the "slide aboard" phase, in which the support structures 23A, 23B have translated relative to the transport vehicle 20 such that the forward support structure 23A is disposed within the forward bay portion 170f of the cargo bay 170, along with at least a portion of the payload 10 coupled to the forward support structure. More particularly, and as described in detail below, the forward support structure 23A can align with the aft support structure 27 that is disposed in the aft cargo bay 170a to form a path that extends from the forward bay, through the kinked bay, and into the aft bay. As used herein, the forward support structure 23A can be considered to be "aligned" with the aft support structure 27 when a distal end 23 $A_D$ of the forward support structure 23A contacts, abuts, or is otherwise placed in close proximity to a proximal end 27p of the aft support structure 27 to provide a continuous or substantially continuous path along which the payload can travel without disruption.

The path formed by the forward support structure 23A and the aft support structure 27 can enable the payload 10 to move along a curved path in the aft direction from the forward bay, through the kinked bay, and into the aft bay 170a (or in a forward direction from the aft bay, e.g., for unloading the payload 10 from the cargo aircraft 100). As noted above, moving the payload along a curved path can refer to moving the payload along a path defined by a circular arc such that, as the payload moves along the path in the fore-aft direction, the payload concurrently rotates about a center point of the arc thereby resulting in the payload moving along the arc. For example, the forward support structure 23A and the aft support structure 27 can include at least one rail $29_{FS}$, $31_{PS}$, $29_{AS}$, $31_{AS}$ (see FIG. 6D) such that, when the forward support structure 23A is in the position illustrated in FIG. 6C, i.e., aligned with the aft support structure 27 in the final position of the slide-aboard phase, each rail $29_{FS}$, $31_{PS}$ of the forward support structure 23A can align with a corresponding rail $29_{AS}$, $31_{AS}$ of the aft support structure 27 to form a curved path 29, 31 along which the payload 10 can move in the forward-aft direction.

Figure 6D:
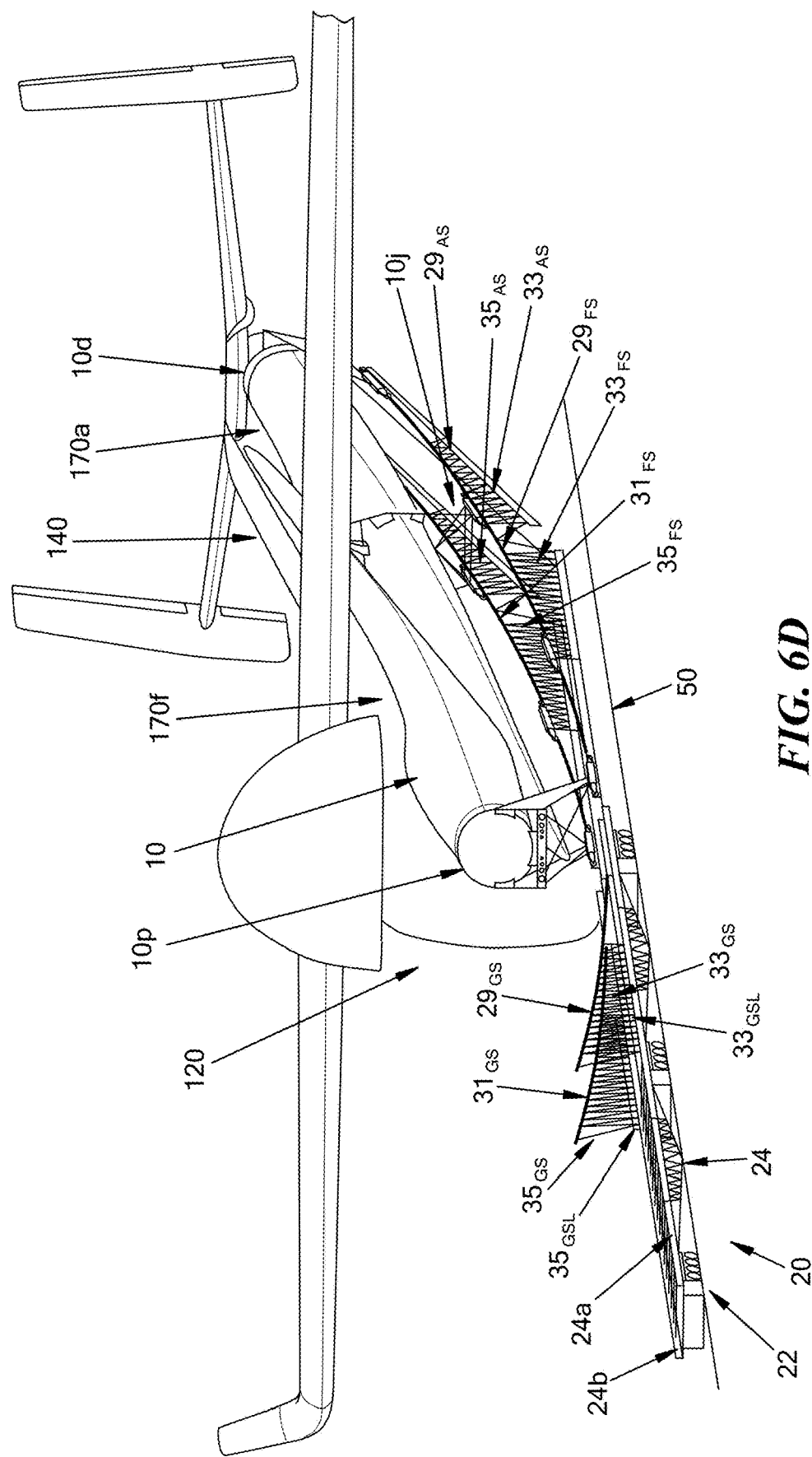
FIG. 6D is a front isometric view of the aircraft of FIG. 6C with the payload and forward support structure fully disposed within the interior cargo bay.
Figure 6E:
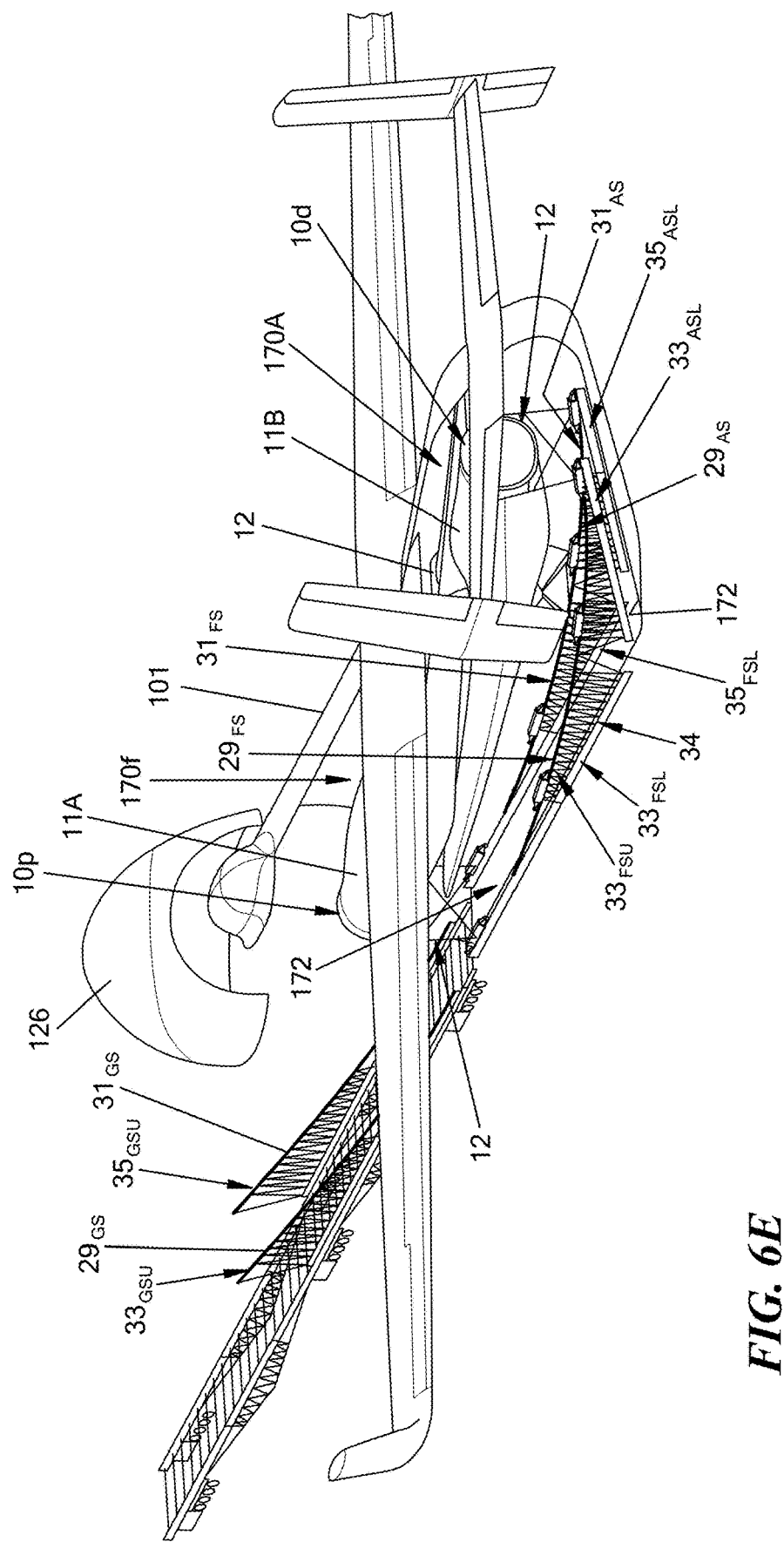
FIG. 6E is a rear isometric view of the aircraft of FIG. 6C with the payload and forward support structure fully disposed within the interior cargo bay.

In some embodiments, and as can be seen in FIGS. 6D and 6E, the forward support structure 23A and aft support structure 27 can include a first frame or truss $33_{FS}$, $33_{AS}$ and a second frame or truss $35_{FS}$, $35_{AS}$ that can extend substantially parallel to the first frame. The frames $33_{FS}$, $33_{AS}$, $35_{FS}$, $35_{AS}$, can extend longitudinally in the forward-aft direction. While the illustrated embodiment shows each support structure 23A, 27 with two frames $33_{FS}$, $33_{AS}$, $35_{FS}$, $35_{AS}$, a greater or fewer number of frames can be utilized, e.g., to provide an appropriate amount of stability and support for a given payload. Each frame can extend vertically from a lower end $33_{FSL}$, $33_{ASL}$, $35_{FSL}$, $35_{ASL}$ to an upper end $33_{FSU}$, $33_{ASU}$, $35_{FSU}$, $35_{ASU}$. A plurality of support beams 34 can extend between the upper and lower ends of each frame $33_{FS}$, $33_{AS}$, $35_{FS}$, $35_{AS}$ that can provide structural support and strength to the frame. A length of the beams 34 can vary longitudinally along each frame to accommodate a varying vertical height of the upper end of the frame.

The at least one rail $29_{FS}$, $31_{FS}$, $29_{AS}$, $31_{AS}$ can form or be formed along the upper end of each frame $33_{FS}$, $33_{AS}$, $35_{FS}$, $35_{AS}$ of the support structures 23A, 27. Similarly, the ground support structure 23B can include a first frame $33_{GS}$ and a second frame $35_{GS}$, with a rail $29_{GS}$, $31_{GS}$ formed at or forming an upper end $33_{GSU}$, $35_{GSU}$ of each frame. A lower end $33_{FSL}$, $35_{FSL}$, $33_{GSL}$, $35_{GSL}$ of each frame $33_{FS}$, $35_{FS}$, $33_{GS}$, $35_{GS}$ of the forward support structure 23A and the ground support structure 23B can be configured to removably couple to the transport vehicle 20 and, in the case of the forward support structure 23A, to the interior cargo bay 170, such that the forward and ground support structures can translate relative thereto. For example, the lower end of each frame can include one or more wheels that can roll along the transport vehicle 20 and bottom contact surface 172 of the cargo bay 170, e.g., along the rails 24a, 24b of the transport vehicle 20 and/or base rail(s) of the cargo bay 170. In some embodiments, the lower end of each frame $33_{AS}$, $35_{AS}$ of the aft support structure 27 can likewise be configured to removably couple to the interior cargo bay 170. In other embodiments, the lower end of each frame $33_{AS}$, $35_{AS}$ of the aft support structure 27 can be permanently fixed with respect to the interior cargo bay 170. For sake of brevity, in embodiments in which a plurality of frames form a support structure, the terms forward support structure 23A, ground support structure 23B, and aft support structure 27 can be used to collectively and generally refer to the plurality of frames, as will be understood by one of ordinary skill in the art in view of the present disclosure where such an interpretation is appropriate.

As shown in FIG. 6C, the payload 10 is partially disposed in the interior cargo bay 170 and remains coupled to the forward support structure 23A and ground support structure 23B, and thus is partially still supported by the transport vehicle 20. A distal end 10d of the payload 10 is disposed in the forward bay 170f, as it has not yet reached the kinked portion 130 of the aircraft 100. The forward support structure 23A can be secured within the forward bay portion 170f of the cargo bay 170, e.g., by locking the forward support structure to the bottom contact surface 172 of the bay 170. The ground support structure 23B can be similarly secured to the transport vehicle 20. In this manner, the forward support structure 23A and the ground support structure 23B can remain stationary relative to the cargo bay 170 and vehicle transport 20 until further action is taken to unlock the forward and ground support structures 23A, 23B. The payload 10 can be unlocked from the ground and forward support structures 23A, 23B such that the payload 10 can move relative to the support structures and into the aft portion 170a of the cargo bay 170.

The system and/or methods used to move the support structures 23A, 23B and payload 10 into the partially loaded position illustrated in FIG. 6C, as discussed in detail below, can continue to be employed to move the payload 10 into the fully loaded position illustrated in FIGS. 6D and 6E, while the support structures 23A, 23B remain stationary. More particularly, the payload 10 can be moved in the aft direction along the curved path formed by the forward support structure 23A and the aft support structure 27 into the aft portion 170a of the cargo bay. FIGS. 6D and 6E illustrate a snapshot from a forward perspective and rear perspective, respectively, of the loading process in which the payload 10 is fully received within the interior cargo bay 170. As shown, the distal end 10d of the payload 10 is disposed in the interior cargo bay 170 at the aft end 140, a proximal end 10p of the payload 10 is disposed in the interior cargo bay 170 at the forward end 120 (for example, on the cantilevered tongue 160, although the tongue is not easily visible in FIG. 6D, and the payload does not necessarily have to be disposed on the tongue 160), and the intermediate portion of the payload 10 disposed between the proximal and distal ends 10p, 10d extends from the forward end 120, through the kinked portion 130, and into the aft end 140. As shown, the payload 10 is coupled to the forward and aft support structures 23A, 27 and secured by locking the payload-receiving fixtures 12 thereto. The forward and aft support structures 23A, 27, in turn, are coupled to the bottom contact surface 172 of the interior cargo bay 170 and secured relative thereto. The payload 10 can be loaded into the interior cargo bay 170 such that the distal end 10d of the payload 10 is received within the aft bay portion, as shown in FIGS. 6D and 6E, without adjustment by way of manual or powered adjustment of the fixtures 12, which, in other loading processes may be necessary to accommodate and/or counter upwards motion of the blades 11A, 11B in connection with aft-wards movement of the payload 10. Adjustable fixtures can be used in context with the present support structures 23A, 23B, 27, but one benefit of the present disclosure is being able to load and/or unload large payloads without having to rely upon that extra degree of freedom or adjustment. Once the payload 10 is fully disposed in the interior cargo bay 170, it can be secured within the cargo bay 170 using techniques provided for herein, in commonly-owned applications, or otherwise known to those skilled in the art.

In other embodiments, the transport vehicle 20 can be configured to drive-on to the aircraft 100 to transfer the payload to a desired location and/or itself be secured within the interior cargo bay 170 for flight. Such configurations may not include the aforementioned support structures, and further, operation of the transport vehicle 20 can include typical driving features (translation, forward, back, left, right, and intermediate directions therebetween, and changing of azimuth), as well as features related to controlling a location of the payload 10 with respect to the transporters 22, such as positioning and orienting the payload 10 in any of the six degrees of freedom. The transporters 22 can thus include some appropriate combination of a power system (e.g., battery, fuel tank, or other energy source, including renewable energy source(s)), electrical controls, and/or an engine, motor, and/or other power conversion device to allow the transporters 22 to move without outside forces being applied to it. Still further, the transporters 22 can also include appropriate features and devices to secure it aboard the aircraft 100, such as tiedown rings, manual or power-operated locking pins, e.g., that can interface with counterpart components on the transport vehicle such as a clevis pin receptacle or open hook, gear racks, or articulated struts, among others.

Figure 7A:
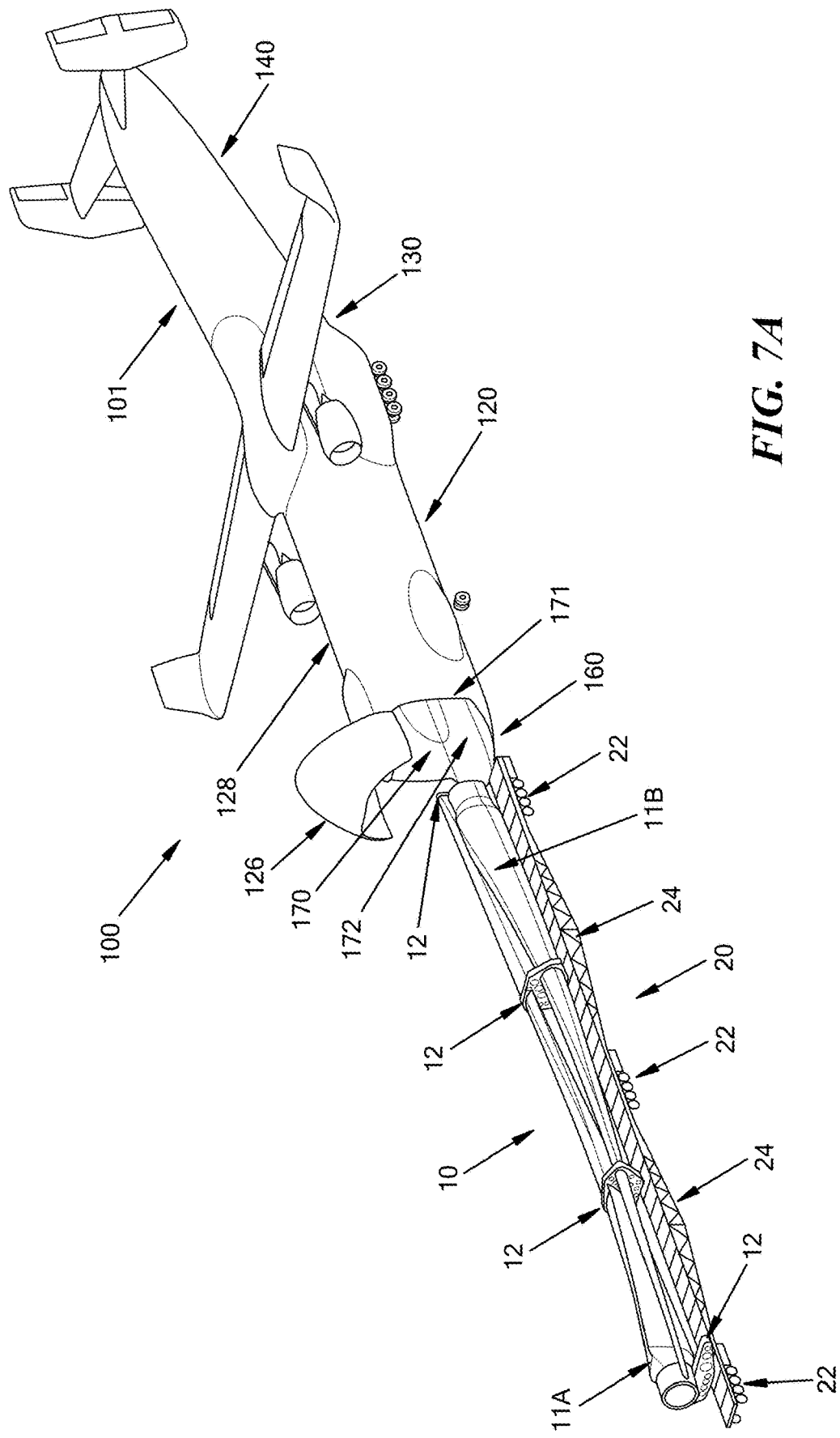
FIG. 7A is an isometric view of the aircraft of FIG. 1C with a payload being disposed proximate to the aircraft for loading into the interior cargo bay.
Figure 7B:
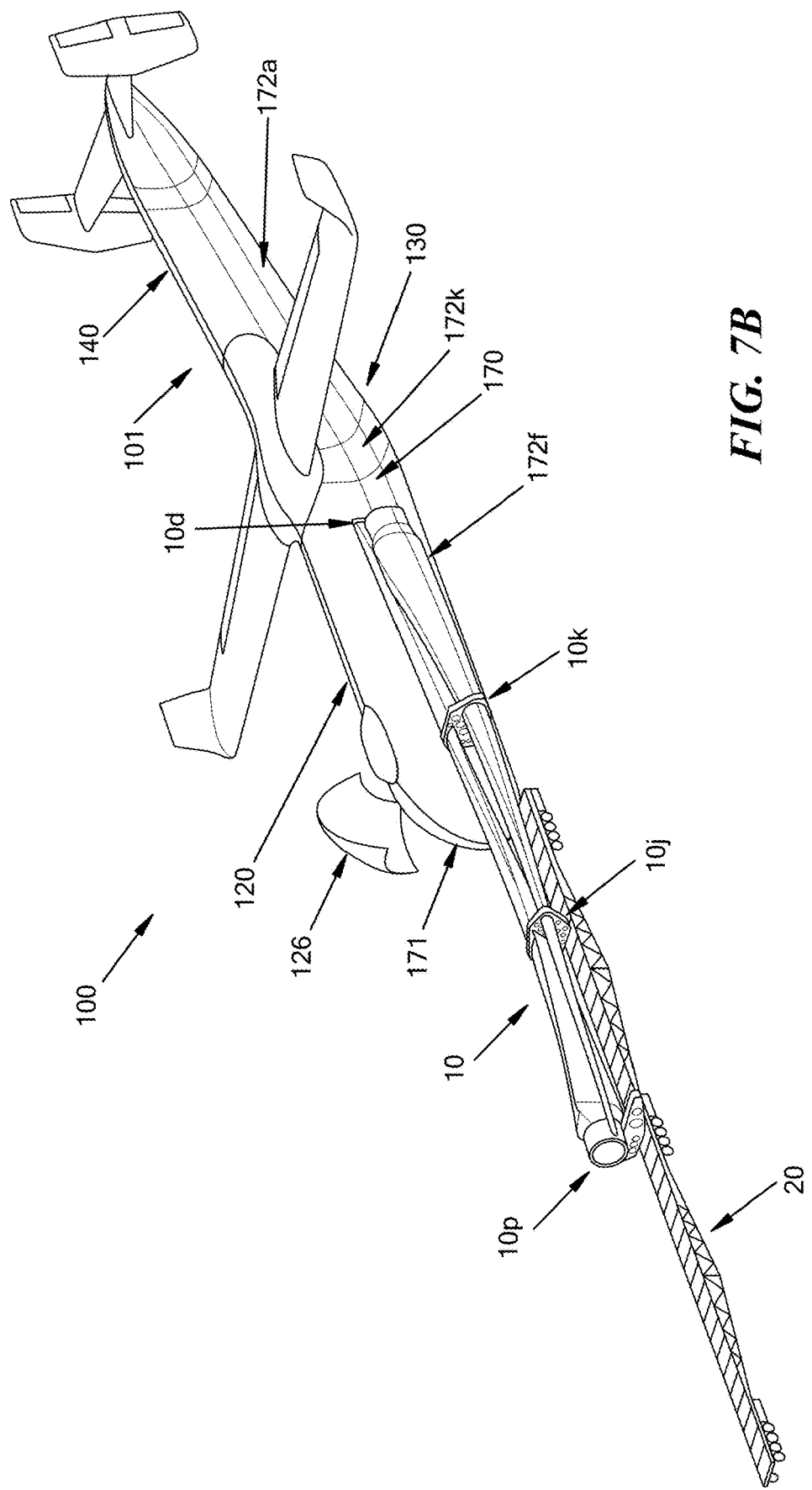
FIG. 7B is an isometric, partial cross-sectional view of the aircraft of FIG. 7A with the payload being partially loaded into the interior cargo bay.
Figure 7C:
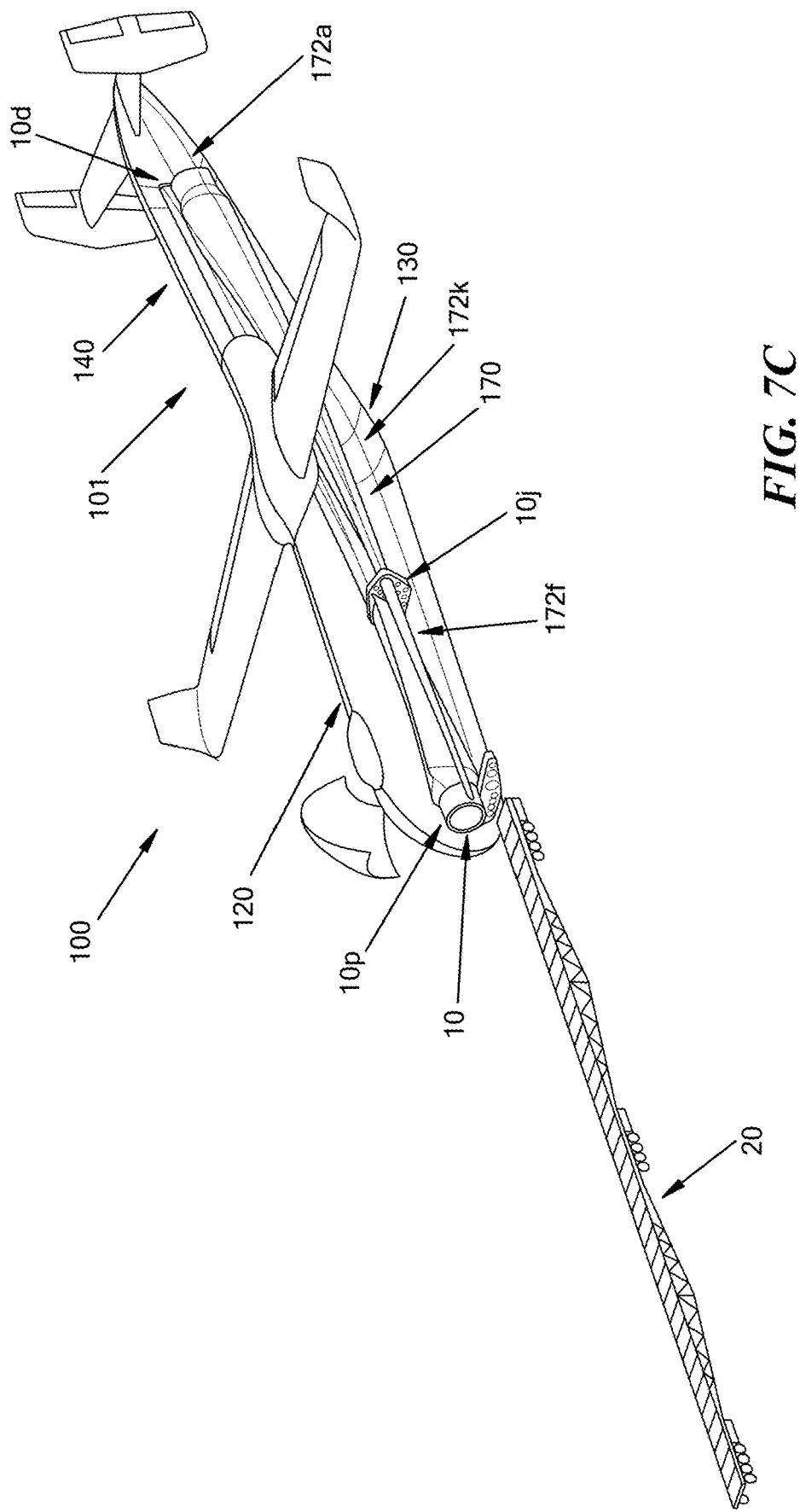
FIG. 7C is an isometric, partial cross-sectional view of the aircraft of FIG. 7B with the payload being fully loaded into the interior cargo bay.

FIGS. 7A-7C provide for a general, simplified illustration of another exemplary embodiment of loading a large payload 10 into the aircraft 100. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 can be used to help initially receive the payload. As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units.

As shown in FIG. 7A, the transport vehicle 20 can be driven or otherwise moved to the forward end 120 of the aircraft 100, proximate to the cargo opening 171. Subsequently, the payload 10 can begin to be moved from the transport vehicle 20 and into the interior cargo bay 170. This can likewise be done using various combinations of one or more winches, pulleys, cables, cranes, and/or power drive units, such set-ups and configurations being known to those skilled in the art. FIG. 7B illustrates a snapshot of the loading process with half of the fuselage removed for illustrative purposes (as currently shown, the half of the nose cone 126 illustrated is in both an open and closed position, but during loading through the cargo opening 171, it is in an open position). As shown, the payload 10 is partially disposed in the interior cargo bay 170 and is partially still supported by the transport vehicle 20. A distal end 10*d* of the payload 10 is still disposed in the forward end 120, as it has not yet reached the kinked portion 130.

The system and/or methods used to move the payload 10 into the partially loaded position illustrated in FIG. 7B can continue to be employed to move the payload 10 into the fully loaded position illustrated in FIG. 7C. As shown, the distal end 10*d* of the payload 10*d* is disposed in the interior cargo bay 170 at the aft end 140, a proximal end 10*p* of the payload 10 is disposed in the interior cargo bay 170 at the forward end 120 (for example, on the cantilevered tongue 160, although the tongue is not easily visible in FIG. 7C), and the intermediate portion of the payload 10 disposed between the proximal and distal ends 10*p*, 10*d* extends from the forward end 120, through the kinked portion 130, and into the aft end 140. As shown, the only contact points with a floor of the interior cargo bay 170 (which for these purposes includes the tongue 160) are at the proximal and distal ends 10*p*, 10*d* of the payload 10 and at two intermediate points 10*j*, 10*k* between the proximal and distal ends 10*p*, 10*d*, each of which is supported by a corresponding fixture 12. In other embodiments, there may be fewer or more contact points, depending, at least in part, on the size and shape of each of the payload and related packaging, the size and shape of the cargo bay, the number of payload-receiving fixture used, and other factors. This illustrated configuration of the payload disposed in the interior cargo bay 170 is more clearly understood by discussing the configuration of the kinked fuselage (i.e., the fuselage 101 including the kinked portion 130) in greater detail. Once the payload 10 is fully disposed in the interior cargo bay 170, it can be secured within the cargo bay 170 using techniques provided for herein, in commonly-owned applications, or otherwise known to those skilled in the art.

Payload Receiving Fixtures

Figure 8:
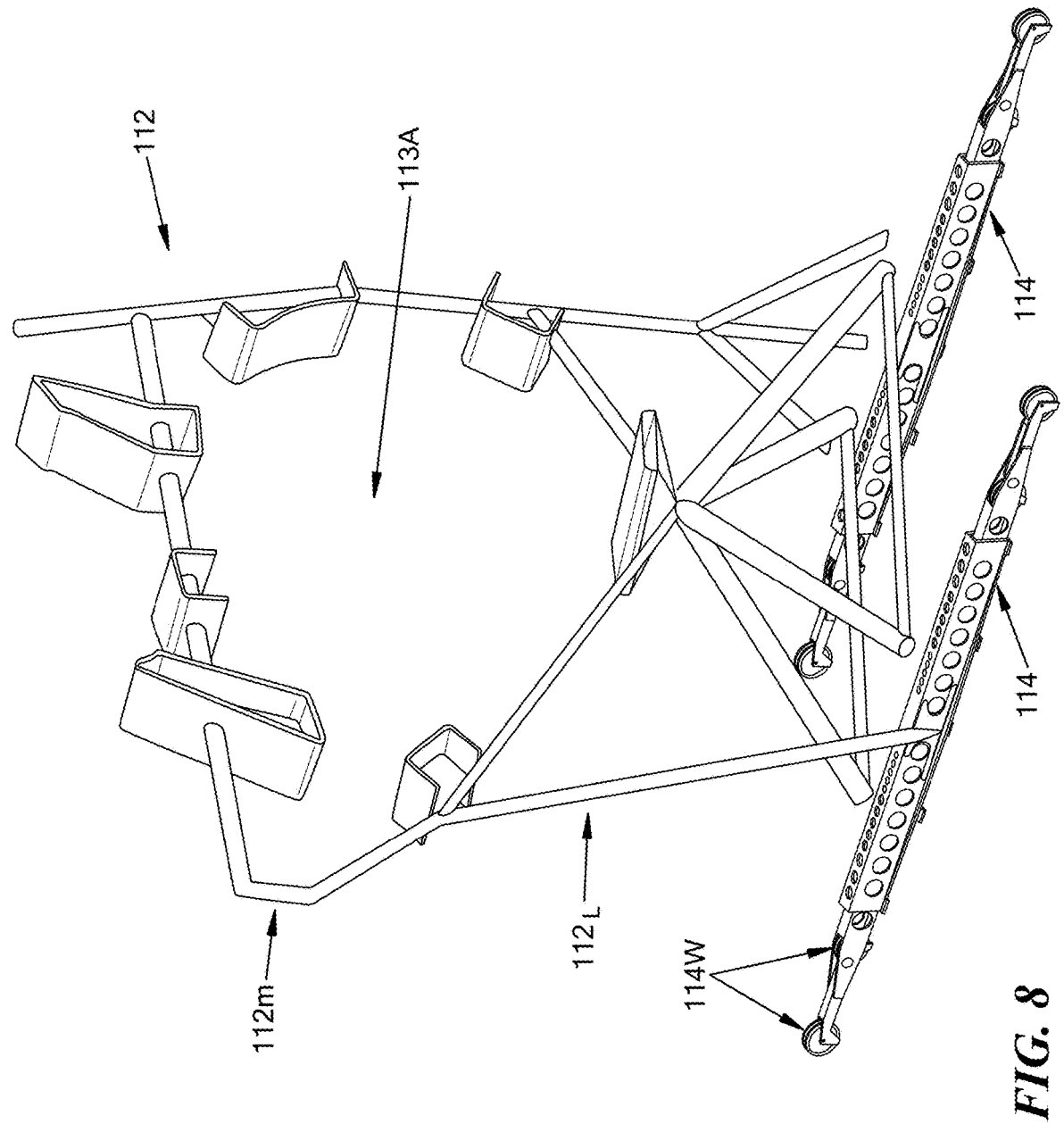
FIG. 8 is an isometric view of one embodiment of a payload-receiving fixture.
Figure 10A:
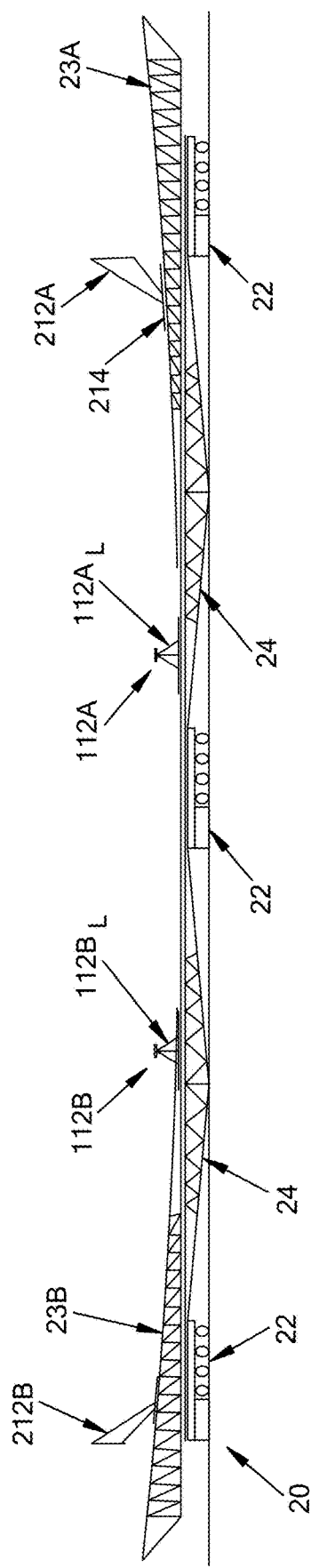
FIG. 10A is a schematic illustration of one step in one embodiment of assembling a payload package onto the transport vehicle of FIG. 5A for loading onto an aircraft.

FIG. 8 illustrates one non-limiting embodiment of a payload-receiving fixture 112 that can be used in accordance with the present disclosure to couple and secure a large cargo, e.g., turbine blades 11A, 11B, within the interior cargo bay 170. While the present disclosure permits the transportation of a wide variety of large (and small for that matter) cargos, in the illustrated embodiment the payload 10 includes two wind turbine blades 11A, 11B. In at least some instances, the payload 10 can be referred to as a package, particularly when multiple objects (e.g., more than one blade, a blade(s) and ballast(s)) are involved, possibly secured together and manipulated together as single unit. A package can involve a single object though. The blades 11A, 11B are restrained in relative position with respect to each other by a plurality of payload-receiving fixtures 12, 112. The payload-receiving fixture illustrated in FIG. 8 can be configured to receive, support, and restrain a mid-section of one or more turbine blades 11A, 11B or other cargo. Accordingly, the payload-receiving fixture 112 of FIG. 8 can be referred to as a mid-span payload-receiving feature 112. The mid-payload receiving feature 112 can have a plurality of fixture components, including a lower component 112L, a mid-component 112M, and an upper component 112U (see FIG. 10I) that can be removably secured to one another, as described in detail below. A first payload-receiving recess 113A can be formed between the lower component 112L and the mid-component 112M of the payload-receiving fixture 112 and can receive a portion of one of the two turbine blades 11A, 11B therein. A second payload-receiving recess 113B (see FIG. 10I) can be formed between the mid-component 112M and the upper-component 112U of the payload-receiving fixture 112 and can receive a portion of the other one of the two turbine blades 11A, 11B therein. Another embodiment of a payload-receiving fixture 12 is a root payload-receiving fixture 212A, as shown in FIGS. 10A and 10C. The root payload-receiving fixture 212A can be configured to receive, support, and restrain a root or hub, e.g., a terminal end, of one or more turbine blades 11A, 11B or other cargo.

Figure 9A:
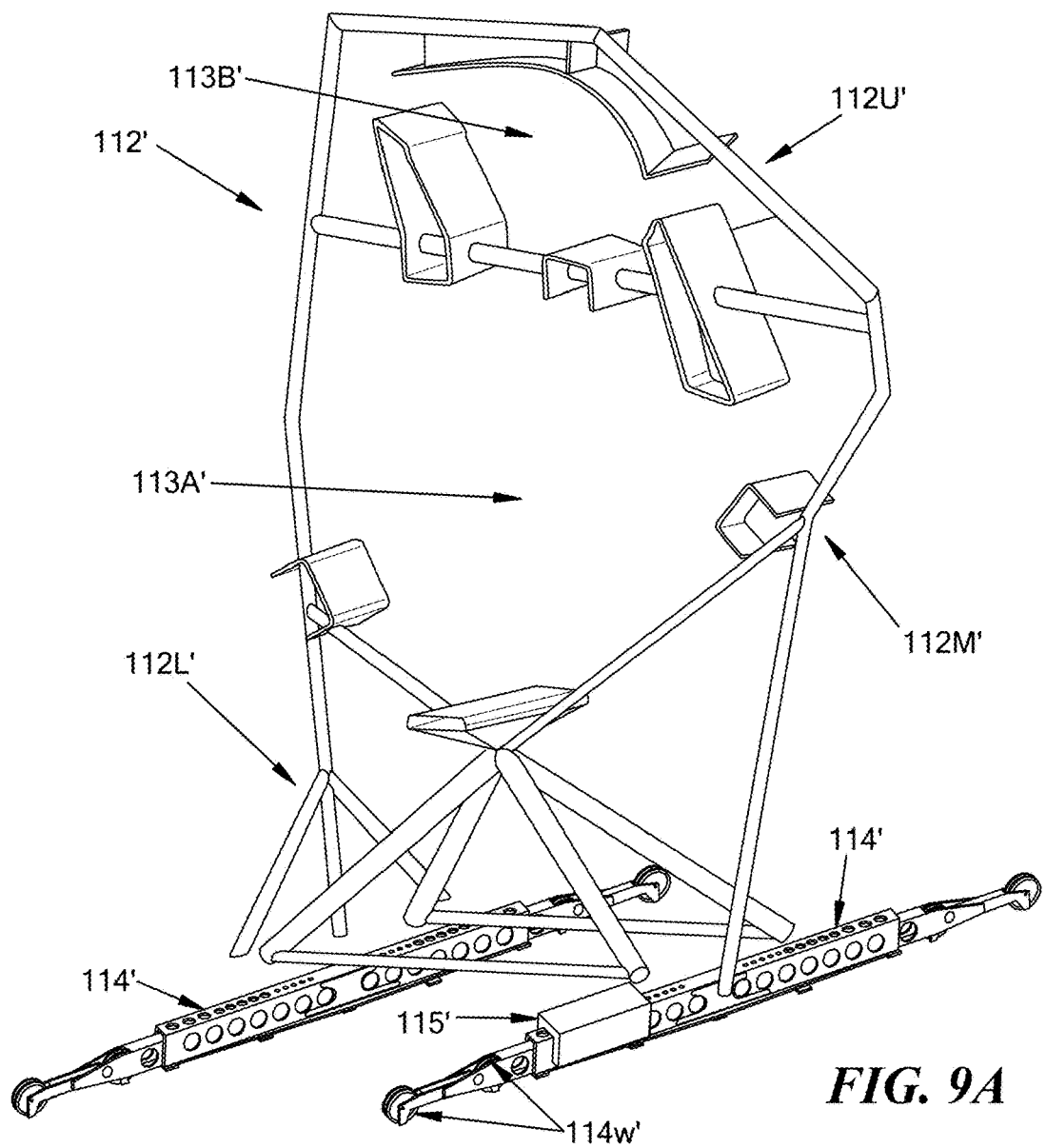
FIG. 9A is a front isometric view of another embodiment of a payload-receiving fixture.
Figure 9B:
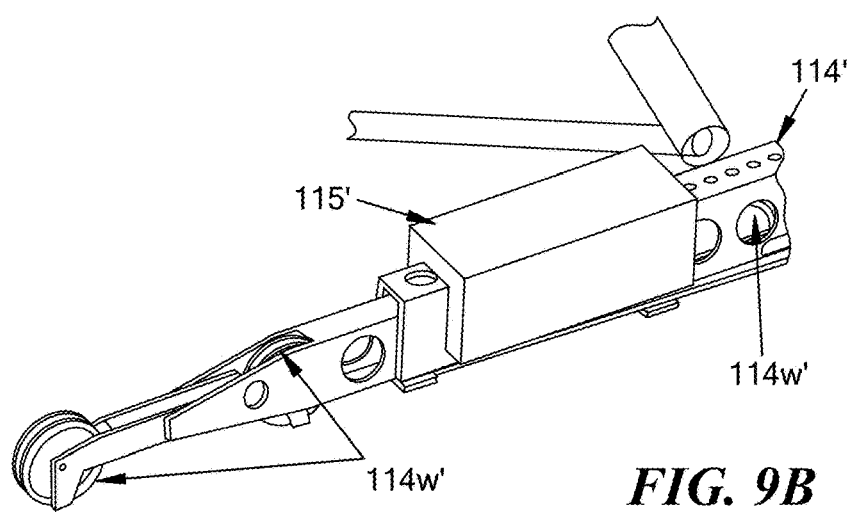
FIG. 9B is an enlarged and detailed isometric view of a ballast disposed on a carriage of the payload-receiving fixture of FIG. 9A.

FIGS. 9A and 9B illustrate a second non-limiting embodiment of a payload-receiving fixture 112' that can be used in accordance with the preset disclosure to couple and secure a large cargo, e.g., turbine blades 11A, 11B, within the interior cargo bay 170. The payload-receiving fixture 112' is similar to the fixture 112 in that it is configured to receive, support, and restrain a mid-section of one or more turbine blades 11A, 11B or other cargo. It includes a plurality of fixture components, including a lower component 112L', a mid-component 112M', and an upper component 112U' that can be removably secured to one another, as described in detail herein. A first payload-receiving recess 113A' can be formed between the lower component 112L' and the mid-component 112M' of the payload-receiving fixture 112' and can receive a portion of one of the two turbine blades 11A, 11B therein. A second payload-receiving recess 113B' can be formed between the mid-component 112M' and the upper-component 112U' of the payload-receiving fixture 112' and can receive a portion of the other one of the two turbine blades 11A, 11B therein. Although not specifically labeled, a person skilled in the art will recognize the various receiving surfaces associated with each of the lower, mid, and upper-components 112L', 112M', 112U' of the fixtures 112, 112'. For example, in FIG. 9A, the lower-component 112L' includes three such surfaces, two on opposed sides and one at the bottom; the mid-component 112M' includes three surfaces, one extending more towards the recess 113A', a second extending more towards the recess 113B', and a third disposed between those two; and the upper-component 112U' includes one such surface, along a top surface, facing towards the recess 113B'. A shown, the surfaces can be configured to be complementary to the surfaces of the payload they receive. Any number and configuration of such surfaces can be used without departing from the spirit of the present disclosure.

Other payload-receiving fixtures, either provided for herein or otherwise derivable in view of the present disclosures, can also be used in conjunction with packaging the blades 11A, 11B (or a payload more generally). Movement of the fixtures 112, 112', 212 along any or all of the support structures 23A, 23B, 27, the rails 174, and/or the transport vehicle 20 can occur by way of carriages 114, 114' (FIG. 9A), respectively, using techniques known to those skilled in the art for securing a large and/or heavy payload (or any payload for that matter, regardless of size or weight) to a truss, rail, or other structure. In other words, each fixture 112, 112', 212 can be removably coupled to any or all of the support structures 23A, 23B, 27, the rails 174, and/or the transport vehicle 20 with a single translational degree of freedom. For example, the carriages 114, 114' can include a plurality of wheels 114w, 114w' that can roll or slide along the rail(s) of the support structures 23A, 23B, 27 to selectively move the payload-receiving fixture 112, 112', 212. The wheels 114w, 114w' can be locked relative to any or all of the support structures 23A, 23B, 27, the rails 174, and/or the transport vehicle 20 such that the payload-receiving fixture 112, 112', 212 and the blades 11A, 11B or other cargo received therein can be held stationary or fixed relative thereto. Further, while the illustrated embodiment provides for two wind turbine blades, any number of wind turbine blades can be used in conjunction with the present disclosure, including but not limited to one blade, three blades, four blades, five blades, six blades, seven blades, eight blades, etc. As more blades are added, the size and weight of the payload may increase and/or the size of the blades may be reduced and/or the size of a cargo bay in which the blades are to be transported may be changed and/or a size of a transport vehicle or system may be changed accordingly.

FIGS. 9A and 9B also illustrate that in some embodiments a ballast 115' can be incorporated into with the payload receiving fixture to adjust a weight and/or a location of a center of gravity for the payload-receiving fixture 112', and thus the payload. In the illustrated embodiment, the ballast 115' is an attachment that can be secured to the carriage 114'. It can be secured using any techniques known to this skilled in the art for creating a mechanical connection between two components. In alternative embodiments, a ballast can be associated with other components of the carriage 114', e.g., the lower, mid, and/or upper components 112L', 112M', and/or 1112U' and/or associated with the payload, e.g., wind turbine blades. More than one ballast can be used if desired. Ballasts can be any variety of shapes, sizes, and made from a variety of materials. Ballasts can be just any weight, but are typically in the hundreds, if not thousands, of pounds to provide a meaningful impact on the weight and/or center of gravity of the payload. Accordingly, ballast can weigh approximately in the range of about 100 pounds to about 5000 pounds. The ballast is primarily used to control CG as it relates to an X-direction or plane, although it may be used to impact other directions or planes too in some contexts.

Additional details about payload-receiving fixtures are provided in commonly-owned International Patent Application No. PCT/US20/49782, filed on Sep. 8, 2020, entitled "SYSTEMS, METHODS, AND VEHICLES FOR TRANSPORTING LARGE CARGO ONTO AND OFF A TRANSPORT VEHICLE," the content of which is incorporated by reference herein in its entirety.

Assembling a Cargo Payload Package

FIGS. 10A-10I illustrate one embodiment of a method of assembling a cargo package or payload 10 in accordance with the present disclosure, e.g., in preparation for loading onto a cargo aircraft. In the illustrated embodiment, the payload 10 includes two turbine blades 11A, 11B, however, the present disclosure is by no means limited to such components. FIG. 10A shows a transport vehicle 20 prepared to receive a payload 10 (see FIG. 10B) for loading into a cargo aircraft, as described above. The transport vehicle 20 can include transporters 22 and trusses 24 extending between the transporters. A forward support structure 23A and a ground support structure 23B can be locked or otherwise secured to the transport vehicle 20, for example, by locking a lower end $23A_L$, $23B_L$ of each support structure to one or more rails 24A, 24B (see FIG. 5B) of the transport vehicle 20.

A plurality of payload-receiving fixtures 212A, 212B, 112A, 112B can be placed on the support structures 23A, 23B and locked or otherwise secured to restrain relative movement between the payload-receiving fixtures and the support structures. In the illustrated embodiment, the plurality of payload-receiving fixtures can include two root payload-receiving fixtures 212A, 212B and two mid-span payload-receiving fixtures 112A, 112B. With respect to the mid-span payload receiving fixtures 112A, 112B, the lower components $112A_L$, $112B_L$ of each mid-span fixture can be present and secured to the forward support structure 23A and ground support structure 23B, respectively, as shown in the configuration of FIG. 10I, i.e., prior to placement of the turbine blades 11A, 11B within the payload-receiving fixtures. The mid-fixture component $112A_M$, $112B_M$ and upper-fixture components $112A_U$, $112B_U$ can be assembled at later steps in the illustrated embodiment. The number, type, and placement of payload-receiving fixtures can vary based on, for example, physical characteristics and handling requirements of a particular cargo. A variety of different payload-receiving fixtures, provided for herein, disclosed in other commonly-owned applications, and/or known to those skilled in the art can be used in conjunction with present disclosures.

Figure 10B:
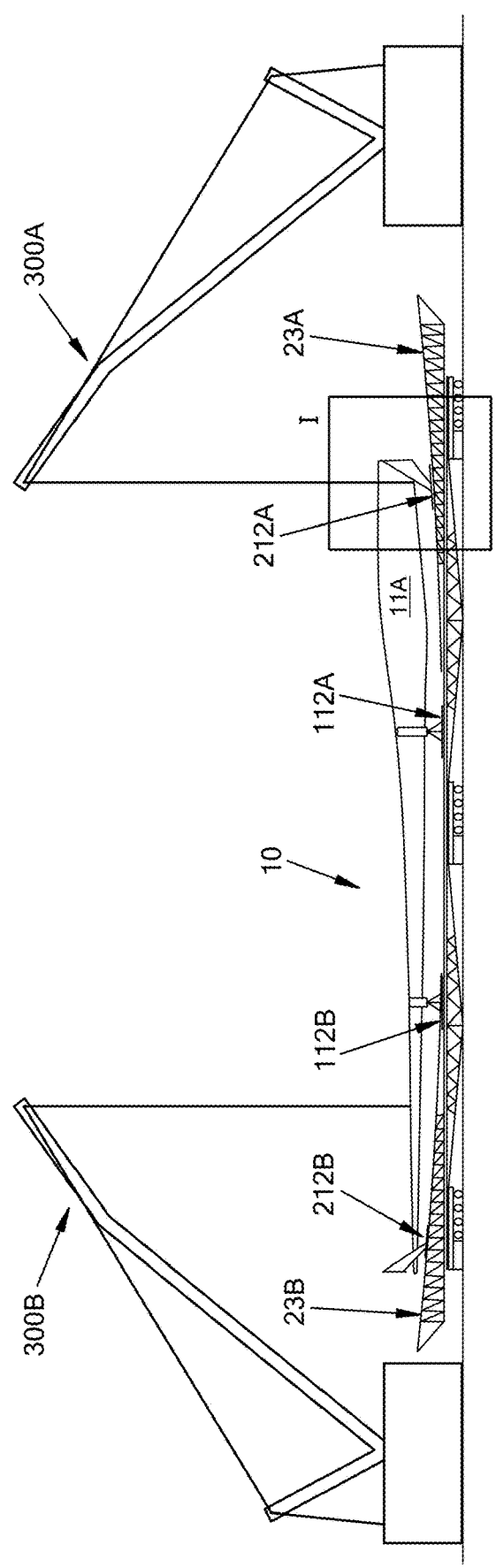
FIG. 10B is a schematic illustration of two cranes lowering a turbine blade for assembly of a payload package onto the transport vehicle of FIG. 10A.
Figure 10C:
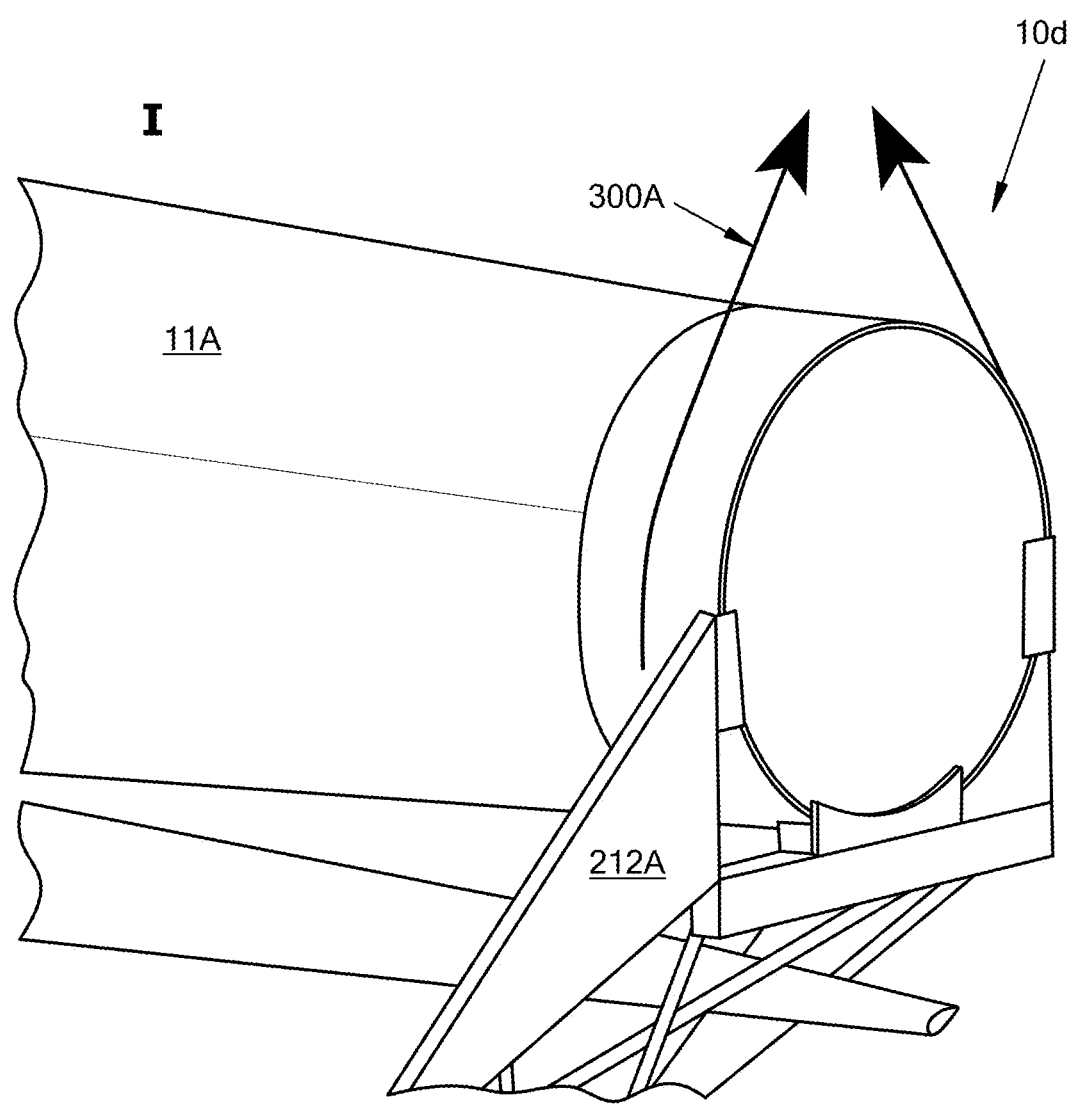
FIG. 10C is an enlarged and detailed isometric view of a payload-receiving fixture and a first turbine blade received therein as shown in Box I of FIG. 10B.

With the payload-receiving fixtures 112A, 112B, 212A, 212B locked to the support structures 23A, 23B, and the support structures 23A, 23B locked to the transport vehicle 20, a turbine blade 11A can be placed within the payload-receiving fixtures as shown in FIG. 10B. It will be appreciated that the discussion pertaining to assembly of the cargo package set forth herein can be applied to instances in which the payload-receiving fixtures and support structures are located remotely from the transport vehicle. In such cases, the support structures, with the payload assembled and coupled thereto, can be moved as a single unit and loaded onto the transport vehicle. The turbine blade 11A can be lowered into one or more of the payload-receiving fixtures 112A, 112B, 212A, 212B, for example by one or more cranes 300A, 300B or other appropriate means, and secured within the one or more payload-receiving fixtures. For example, a root of the blade 11A can be secured to the root payload-receiving fixture 212A that is coupled and secured to the forward support structure 23A, as shown in FIGS. 10B and 10C. The root of the blade 11A can be secured with respect to the root payload-receiving fixture 212A using any techniques known to those skilled in the art, such as passing fasteners (e.g., screws) into and through pre-formed holes disposed around an opening of the fixture 212A that receives the root of the blade 11A. The turbine blade 11A can extend through and be secured to at least one of mid-span payload-receiving fixtures 112A, 112B. The turbine blade 11A can extend through and be secured to at least the mid-span payload-receiving fixture 112B that is coupled and secured to the ground support structure 23B. The embodiment of the cargo package assembly process illustrated in FIGS. 10A-10I can utilize two cranes 300A, 300B to perform various steps as described herein. In some figures, only one crane is shown for sake of simplicity, and one skilled in the art will appreciate that the second crane may remain present and may operate in a similar fashion. Any number of cranes can be used and re-used through the cargo package assembly process, including a different crane for each loading step or the same crane across multiple steps.

Figure 10D:
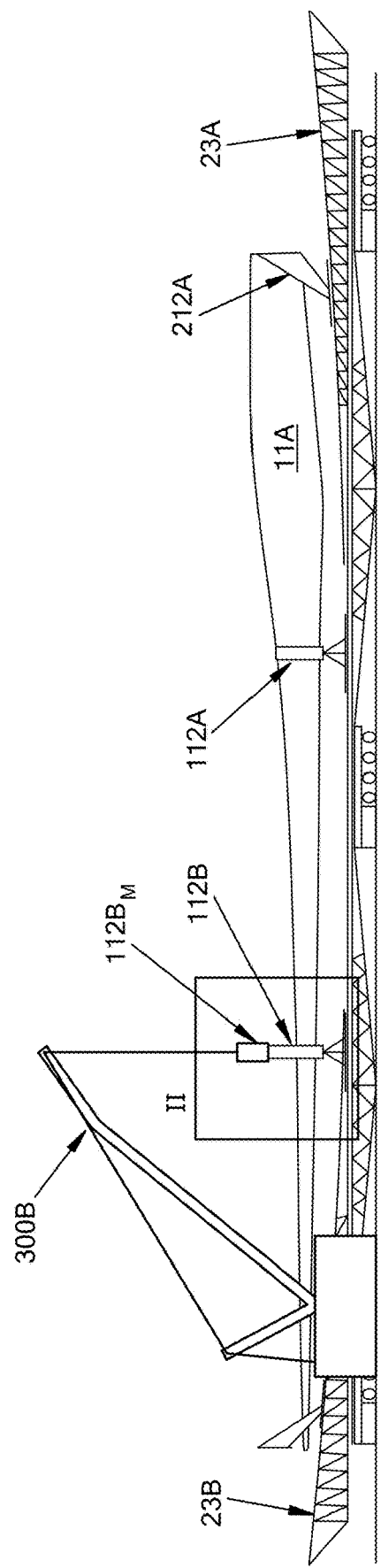
FIG. 10D is a schematic illustration of one of the cranes of FIG. 10B lowering a middle-component of a mid-span payload receiving fixture to become part of the payload package of FIG. 10B.
Figure 10E:
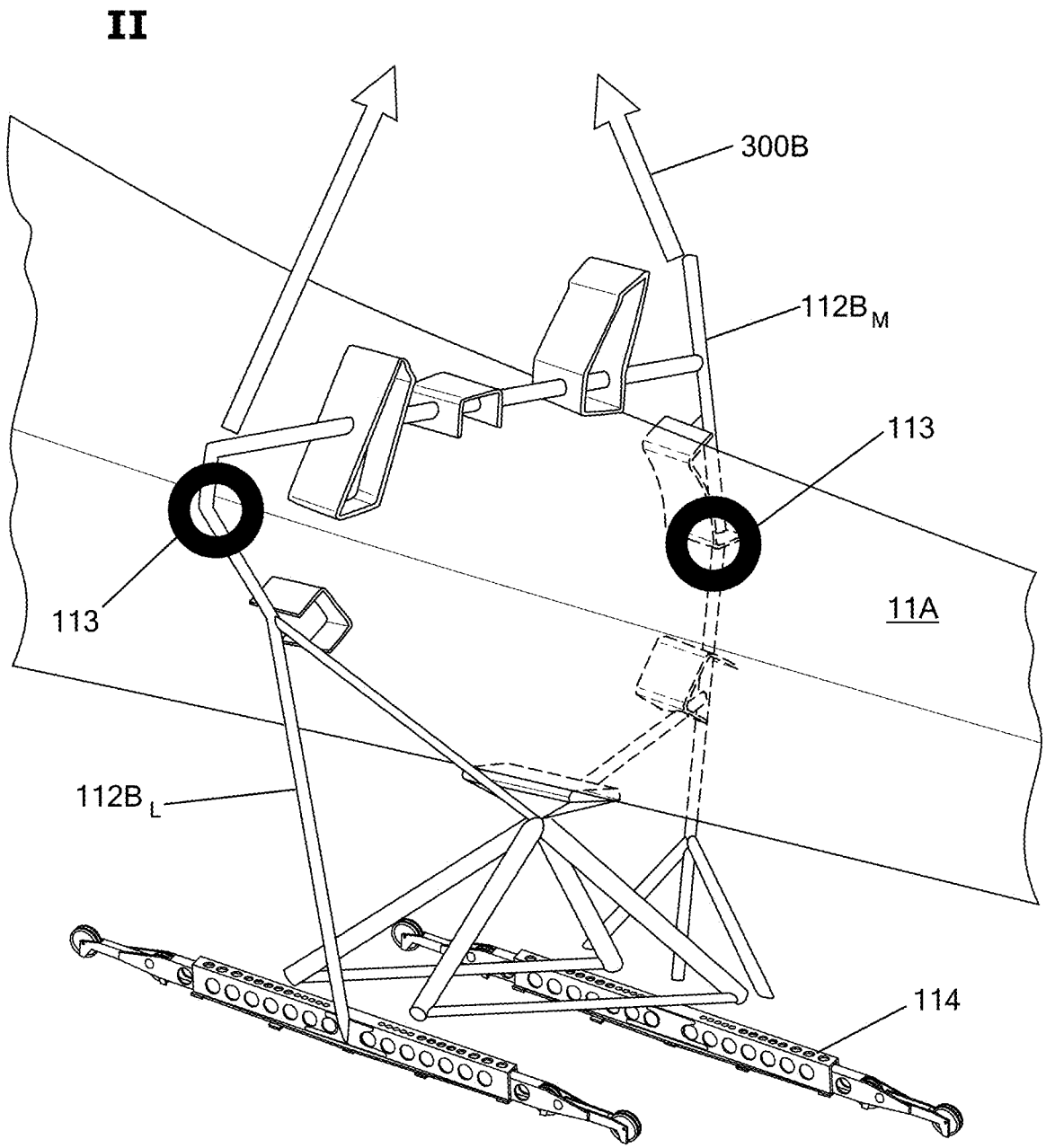
FIG. 10E is an enlarged and detailed isometric view of the crane lowering the middle-component of the mid-span payload receiving fixture as shown in Box II of FIG. 10D.

As shown in FIGS. 10D and 10E, the mid-fixture component $112B_M$ of the mid-span payload-receiving fixture 112B can be connected to the lower-fixture component $112B_L$ to secure the turbine blade 11A received within the lower-fixture component. For example, the mid-fixture component $112B_M$ can be lowered towards the blade 11A and lower-fixture component $112B_L$ and secured thereto. FIG. 10E shows in greater detail the mid-fixture component $112B_M$ lowered in by the crane 300B such that the mid-fixture component is located above the turbine blade 11A in alignment with the lower-fixture component $112B_L$. The mid-fixture component $112B_M$ can couple to the lower-fixture component $112B_L$, for example at coupling locations 113 located on either side of the turbine blade 11A, such that the turbine blade 11A is held securely within the mid-span payload-receiving fixture 112B between the lower-fixture component $112B_L$ and the mid-fixture component $112B_M$.

Figure 10F:
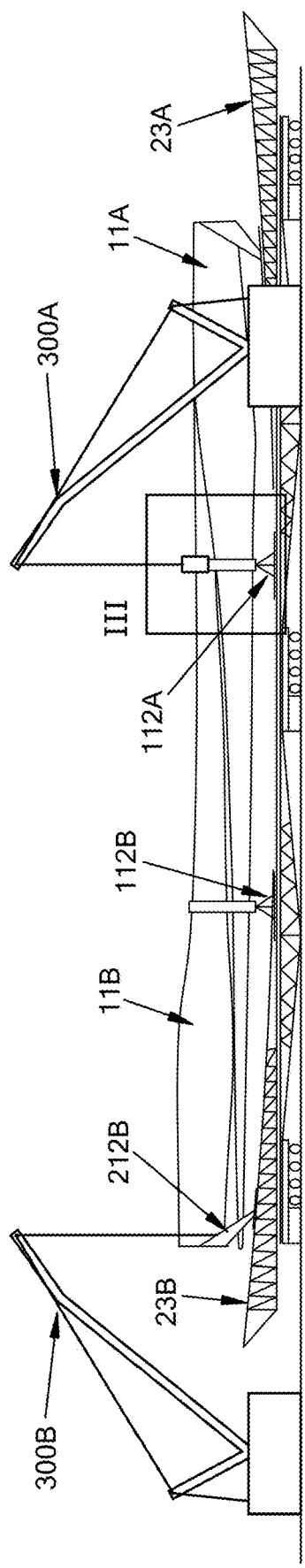
FIG. 10F is a schematic illustration of the two cranes of FIG. 10B lowering a second turbine blade for assembly of a payload package.
Figure 10G:
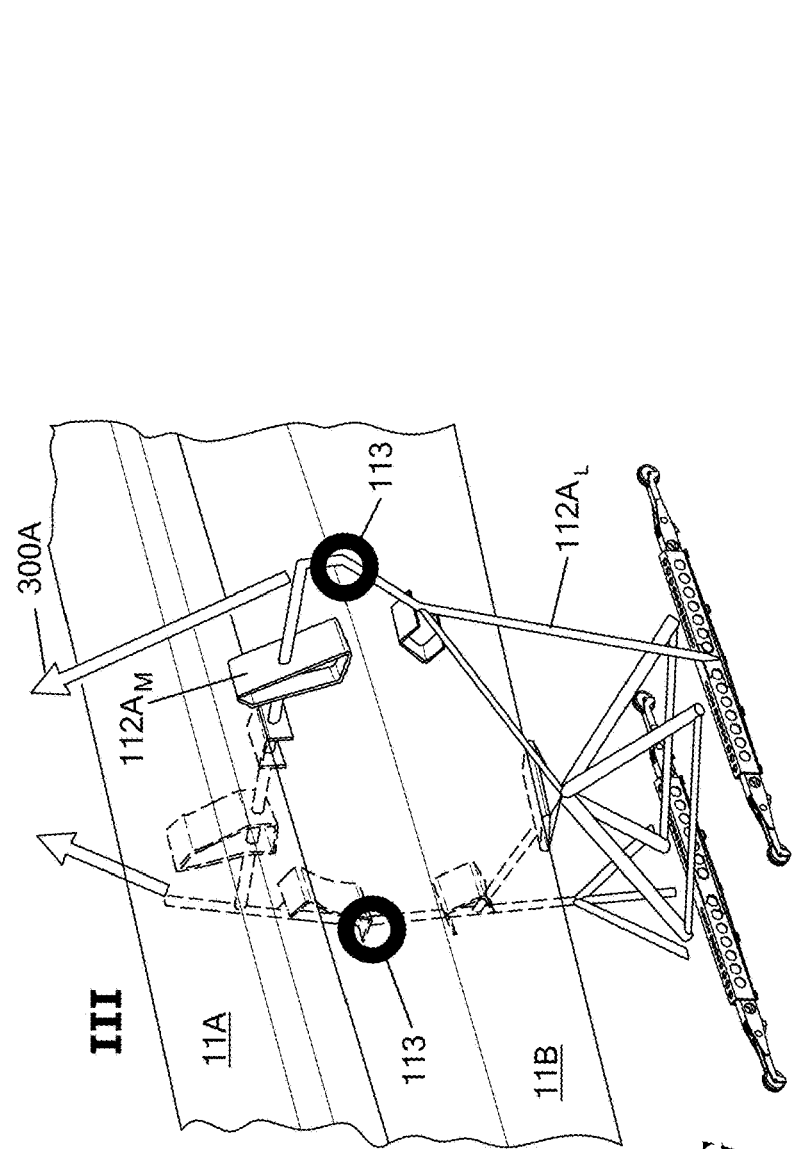
FIG. 10G is an enlarged and detailed isometric view of the mid-span payload-receiving fixture of FIG. 10C with the second turbine blade received therein as shown in Box III of FIG. 10F.
Figure 10H:
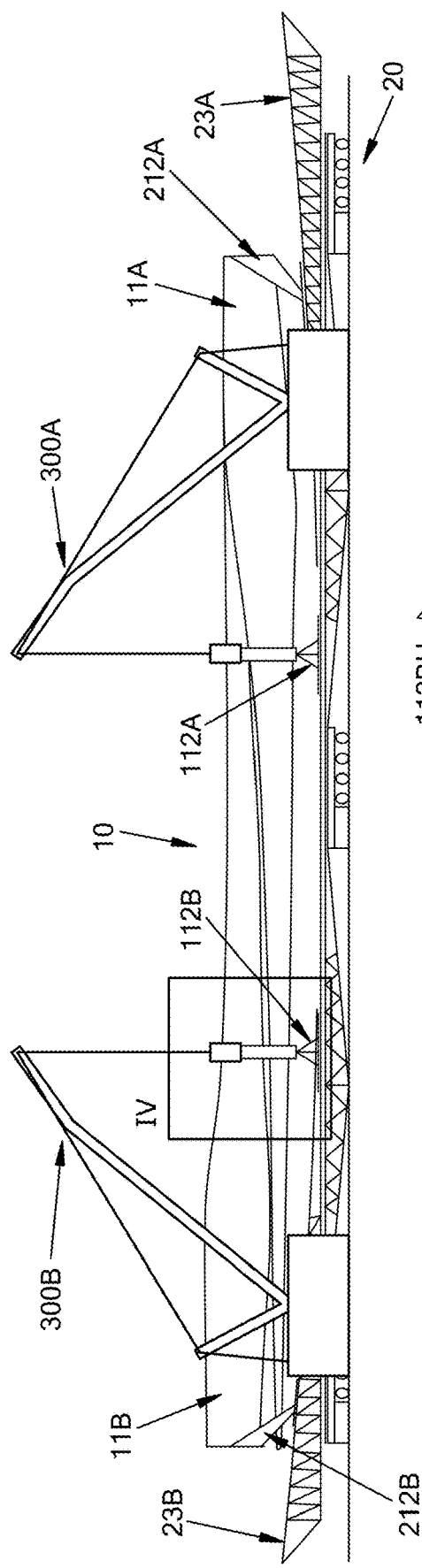
FIG. 10H is a schematic illustration of the two cranes of FIG. 10F lowering upper components of two mid-span payload receiving fixtures.
Figure 10I:
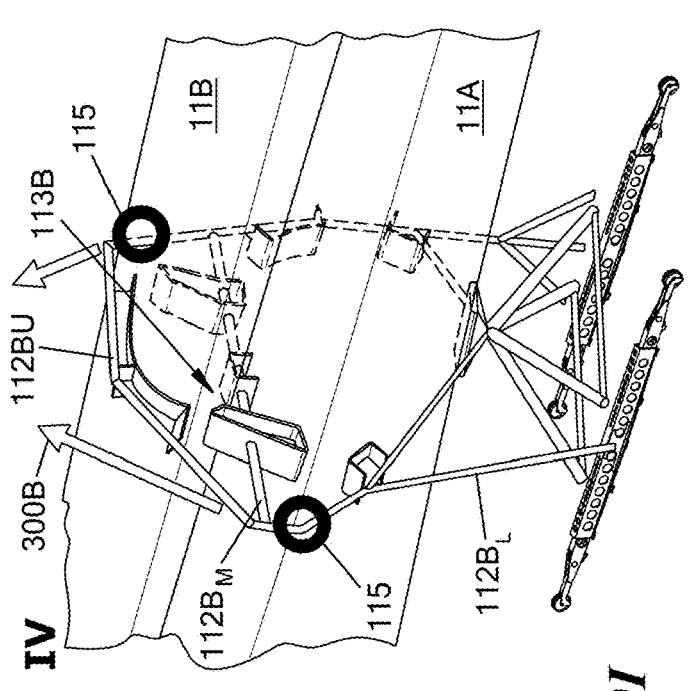
FIG. 10I is an enlarged and detailed isometric view of one of the two cranes lowering one of the two upper components of the mid-span payload receiving feature of FIG. 10D, as shown in Box IV of FIG. 10H.

A similar series of steps can be performed to assemble the second turbine blade 11B to be part of the payload 10 and load the payload 10 onto the transport vehicle 20. As shown in FIG. 10F, the second turbine blade 11B can be lowered by the cranes 300A, 300B and placed within one or more of the payload-receiving fixtures. In the illustrated embodiment, a root of the turbine blade 11B can be placed within the root payload-receiving fixture 212B secured to the ground support structure 23B. The root of the turbine blade 11B can be secured therein. A portion of the turbine blade 11B can also be received within the mid-span payload receiving fixtures 112A, 112B. For example, the turbine blade 11B can be lowered or otherwise placed on the lower-fixture component $112A_L$ of the mid-span payload receiving fixture 112A secured to the forward support structure 23A (see FIG. 10G), and can be lowered or otherwise placed on the mid-fixture component $112B_M$ of the payload-receiving fixture 112B secured to the ground support structure 23B (see FIG. 10I). As described above with respect to FIGS. 10D and 10E, the mid-fixture component $112A_M$ of the payload-receiving fixture 112 can be lowered and secured to the lower-fixture component $112A_L$ such that the turbine blade 11B is received therebetween. The upper-fixture components $112A_U$, $112B_U$ for each of the mid-span payload receiving fixtures 112A, 112B can be lowered onto the mid-fixture components $112A_M$, $112B_M$, e.g., by the cranes 300A, 300B, as shown in FIG. 10H. FIG. 10I illustrates in greater detail the mid-span payload-receiving fixture 112B that is secured to the ground support structure 23B (not shown in FIG. 10I for illustrative purposes). More particularly, the crane 300B can lower the upper-fixture component $112B_U$ such that the turbine blade 11B is located between the upper-fixture component $112B_U$ and the mid-fixture components $112B_M$ of the payload-receiving fixture 112B. The upper-fixture component $112B_U$ can be coupled to the mid-fixture component $112B_M$ at one or more coupling locations 115 such that the turbine blade 11B is securely received therebetween.

While not shown, a similar process can be applied to the mid-span payload-receiving fixture 112A that is secured to the forward support structure 23A. In this manner, the turbine blades 11A, 11B can be securely received within the payload-receiving fixtures 112A, 112B, 212A, 212B and coupled to the support structures 23A, 23B and thus, the transport vehicle 20. The cranes 300A, 300B can be retracted or otherwise moved away from the payload package 10, which in this illustrated embodiment includes the turbine blades 11A, 11B and the payload-receiving fixtures 112A, 112B, 212A, 212B, support structures 23A, 23B, transport vehicle 10 such that the assembled payload package is ready for transport to an aircraft for loading (see FIG. 5A).

Types of Payloads to be Loaded onto Aircraft and Payload Profiles

As noted in the present application, a variety of different payloads can be used in conjunction with the present disclosures. This can include different types of payloads on a macro-scale, such as wind turbine blades, industrial oil equipment, mining equipment, rockets, military equipment and vehicles, defense hardware, commercial aerospace vehicles, crane segments, aircraft components, space launch rocket boosters, helicopters, generators, and/or hyperloop tubes, and different types of payloads on a micro-scale, i.e., subcategories of components associated with those various examples (e.g., different types of wind turbine blades and/or towers for wind turbine blades or various types of drilling equipment, and components thereof, for industrial oil equipment). The types of payloads on both a macro and micro-scale can have distinct payload profiles on a "per type" basis. The payload profile provides relevant information about the payload that can inform and/or guide the assembly and loading of the payload for transport. Accordingly, a payload profile for wind turbine blades will have at least some differences as compared to a payload profile for industrial oil equipment, and a payload profile for one type (size, shape, configuration, purpose, etc.) of wind turbine blade may have at least some difference as compared to a payload profile for another type of wind turbine blade.

The foregoing notwithstanding, some relevant aspects or parameters of a payload profile that can be common across different payload types on a macro-scale can include: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, and/or information regarding which pre-formed marking or markings of the one or more pre-formed markings to use in conjunction with the payload. Any combination of these parameters, including but not limited to a single parameter, can constitute the payload profile for a given payload. Accordingly, the payload profile, the payload comprising one or more components, may include one of these parameters, two of these parameters, three of these parameters, or more. A person skilled in the art will likewise recognize other data, information, parameters, etc. that can be included as part of a payload profile without departing from the spirit of the present disclosure.

More particular to wind turbine blades, some relevant aspects or parameters of a payload profile that can be common across different wind turbine blades types (i.e., different payload types on a micro-scale) can include: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package. Any combination of these parameters, including but not limited to a single parameter, can constitute the payload profile for a given wind turbine blade payload. Accordingly, the payload profile for a wind turbine blade, or package of wind turbine blades, may include one of these parameters, two of these parameters, three of these parameters, or more. A person skilled in the art will likewise recognize other data, information, parameters, etc. that can be included as part of a payload profile for a wind turbine blade without departing from the spirit of the present disclosure. Further, a person skilled in the art, in view of the present disclosures, can determine relevant aspects or parameters of other types of macro-scale payloads on a micro-scale (i.e., the types of parameters specific to a particular macro-scale type of payload, such as industrial oil equipment, mining equipment, etc.).

FIG. 11 illustrates one, non-limiting exemplary embodiment of a partial payload profile 1000 for different wind turbine blade packages 1010, 1020, and 1030. The profile 1000 includes a net weight 1002 of the package and a loaded center of gravity 1004 of the package. The loaded center of gravity 1004 relates to where the package CG is located at when secured aboard with fixtures at the locations defined by a load at aircraft datum 1044 (described below). The loaded center of gravity 1004 is used in calculations of total aircraft CG needed for safe flight. As noted above, other non-limiting aspects of the payload profile include but are not limited to a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package.

As shown in the "Cargo Type" row, the first wind turbine blade package 1010 includes two wind turbine blades, designated as 95-WRA and 95-WRB from the company XYZ Inc. The 95 can designate a length of the wind turbine blade, so 95 meters. A profile 1010p of the package 1010 can include the information in the "Cargo Type" cell (i.e., the number and type of blades), as well as the "Net Weight," listed at 123,456 pounds, and the "Loaded CG," listed as FS (fuselage station, based on a fore-aft location coordinate) 2575 inches. Similarly, the second wind turbine blade package 1020 includes two wind turbine blades, designated as 95-WRC and 95-WRD from the company XYZ Inc., with the 95 possibly being indicative of a length of the wind turbine blades. A profile 1020p of the package 1020 can likewise include the information in the "Cargo Type" cell (i.e., the number and type of blades), as well as the "Net Weight," listed at 123,345 pounds, and the "Loaded CG," listed as FS 2580 inches. Further, the third wind turbine blade package 1030 includes two wind turbine blades, designated as 95-WRE and 95-WRF from the company XYZ Inc., with the 95 possibly being indicative of a length of the wind turbine blades. A profile 1030p of the package 1030 can likewise include the information in the "Cargo Type" cell (i.e., the number and type of blades), as well as the "Net Weight," listed at 123,567 pounds, and the "Loaded CG," listed as FS 2575 inches.

The partial profile 1000 also includes information about various types of payload-receiving fixtures, a payload-receiving profile 1040. In some instances, this information may be provided in a different profile, such as a profile designated solely for different types of payload-receiving fixtures, but in the illustrated embodiment they are identified in the same partial profile 1000. Each row 1050, 1060, 1070, and 1080 provides parameters related to a different payload-receiving fixture, identified as a "Forward Root Fixture" for a terminal end fixture to be used closest to a nose of the aircraft, a "Forward Mid Fixture" for a middle fixture that is closer to the forward end of the payload than the aft end, a "Aft Mid Fixture" for a middle fixture that is closer to the aft end of the payload than the forward end, and an "Aft Fixture" for a terminal end fixture to be used closest to an aft end of the aircraft. The profile 1040 includes a style 1042 of the payload-receiving fixture and an aircraft datum 1044 of the payload-receiving fixture, the latter of which is identified in the table as a "load at aircraft datum." The aircraft datum 1044 is a coordinate used to define locations along the length of the aircraft, with origin at or ahead of the aircraft nose and becoming more positive in the aft direction. That is, the aircraft datum 1044 provides a location at which the specific payload-receiving fixture is to be loaded, i.e., installed, in conjunction with loading the payload onto the aircraft.

As shown in row 1050, the "Forward Root Fixture" utilizes a payload-receiving fixture style designated as "Style A" and is to be loaded at the aircraft datum FS 700 inches. Row 1060 is for the "Forward Mid Fixture," which utilizes a payload-receiving fixture style designated as "Style FM1" (the "AM" designating the fixture as a "forward mid" type fixture and the "1" possibly indicating that there are other styles, such as 2, 3, 4, 5, etc. and/or providing information about how the fixture is to be oriented with respect to the payload, i.e., facing forward or backwards) and is to be loaded at the aircraft datum FS 2000 inches. Row 1070 is for the "Aft Mid Fixture," which utilizes a payload-receiving fixture style designated as "Style AM1" (the "AM" designating the fixture as an "aft mid" type fixture and the "5" possibly indicating that there are other styles, such as 1, 2, 3, 4, 6, etc. and/or providing information about how the fixture is to be oriented with respect to the payload, i.e., facing forward or backwards) and is to be loaded at the aircraft datum FS 2000 inches. Row 1080 is for the "Aft Fixture," which utilizes a payload-receiving fixture style designated as "Style Z" (the "Z" designating an aft terminal end as opposed to the "A," which can designate a forward terminal end) and is to be loaded at the aircraft datum FS 4400 inches.

In practice, the profile 1040 may include multiple types, or "styles," of each fixture. Further, the information from this profile 1040 can be incorporated, at least in part, to each turbine blade package column such that each package has designated payload-receiving fixture styles. By way of non-limiting example, the profile 1020p can identify the payload receiving fixtures with which it can be used as the fixtures designated by Rows 1050, 1060, 1070, and 1080, while the profile 1030p can identify the payload receiving fixture with which it can be used as the fixtures designated by Rows 1050, 1080, and then one or more other mid fixtures not presently illustrated on the profile 1040. In other words, the payload profiles of the payloads (e.g., for each blade, or combination of blades, in a micro-scale) can impact the selection of payload-receiving fixtures. Accordingly, the placement of the payload, with the payload-receiving fixtures incorporated therewith, in the cargo bay can be impacted by the various data/parameters provided for in the profile 1000. In turn, this can impact the designated location at which the payload is placed in the cargo bay, and thus the pre-formed marking(s) used to position the payload. Additional details about the configurations of the interior cargo bay, and the placement of a payload therein, are provided below.

Figure 12A:
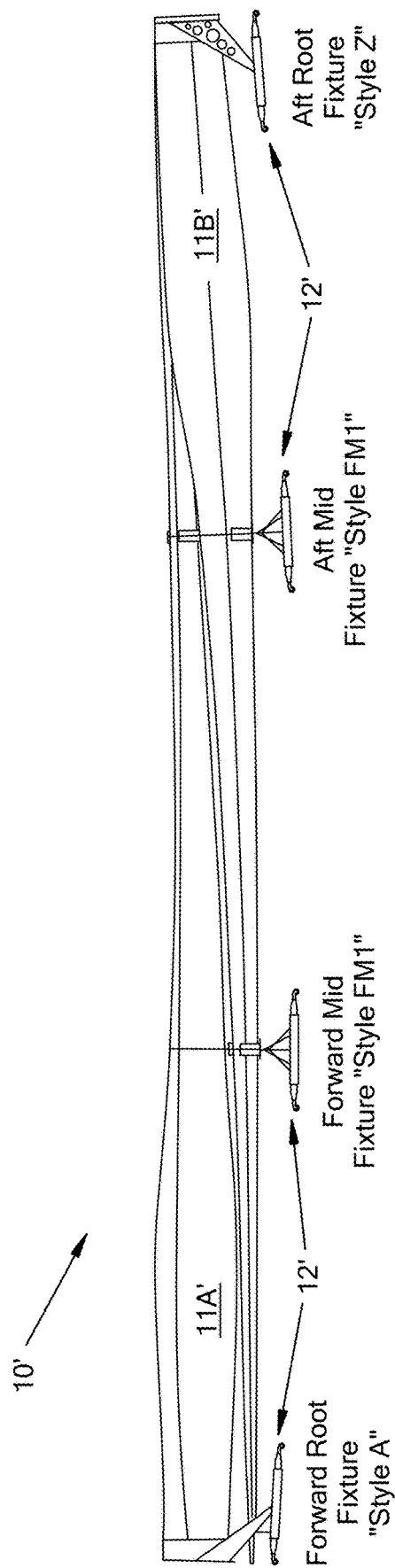
FIG. 12A is a schematic front view of one exemplary embodiment of a payload having a plurality of payload-receiving fixtures associated therewith, at least one of the payload-receiving fixtures including the payload-receiving fixture of FIG. 9A.
Figure 12B:
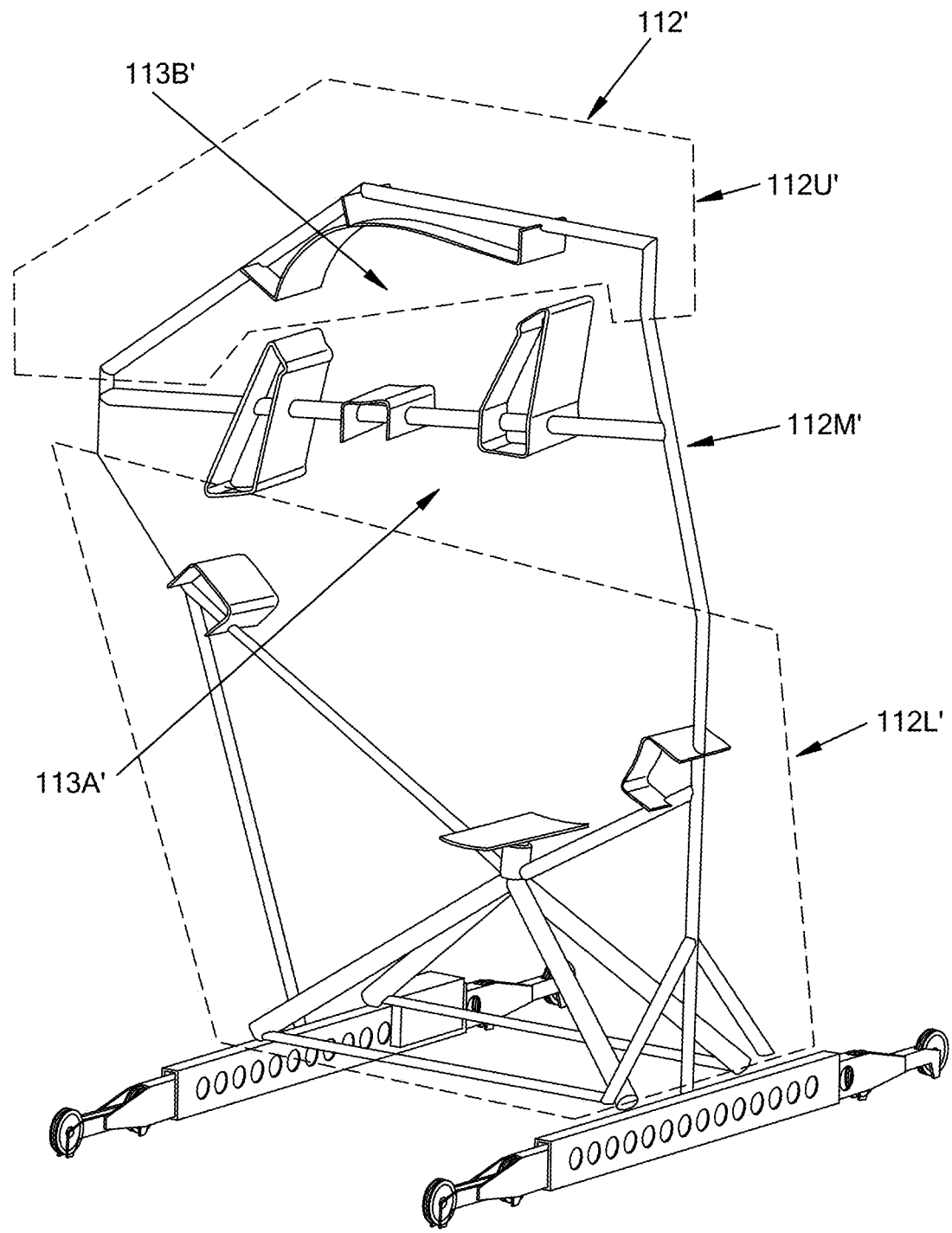
FIG. 12B is rear isometric view of the payload-receiving fixture of FIGS. 9A and 12A.

FIG. 12A illustrates a payload 10' having blades 11A', 11B' secured within four payload receiving fixtures 12'—the four types of payload receiving fixtures identified in the profile 1040: Style A, Style FM1, Style AMS, and Style Z. The various components of the Aft Mid Fixture, identified as the Fixture 112' in FIG. 9A and FIG. 12B, are shown to provide some additional detail and context to the FIG. 12A illustration. The recesses 113A' and 113B' can be configured to receive the lower blade 11B and the upper blade 11A, respectively, illustrated in FIG. 12A. The fixture installation locations for each blade is provided for in more specific "Load at Blade Datum" columns of FIG. 12C—as shown an upper blade datum 1044a of the payload-receiving fixture and a lower blade datum 1044b. The identified upper blade datums for the forward root fixture, forward mid fixture, aft mid fixture and aft fixture are STA (station, based on a spanwise blade location coordinate, distinguishing a local blade coordinate from the broader aircraft coordinate frame that uses FS) 0020 inches, STA 1000 inches, STA 2220 inches, and STA 3033 inches, respectively, and the identified lower blade datums for the same four fixtures are STA 3033 inches, STA 2220 inches, STA 1000 inches, and STA 0020 inches, respectively. Although in the illustrated instance the loading datums are reversed for the two columns because in this example two blades are carried in a mutually reversed "root-to-tip" orientation, that may not always be the case.

Features to Allow for Efficient Packaging of Cargo

Efficiency in assembly and packaging can be further enhanced by incorporating features into the payload itself that make it easier to identify how and with what payload-receiving fixtures the payload should be used. This can be accomplished, for example by a label or other indicator (e.g., visual, electronic, scannable, etc.) that can provide relevant information related to that payload, including but not limited to payload profile information. Each payload, or portion/component thereof, can include a unique code associated with it. Alternatively, or additionally, the unique code can be associated with one or more payload-receiving fixtures, such code being relevant to the fixture itself and/or the payload(s) with which it is designated to be used. Further alternatively, or additionally to a unique code, a parameter of the payload, portion/component thereof, and/or the payload-receiving fixture, can be indicated or otherwise identifiable. Identification can occur visually, by scan, electronically, etc. In some embodiments, RFID tags (one non-limiting example of a non-visual recognition feature), bar codes, and/or QR codes, among other similar indicators, can be utilized for proper identification of the payload, and it associated payload profile and/or identification of a payload-receiving fixture and/or its related profile information.

Figure 13A:
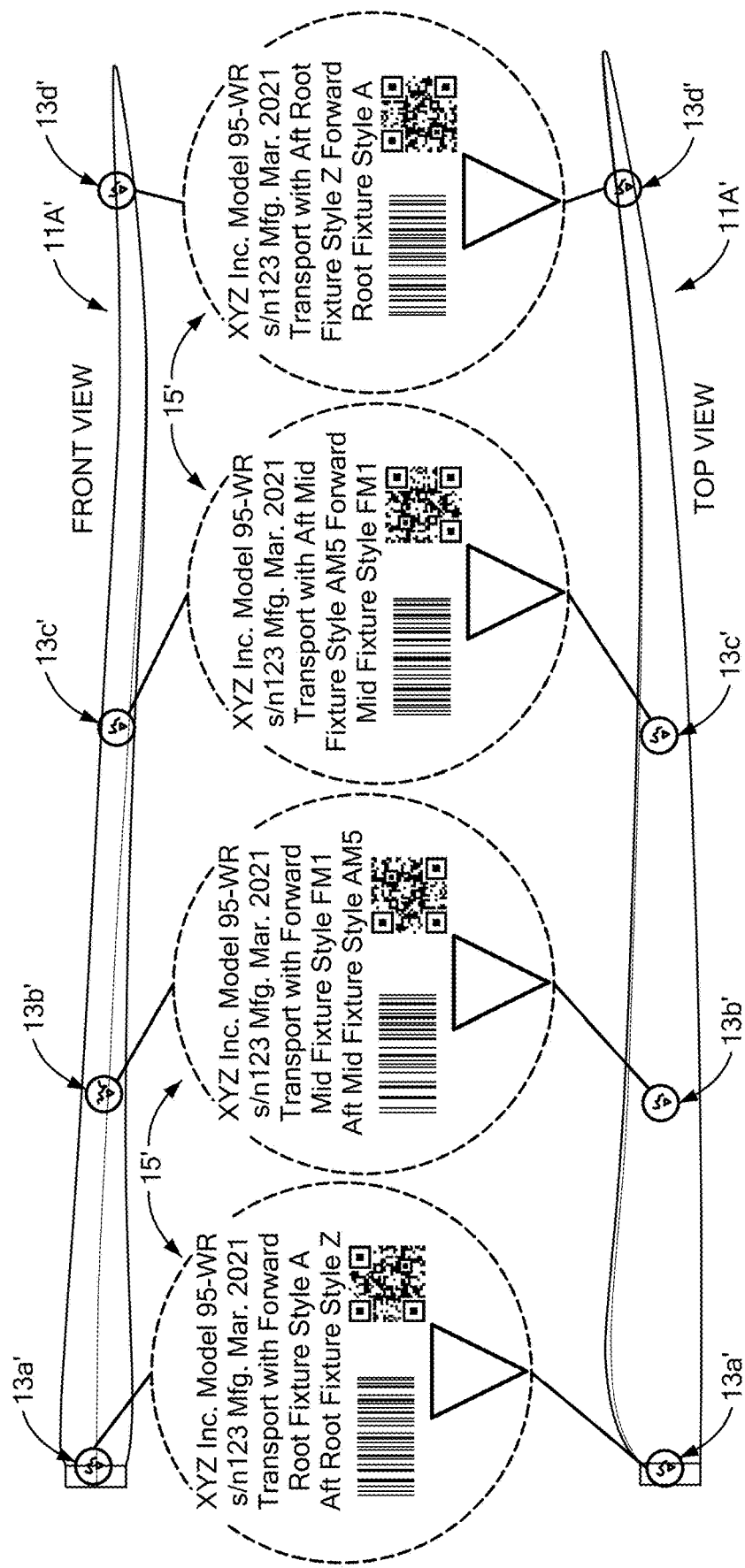
FIG. 13A is a schematic front view and a schematic top view of one exemplary embodiment of a wind turbine blade from the payload of FIG. 12A, further illustrating exemplary embodiments of payload-receiving fixture indicators associated with the wind turbine blade.

FIG. 13A illustrates one exemplary embodiment of the blade 11A' having a plurality of indicators 13a', 13b', 13c', 13d' disposed therein. Any technique for labeling or otherwise providing information on an object can be utilized, including but not limited to various forms of printing, sticking, etching, embossing, engraving, stenciling, etc. The details provided in the dotted circles 15' of FIG. 13A provide non-limiting examples of the way the indicators or other relevant information can be presented. For example, the indicators 13a', 13b', 13c', 13d' may only be the illustrated bar code or QR code (or both), and scanning those codes can yield some of the other information provided for in the dotted circles 15', such as the blade type and payload-receiving fixture to be used at each designated location along the blade 11A' in machine-readable form. The indicators 13a', 13b', 13c', 13d' themselves can be indicative of a location where the payload-receiving fixtures are to be placed. These locations can be further designated, for example, by providing for complementary fittings (e.g., grooves or holes) that allow the payload-receiving fixtures to complementary mate at specific locations with respect to the blade 11A'. Alternatively, the indicators 13a', 13b', 13c', 13d' may be proximate but not at the location for receiving the payload-receiving fixtures, but complementary fittings may be used to help designate a location at which the payload-receiving fixture is to be positioned along a length of the blade 11A'. Still further alternatively, the indicators 13a', 13b', 13c', 13d' may be placed anywhere along the length of the blade 11A', or even be separate from but associated with the blade 11A' (e.g., a tag attached to the blade 11A'). In some embodiments, the indicators 13a', 13b', 13c', 13d' can be consolidated into a single indicator that provides the relevant information to know which payload-receiving fixtures to use for packaging the payload and/or locations for placing the payload-receiving fixtures, among other information that may be provided as part of the payload profile.

In some embodiments, the indicators 13a', 13b', 13c', 13d' may be, or may include, sensors. The sensors can communicate with the payload, and/or any tool, system, etc. being used to move the payload into the cargo bay 170, to designate once a designated location for that payload, payload-receiving fixture, etc. has been reached. By way of nonlimiting examples, linear position sensors, such as linear variable differential transformers (LVDTs), and rotary position sensors, such as rotary variable differential transformers (RVDTs), can be used associated with the payload. The LVDTs and/or RVDTs can feed out data as the payload is moved into the cargo bay 170. By way of further non-limiting examples, gauges having geared teeth can be associated with the payload such that the gauges roll along the rails 174 and provide sensory feedback as the payload is moved into the cargo bay 170. By way of still further non-limiting examples, laser projections associated with the payload can be used to gauge position of the payload as it is moved into the cargo bay 170. Such laser projections can be used in conjunction with pre-formed markings in the fuselage and/or sensors in the fuselage.

Figure 13B:
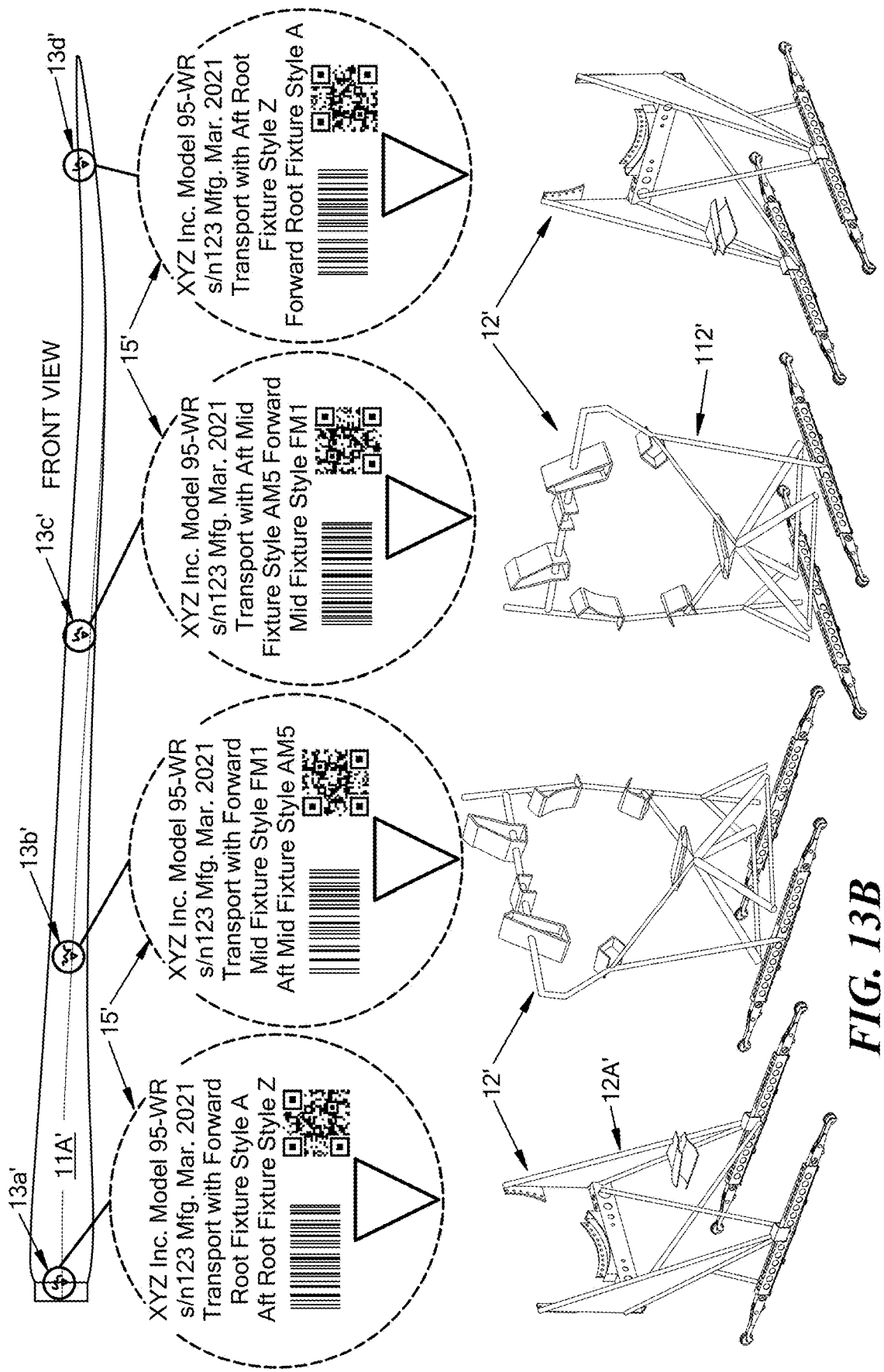
FIG. 13B is the schematic front view of the wind turbine blade and payload-receiving fixture indicators of FIG. 13A, further illustrating exemplary payload-receiving fixtures identified by the payload-receiving fixture indicators, including the payload-receiving fixture of FIG. 8 and the payload-receiving fixture of FIGS. 9A and 12A, but without the ballast.

The respective payload-receiving fixtures 12' that can be used in view of the indicators 13a', 13b', 13c', 13d' are illustrated in FIG. 13B. These payload-receiving fixtures 12' include a payload receiving fixture 12A', and the payload receiving fixture 112', as shown. Additional details about such fixtures are provided for herein or in commonly-owned applications incorporated by reference herein, and thus further description of the same is unnecessary.

Figure 13C:
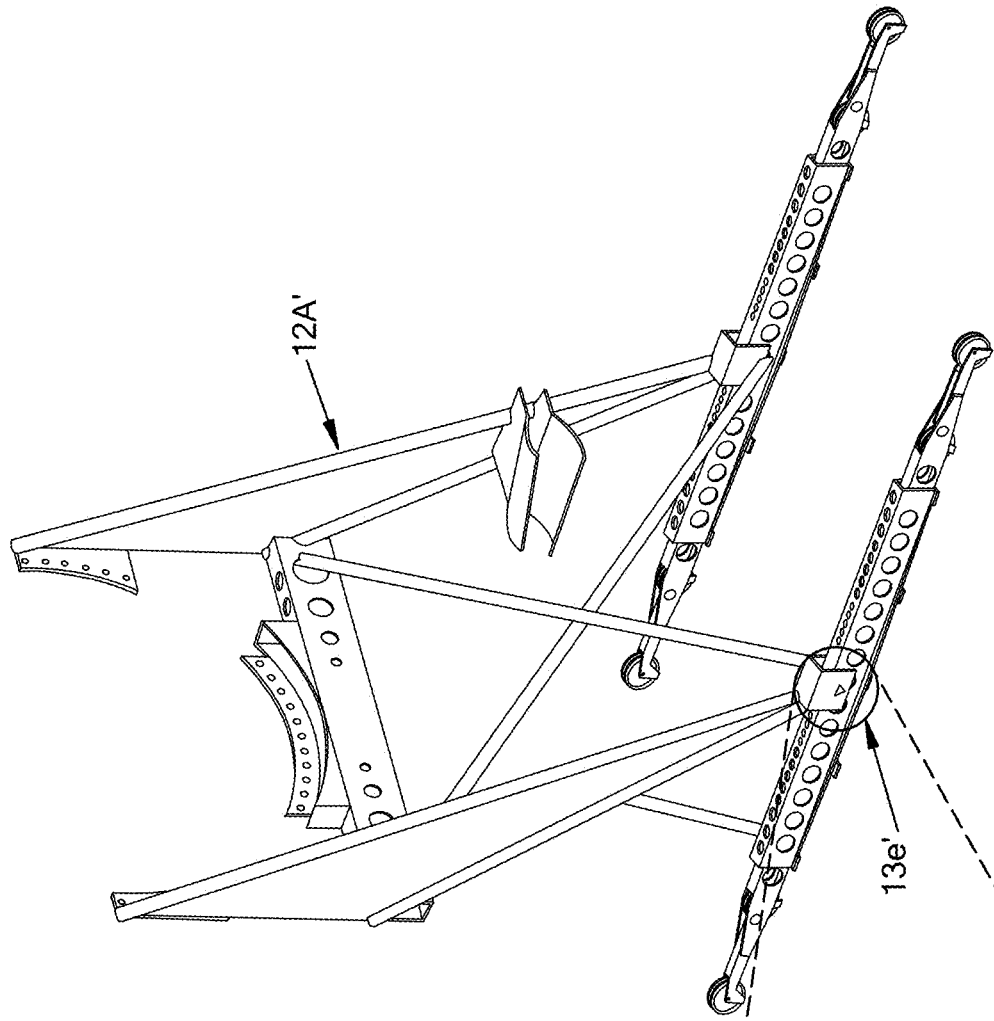
FIG. 13C is an isometric view of another payload-receiving fixture of the plurality of payload receiving fixtures of FIG. 13B.

An indicator 13e' can be associated with a payload-receiving fixture as well, as shown in FIG. 13C with respect to a cantilevered end fixture 12A', and can provide information, including but not limited to the information identified in the dotted circle 15'. Additional details about cantilevered support fixtures are described with respect to a commonly-owned U.S. provisional patent application filed contemporaneously herewith entitled "DEVICES AND METHODS FOR CANTILEVERED-SUPPORT OF AIR- CRAFT CARGO PAYLOADS IN FORWARD AND AFT ENDS OF A CARGO BAY," the content of which is incorporated by reference herein in its entirety. The indicator 13e' can provide information like the information associated with the profile 1040 of FIGS. 11 and 12C.

As discussed above with respect to FIGS. 9A and 9B, another feature that allow for efficient packaging of cargo are one or more ballasts. Information about what ballast to use, an amount of weight of the ballast, etc. can be part of the payload profile information that is associated with the indicators 13a', 13b', 13c', 13d', or other indicators provided for in the context of the present disclosure. The use of the ballasts allows for the effective center of gravity location for the payload to be adjusted. Additional details about ballasting, and how to manage center of gravity in the context of aircrafts and other transports as provided for herein, are described in in International Patent Application No. PCT/US20/049786, entitled "SYSTEMS, METHODS, AND AIRCRAFT FOR MANAGING CENTER OF GRAVITY," and filed Sep. 8, 2020, and the content of which is incorporated by reference herein in its entirety.

As with other embodiments, although the illustrated embodiment focuses on wind turbine blades, these same features, or similar features, can be implemented across other types of payloads, including but not limited to industrial oil equipment, mining equipment, rockets, military equipment and vehicles, defense hardware, commercial aerospace vehicles, crane segments, aircraft components, space launch rocket boosters, helicopters, generators, or hyperloop tubes.

Efficiently Packaging Cargo to be Loaded onto a Cargo Aircraft

As noted, the cargo can be prepared and assembled prior to the cargo aircraft arriving on site to be loaded. Accordingly, as one flight is occurring, the payload for the next flight can be prepared so it is ready to be loaded immediately after the cargo aircraft arrives and is ready to receive a payload. In conjunction with preparing and assembling the payload, first it must be determined what the payload is going to be. Further, once the payload is identified, the associated payload profile can be determined, for instance using indicators of the nature described above, elsewhere herein, or known to those skilled in the art in view of the present disclosures.

The scanning or other method of identifying the payload profile can be done in a manual fashion, automated fashion, or a combination of the two. For example, a person or some form of machine can scan an indicator or equivalent to load up the payload profile. That profile may identify which payload-receiving fixtures should be used with that payload, and/or a location for those payload-receiving fixtures to be disposed on the payload. From there, a team on the ground can begin assembling the payload package such that the payload is secured with respect to the payload-receiving fixtures. Alternatively, in an automated set-up, one or more machines on the ground may be capable of receiving information about the payload profile and then operating one or more machines to assemble the payload package such that the payload is secured with respect to the payload-receiving fixtures. In either context, the assembly can be an assembly line of sorts that can be operated manually, with some automation, or with full automation, the assembly being driven by the information in the payload profile.

To the extent any ballasting is appropriate for the payload being assembled to adjust the effective CG location of the payload, that too can occur in conjunction with the payload package preparation/assembly that can occur prior to the arrival of the cargo aircraft. To the extent a payload needs to be weighed and/or balanced prior to being loaded, for example if that is a requirement even in the face of the present disclosures that allow for repeatable loading without having to do such weight and/or balancing, that action can occur prior to the arrival of the cargo aircraft. The payload profiles for various package types may include information about the type(s) of ballasts, the weight(s) of the ballast, and/or the location(s) of the ballast to be used for that particular payload. In instances in which a payload profile is not known, the payload can be weighed and/or balanced, and ballast(s) provided, based on the results of the weighing and/or balancing. It is beneficial that the weighing, balancing, and/or application of the ballast(s) occurs on the ground, or at least off the aircraft, to make the loading process itself more efficient. It becomes an effective use of "down time" between missions (i.e., flights). The payload can be moved on, secured, and the flight can go without any, or at least minimal, delays due to weighing, balancing, and/or ballasting. As described herein, the application of the ballast can be to the payload-receiving fixture(s), the payload (e.g., the blade(s)), and/or disposed at and secured at a designated, marked location(s) on the aircraft, similar to the other pre-formed marking described herein.

In instances in which the payload is repeatable a number of times, the use of the payload profiles in conjunction with assembling and packaging the same is extremely useful. The way the payload is packaged, and the tools and fixtures used in conjunction with the same, can be repeated, increasing efficiencies and minimizing delays.

Features to Allow for Efficient Loading of Cargo onto a Cargo Aircraft

Figure 14A:
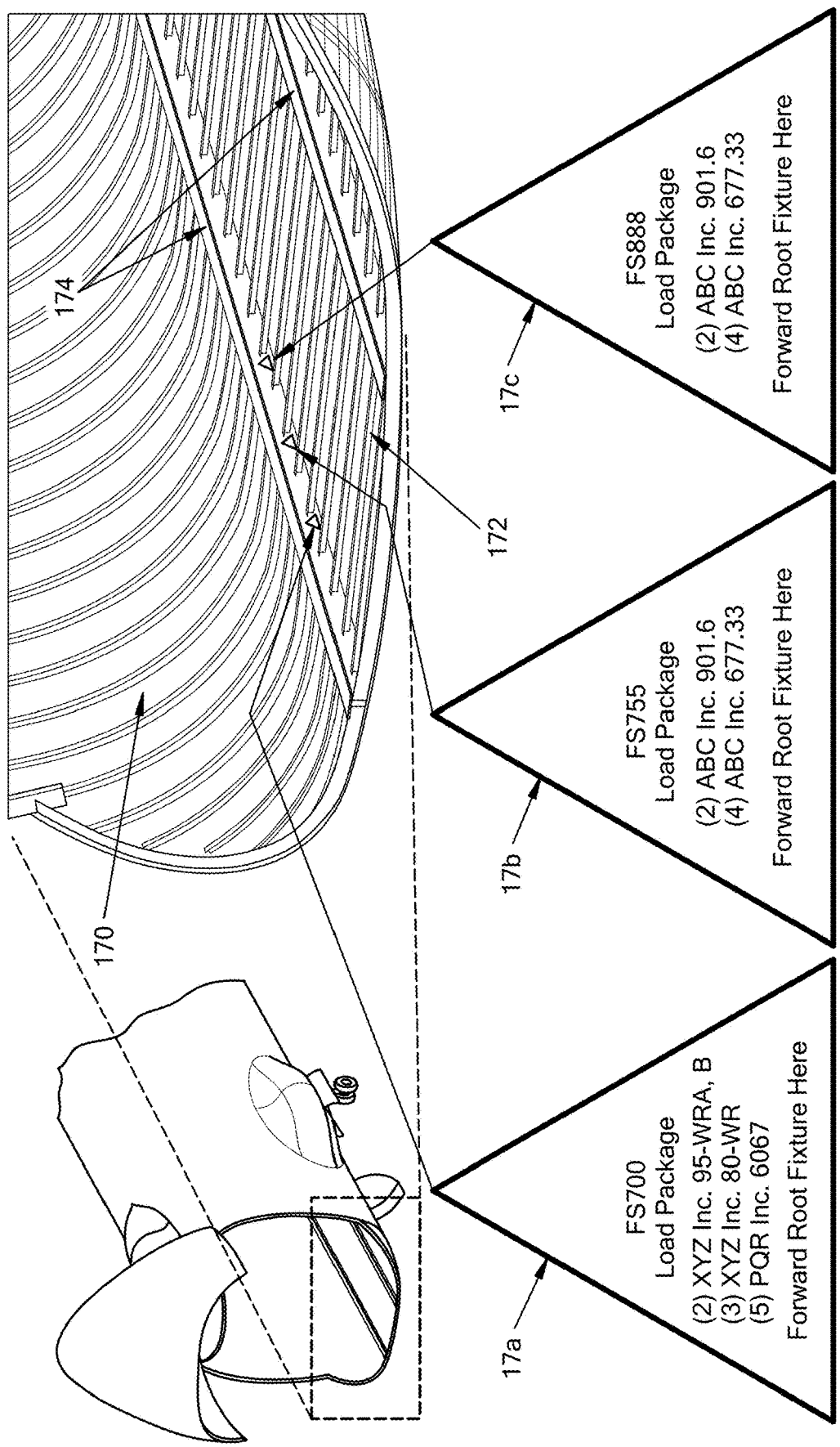
FIG. 14A is an isometric view of the aircraft of FIG. 1C illustrating rails and related structures of the interior cargo bay, and further including an inset illustration that schematically illustrates one embodiment of a plurality of pre-formed markings disposed on one of the rails.

Efficiency in loading cargo into an aircraft is further enhanced by the use of pre-formed markings in the interior cargo bay to demarcate locations at which different types of payloads (on a macro and/or micro-scale) are to be loaded to, for example, ensure the payload is properly positioned for CG management purposes. FIG. 14A illustrates three exemplary pre-formed markings 17a, 17b, 17c located on the rail 174 formed along the bottom contact surface 172 of the interior cargo bay 170. Each marking 17a, 17b, 17c can provide a variety of information in a variety of different formats, similar to the indicators 13a', 13b', 13c', 13d', 13e' described above. Accordingly, the details and features of the indicators 13a', 13b', 13c', 13d', 13e' can be equally applicable to pre-formed markings used in the cargo bay 170.

As shown, a first pre-formed marking 17a provides for a datum location of FS 700 inches, and further indicates that the location is where a forward root fixture can be placed for at least three different payloads: a payload that includes two 95-meter blades from XYZ Inc. (95-WRA, B), a payload that includes a single 80-meter blade from XYZ Inc. (80-WR), or a payload identified as "6067" from PQR Inc. (perhaps a wind turbine tower segment or cargo from a different macro-scale, such as a component of an oil rig). The second pre-formed marking 17b provides for a datum location of FS 755 inches, and further indicates that the location is where a forward root fixture can be placed for at least two different payloads: a payload identified as "901.6" from ABC Inc. or a payload identified as "677.33" from ABC Inc. As with the "6067" identified payload, these payloads from ABC Inc. can be most any payload. The systems provided for herein allow for any number of payload types to be identified for a specific location that is indicated by pre-formed markings in the cargo bay 170. The third pre-formed marking 17c provides for a datum location of FS 888 inches, and further indicates a second location where the forward root fixture for each of the "901.6" and "677.33" payloads from ABC Inc. can be positioned. This highlights that while some payloads may have a single designated location for loading purposes, in some instances the same payload may have multiple options where it can be safely positioned for flight.

Figure 14B:
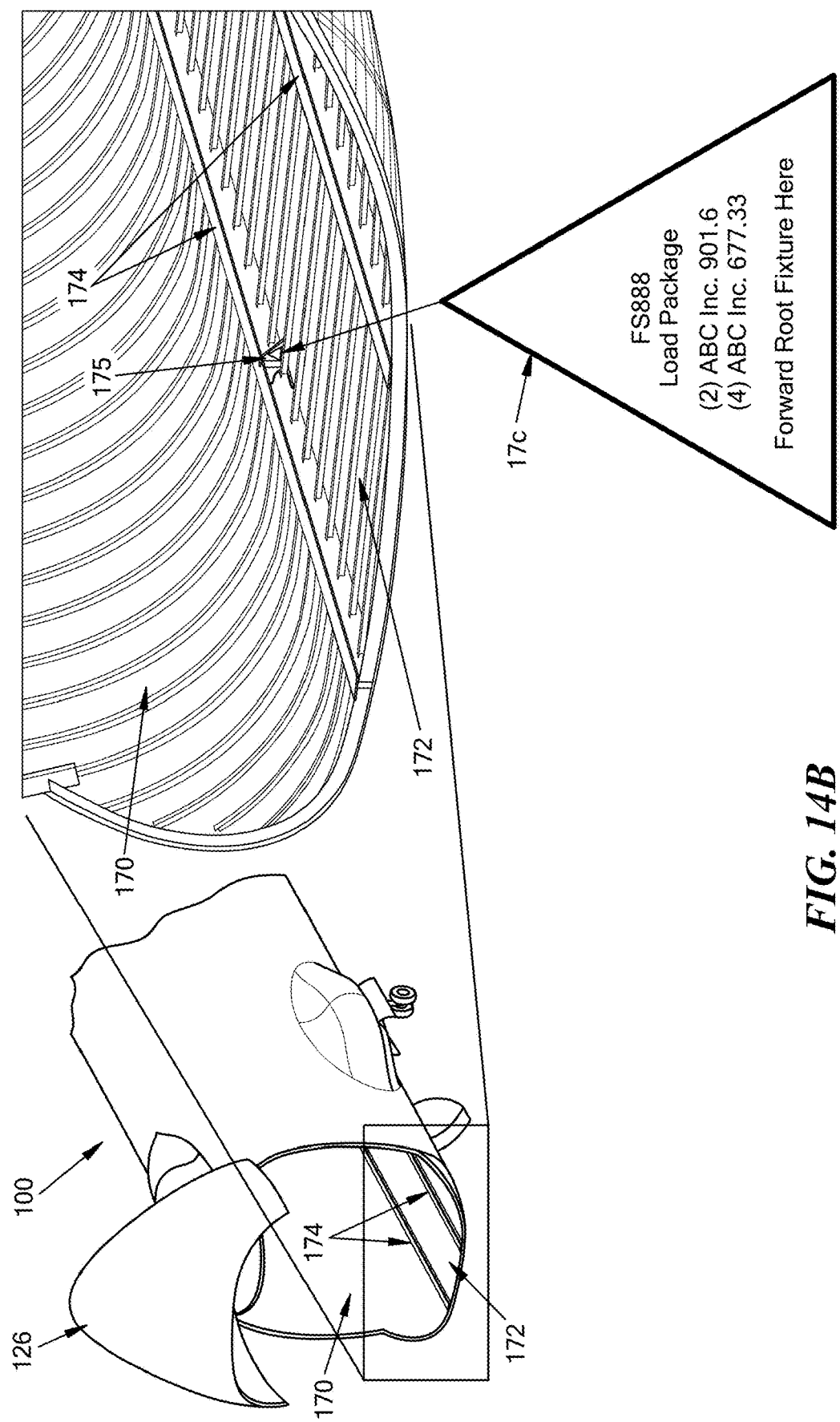
FIG. 14B is the isometric view of the aircraft of FIG. 1C illustrating rails and related structures of the interior cargo bay, and further including an inset illustration that schematically illustrates another embodiment of a pre-formed marking disposed on one of the rails, and disposed adjacent to a lock fitting.

FIG. 14B illustrates one instance in which the third pre-formed marking 17c can be disposed proximate to a lock fitting 175. The lock fitting 175 can be configured to receive, for example, a pin associated with a carriage (e.g., the carriages 114, 114') so that a payload receiving fixture associated with the carriage can be fixedly secured at the designated location. In embodiments in which markings are utilizes in conjunction with a fuselage that includes a kinked portion, the markings in the interior cargo bay 170 can change in an inclined region, i.e., the kinked portion, and/or in the portion aft of the kinked portion.

Alternatively, or additionally, pre-formed markings like the markings 17a, 17b, 17c can include unique codes at each pre-formed marking location. Similar to the indicators 13a', 13b', 13c', 13d', 13e', this can include RFID tags (one non-limiting example of a non-visual recognition feature), bar codes, and/or QR codes, among other similar indicators. This can allow for a single pre-formed marking to be a pre-formed marking for any number of payloads. That information can be easily ascertained from the unique code. In some instances, a single pre-formed marking may be the only marking to denote a designated location for a payload, such as instances in which the cargo aircraft includes features that help keep the remaining portion of the payload along a length of the aircraft beyond where the marking is located, in either X-direction, properly aligned to maintain proper CG. Alternatively, a pre-formed marking can be used in conjunction with other pre-formed markings disposed in the cargo bay to help denote a designated location for a payload to ensure the payload is properly aligned to maintain proper CG.

The pre-formed markings can be provided for within the cargo bay 170 using any technique for labeling or otherwise providing information on an object, including but not limited to various forms of printing, sticking, etching, embossing, engraving, stenciling, etc. While in the illustrated embodiment the pre-formed markings 17a, 17b, 17c are disposed on the rail 174, the markings can be located anywhere within the cargo bay 170, including but not limited to the bottom contact surface 172, the exposed frames and other mechanical structures illustrated in FIG. 14A, the inner walls of the cargo bay 170, etc. Usage of aspects like the exposed frames can advantageously provide further versatility in where pre-formed markings, and thus designated locations, can be identified, as they can allow for nonlinear and/or non-uniform location designations. For example, such usage allows for non-uniform distances to be designated, particularly if the frame spacing varies along the length of the aircraft. In some instances, a decoder can be utilized to help convert the location indication from local pre-formed marking units to an actual designated location in the units that are utilized for verifying the global payload position and center of gravity location. For example, there might be ten (10) pre-formed markings between two adjacent frames that are close together in the forwards fuselage, and ten (10) pre-formed markings between two adjacent frames that are further apart in the aft fuselage. A decoder can allow converting of the, for example, fourth ($4^{th}$) pre-formed marking in-between the two forward frames and the, for example, fourth ($4^{th}$) pre-formed marking in-between the two aft frames to the correct but different designated locations, both in consistent units, such as inches, and/or both relative to the same datum, such as an identical location forwards of the aircraft nose.

Similar to the indicators 13a', 13b', 13c', 13d', in some embodiments the markings 17a, 17b, 17c may be, or may include, sensors. The sensors can communicate with the payload, and/or any tool, system, etc. being used to move the payload into the cargo bay 170, to designate once a designated location for that payload, payload-receiving fixture, etc. has been reached. Similar to the assembly process, the loading process can be manual, automated, or a combination of the two such that any of these actions can inform one or more humans, robots, etc. (these collective options more broadly being referred to as an operator) and the informed can respond accordingly. Thus, when a pre-formed marking and/or designated location is reached, the operator can stop movement of the payload and subsequently secure the payload for transport (e.g., flight).

Just as LVDTs and RVDTs can be used on the payloads, they can also be disposed and used in the cargo bay 170. The LVDTs and/or RVDTs can feed out data as a payload is moved into the cargo bay 170. Other sensors described above with respect to the payloads may also be adapted for use in the cargo bay 170 and/or the cargo bay may include complementary features to those sensors. For example, with respect to the description regarding the use of laser projects, pre-formed markings in the cargo bay, such as along the rail in a measuring stick or ruler approach (discussed further below with respect to FIG. 15), can be disposed on both rails (or both sides of the fuselage), and/or on both sides of one or both rails and a bidirectional laser can be used to provide further precision and accuracy.

In still another embodiment, a two-location prong apparatus can be disposed on one or both of the rails 174 that is complementary to a portion of the payload and/or payload-receiving fixtures associated with the payload to provide alignment verification between the payload and the cargo bay.

Figure 15:
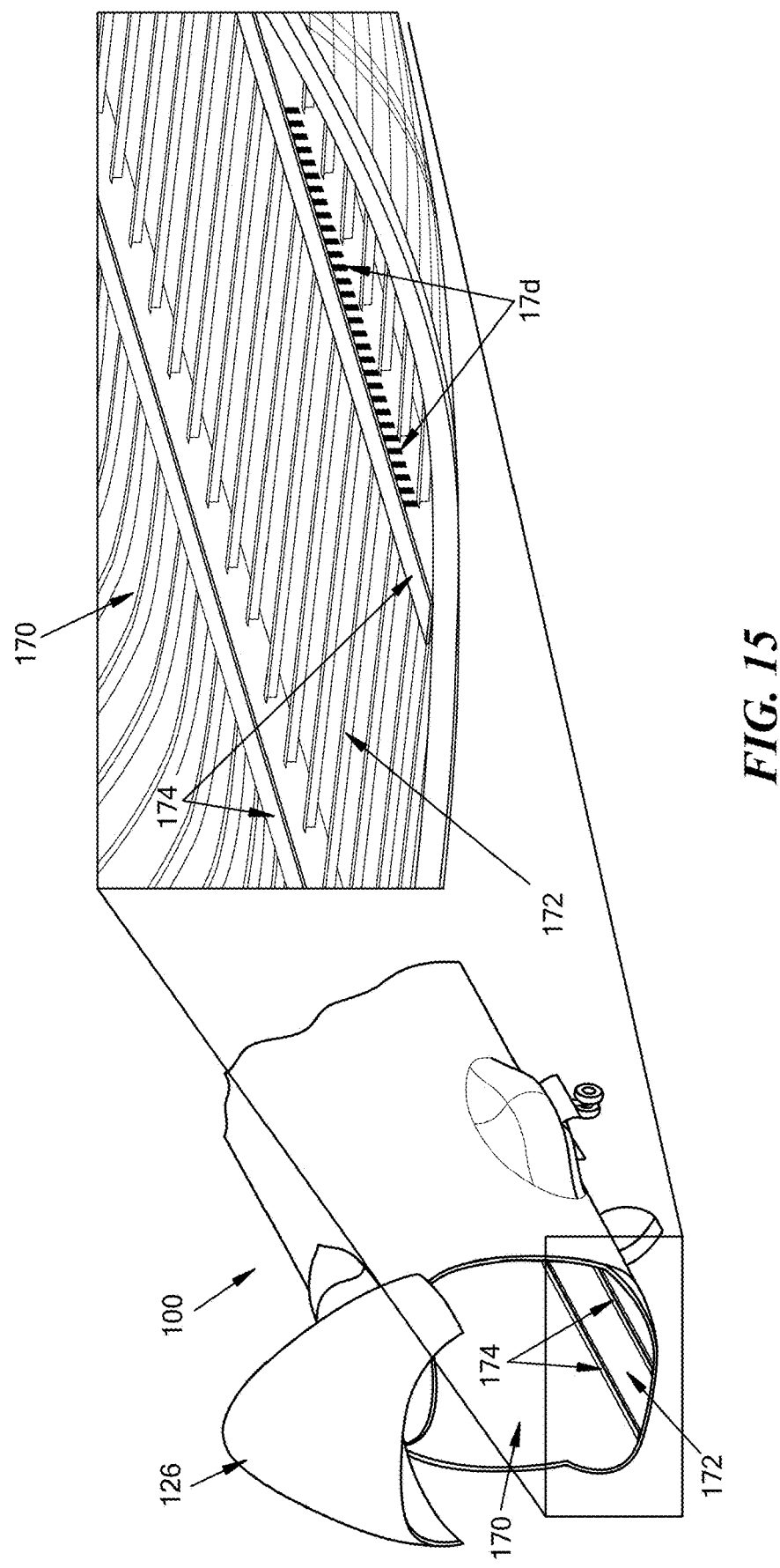
FIG. 15 is the isometric view of the aircraft of FIG. 1C illustrating rails and related structures of the interior cargo bay, and further including an inset illustration that schematically illustrates another embodiment of a plurality of pre-formed markings disposed on one of the rails.

FIG. 15 illustrates still another embodiment of pre-formed markings 17d that can be used in conjunction with the present disclosures. As shown, the preformed markings 17d can be disposed along a length of the rail 174 associated with the bottom contact surface 172 of the cargo bay 170. The pre-formed markings 17d can be uniform, and/or non-uniform but location-designated, to provide a scale or measuring stick to help place payloads at particular locations along a path. In the illustrated embodiment, the pre-formed markings 17d are substantially uniform to operate akin to a ruler. These measuring marks 17d can be disposed along a length, up to the entire length, of the cargo bay 170, denoting specific locations along the length of the cargo bay 170 for placement of a payload. Any desired measurement scale can be used, including standard and non-standard scales and dimensions.

Efficiently Loading Cargo onto a Cargo Aircraft

Similar to the process of assembling the cargo or payload, the process of loading the cargo aircraft can include determining a payload profile. This can be done in conjunction with assembling the payload, or it can be done after the payload has been packaged. One or more indicators, e.g., the indicators 13a', 13b', 13c', 13d', can be used to inform the designated location and/or pre-formed markings to be used when loading the payload onto the aircraft.

Alternatively, a separate indicator(s) that factors in any or all of the indicators associated with the package can be utilized on a per-package or per-payload basis to convey the information about designated locations and/or pre-formed markings to be used.

After the payload profile has been determined and/or the pre-formed markings and/or designated location have been determined, any of the loading processes disclosed herein, in commonly-owned applications, or otherwise known to those skilled in the art can be used to load the payload into the cargo aircraft. Generally this can involve opening the cargo nose door 126 and passing the payload through the resulting opening at the forward fuselage 120*f* and into the cargo bay 170, for instance by rolling and/or sliding the payload along the rails 174 and/or support structures (e.g., support structures 23A, 23B, 27).

As the payload is moved through the cargo bay 170 and reaches the designated location that is based on the determined payload profile, as denoted by the pre-formed markings, movement of the payload can be stopped. As described above, such movement and stopping can be a manual, automated, or combination of the two process. The payload can be secured within the cargo bay 170, thus readying the aircraft 100 for its next mission to fly the payload to a desired location.

At least because all of the packaging, assembly, CG determination, etc. is done prior to loading the cargo, and in fact can be done while the aircraft is in transit, the loading process is efficient, described above as being done in a "pit crew" manner. As a result of the efficient payload assembly processes, and the efficient payload processes, multiple flights of these large payloads can be achieved in a shorter period of time than is typical for large cargo transport. Depending on the distance to be traveled, it is possible that two, three, four, or even more deliveries can be made in a single 24-hour day using the same aircraft. This is at least because there is virtually no slowdown in the loading process attributed to typical weighing and balancing operations used in most large cargo transport. Loading occurs without having to make an independent determination of the CG of the payload due to the payload, and thus its CG, already being known. Consistent payloads and consistent CGs, in conjunction with the features disclosed herein related to payload profiles and features associated with the cargo aircraft, payload-receiving fixtures, and/or the payload itself yield these efficient assembly and loading processes disclosed herein.

One skilled in the art will appreciate further features and advantages of the disclosures based on the provided for descriptions and embodiments. Accordingly, the inventions are not to be limited by what has been particularly shown and described. For example, although the present disclosure provides for transporting large cargo, such as wind turbines, the present disclosures can also be applied to other types of large cargos or to smaller cargo. Further, the present disclosure can provide for a transport system capable of managing center of gravity by including aircraft as provided in combination with the packaging and/or the payload (e.g., wind turbine blades). That is, the system includes the aircraft, packaging, and/or payload because of their inter-compatibility in view of the present disclosures. Still further, while the present disclosures focus on certain aircrafts and aircraft configurations, the methods and systems can be applied to other types of air vehicles, including but not limited to non-buoyant aircraft, other fixed-wing aircraft, and/or multi-engine, jet-powered aircraft. Still even further, while the present disclosures are focused on usage with cargo aircraft, the methods and systems provided for herein can be applied to other cargo transports or transport vehicles (e.g., ships). Thus, to the extent references are made to an interior cargo bay herein, that bay does not necessarily have to be a closed space; it could be an open air portion of a ship or the like. All publications and references cited herein are expressly incorporated herein by reference in their entirety.

Examples of the above-described embodiments can include the following:

1. A method of loading a payload onto a cargo aircraft, comprising:
    determining a payload profile of a payload;
    positioning the payload at a designated location in an interior cargo bay defined by a fuselage of a cargo aircraft based on the determined payload profile, the designated location being identified by one or more pre-formed markings in the interior cargo bay; and
    securing the payload at the designated location.
2. The method of claim 1, wherein the one or more pre-formed markings comprise a plurality of pre-designated payload markings, the plurality of pre-designated payload markings comprising at least one pre-formed marking for each type of payload that the interior cargo bay is configured to receive.
3. The method of claim 1 or 2, wherein the one or more pre-formed markings comprise a plurality of measuring marks formed along a length of the interior cargo bay denoting specific locations along the length for placement of the payload at the designated location.
4. The method of any of claims 1 to 3, further comprising:
    passing the payload through an opening formed in a forward end of the cargo aircraft due to a cargo nose door being opened with respect to a main section of the fuselage.
5. The method of any of claims 1 to 4, wherein positioning the payload at a designated location in an interior cargo bay defined by a fuselage of a cargo aircraft based on the payload profile further comprises:
    sliding the payload along one or more rails disposed in the interior cargo bay to reach the designated location, the one or more rails extending from a forward end to an aft end of the cargo aircraft.
6. The method of claim 5,
    wherein at least one rail of the one or more rails includes a kinked portion such that a vertical distance between at least a portion of the at least one rail aft of the kinked portion and a plane defined by an interior bottom contact surface of the interior cargo bay in the forward end of the cargo aircraft that is substantially parallel to a centerline of the forward end of the cargo aircraft is greater than a vertical distance between at least a portion of the at least one rail forward of the kinked portion and the plane defined by the interior bottom contact surface of the interior cargo bay in the forward end of the cargo aircraft, and
    wherein the sliding further comprises sliding the payload along at least a portion of the at least one rail that is aft of the kinked portion.
7. The method of claim 5 or 6,
    wherein at least one rail of the one or more rails extends continuously along an interior bottom contact surface of the interior cargo bay from the forward end of the cargo aircraft to the aft end of the cargo aircraft, and
    wherein the sliding further comprises sliding the payload along at least a portion of the at least one rail that is disposed in the aft end of the cargo aircraft.

8. The method of any of claims 5 to 7, wherein at least one rail of the one or more rails further serves as a primary structural beam of the cargo aircraft.

9. The method of any of claims 1 to 8, wherein the payload profile comprises at least one of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload.

10. The method of claim 9, wherein the payload profile comprises at least two of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload.

11. The method of claim 10, wherein the payload profile comprises at least three of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload.

12. The method of any of claims 9 to 11, further comprising:
    coupling a plurality of payload-receiving fixtures to the payload based on the payload profile.

13. The method of claim 12, wherein coupling a plurality of payload-receiving fixtures to the payload based on the payload profile further comprises:
    positioning at least one payload-receiving fixture of the plurality of payload-receiving fixtures at a designated receiving location of the payload, the designated receiving location being identified by one or more pre-formed markings on the payload.

14. The method of claim 12 or 13, further comprising:
    selecting each payload-receiving fixture of the plurality of payload-receiving fixtures that is coupled to the payload based on a pre-designation for that payload-receiving fixture that designates at least one of a type of payload with which each payload-receiving fixture is configured to be used or one or more locations along the payload that the respective payload-receiving fixture is configured to be used, the payload comprising various configurations that depend on at least one of dimensions of the payload, shape of the payload, or the payload profile.

15. The method of any of claims 1 to 8, wherein the payload comprises a package that includes one or more blades of one or more wind turbines, and wherein the payload profile comprises at least one of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package.

16. The method of claim 15, wherein the payload profile comprises at least two of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package.

17. The method of claim 16, wherein the payload profile comprises at least three of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package.

18. The method of any of claims 15 to 17, further comprising:
    coupling a plurality of payload-receiving fixtures to the one or more blades based on the payload profile.

19. The method of claim 18, wherein coupling a plurality of payload-receiving fixtures to the one or more blades based on the payload profile further comprises:
    positioning at least one payload-receiving fixture of the plurality of payload-receiving fixtures at a designated receiving location of the one or more blades, the designated receiving location being identified by one or more pre-formed markings on the one or more blades.

20. The method of claim 18 or 19, further comprising:
    selecting each payload-receiving fixture of the plurality of payload-receiving fixtures that is coupled to each blade of the one or more blades based on a pre-designation for that payload-receiving fixture that designates at least one of a type of package in which each payload-receiving fixture is configured to be used or one or more locations along each blade of the one or more blades that the respective payload-receiving fixture is configured to be used, the type of package comprising various configurations of the one or more blades that depend on at least one of dimensions of the one or more blades, shape of the one or more blades, or the payload profile.

21. The method of any of claims 15 to 20, wherein the one or more blades comprises at least two wind turbine blades.

22. The method of claim 21, wherein the at least two wind turbine blades comprises at least three wind turbine blades.
23. The method of claim 22, wherein the at least three wind turbine blades comprises at least four wind turbine blades.
24. The method of any of claims 15 to 23, wherein at least one blade of the one or more blades has a length of at least about 57 meters.
25. The method of claim 24, wherein the length of the at least one blade is at least about 65 meters.
26. The method of claim 25, wherein the length of the at least one blade is at least about 75 meters.
27. The method of claim 26, wherein the length of the at least one blade is at least about 85 meters.
28. The method of claim 27, wherein the length of the at least one blade is at least about 100 meters.
29. The method of claim 28, wherein the length of the at least one blade is at least about 120 meters.
30. The method of any of claims 1 to 29, wherein determining a payload profile of a payload further comprises:
    at least one of scanning or sensing an indicator of the payload to yield the payload profile of the payload.
31. The method of claim 30, wherein the indicator comprises at least one of: (1) a unique code associated with the payload, a portion of the payload, or one or more payload-receiving fixtures associated with the payload; or (2) a parameter of the payload, or a portion of the payload, that is unique to the payload, or the portion of the payload.
32. The method of claim 30 or 31, wherein at least one of positioning the payload at a designated location in an interior cargo bay defined by a fuselage of a cargo aircraft based on the determined payload profile or securing the payload at the designated location is automated to occur in response to the indicator.
33. The method of any of claims 1 to 32, further comprising:
    applying one or more ballasts to the payload in view of the determined payload profile prior to loading the payload onto the cargo aircraft.
34. The method of claim 33, further comprising:
    at least one of weighing or balancing the payload,
    wherein applying one or more ballast to the payload occurs in view of at least one of the weight, balance, or center of gravity of the payload.
35. The method of any of claims 1 to 34, further comprising:
    repeating the actions of one or more claims of claims 1 to 34 for multiple payloads for a single cargo aircraft that makes multiple flights to a same location such that the payload can be positioned and secured at the designated location in the interior cargo bay consistently for the multiple flights.
36. The method of claim 35, wherein the multiple flights occur in a 24-hour day.
37. The method of claim 35 or 36, wherein the multiple flights are at least three flights.
38. The method of any of claims 1 to 37, wherein positioning the payload at a designated location in an interior cargo bay defined by a fuselage of a cargo aircraft based on the payload profile and securing the payload at the designated location occurs without making an independent determination of the center of gravity of the payload due to the known payload profile.
39. A method of preparing a payload for transport by a transport vehicle, comprising:
    determining a payload profile of a payload;
    associating a plurality of payload-receiving fixtures with the payload based on the determined payload profile; and
    securing the payload with respect to the plurality of payload-receiving fixtures.
40. The method of claim 39, wherein associating a plurality of payload-receiving fixtures with the payload based on the determined payload profile further comprises:
    positioning at least one payload-receiving fixture of the plurality of payload-receiving fixtures at a designated receiving location of the payload, the designated receiving location being identified by one or more pre-formed markings on the payload.
41. The method of claim 39 or 40, further comprising:
    selecting each payload-receiving fixture of the plurality of payload-receiving fixtures that are associated with the payload based on a pre-designation for that payload-receiving fixture that designates at least one of a type of payload with which each payload-receiving fixture is configured to be used or one or more locations along the payload that the respective payload-receiving fixture is configured to be used, the payload comprising various configurations that depend on at least one of dimensions of the payload, shape of the payload, or the payload profile.
42. The method of any of claims 39 to 41, wherein the payload profile comprises at least one of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of a transport vehicle are to use in conjunction with loading the payload onto the transport vehicle.
43. The method of claim 42, wherein the payload profile comprises at least two of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of a transport vehicle are to use in conjunction with loading the payload onto the transport vehicle.
44. The method of claim 43, wherein the payload profile comprises at least three of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of a transport vehicle are to use in conjunction with loading the payload onto the transport vehicle.

45. The method of claim 39 or 40, wherein the payload comprises a package that includes one or more blades of one or more wind turbines, the method further comprising:
selecting each payload-receiving fixture of the plurality of payload-receiving fixtures that is coupled to each blade of the one or more blades based on a pre-designation for that payload-receiving fixture that designates at least one of a type of package in which each payload-receiving fixture is configured to be used or one or more locations along each blade of the one or more blades that the respective payload-receiving fixture is configured to be used, the type of package comprising various configurations of the one or more blades that depend on at least one of dimensions of the one or more blades, shape of the one or more blades, or the payload profile.

46. The method of any of claim 39, 40, or 45,
wherein the payload profile comprises at least one of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of a transport vehicle to use in conjunction with loading the payload onto the transport vehicle.

47. The method of claim 46, wherein the payload profile comprises at least two of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of a transport vehicle to use in conjunction with loading the payload onto the transport vehicle.

48. The method of claim 47, wherein the payload profile comprises at least three of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of a transport vehicle to use in conjunction with loading the payload onto the transport vehicle.

49. The method of any of claims 45 to 48, wherein the one or more blades comprises at least two wind turbine blades.

50. The method of claim 49, wherein the at least two wind turbine blades comprises at least three wind turbine blades.

51. The method of claim 50, wherein the at least three wind turbine blades comprises at least four wind turbine blades.

52. The method of any of claims 45 to 51, wherein at least one blade of the one or more blades has a length of at least about 57 meters.

53. The method of claim 52, wherein the length of the at least one blade is at least about 65 meters.

54. The method of claim 53, wherein the length of the at least one blade is at least about 75 meters.

55. The method of claim 54, wherein the length of the at least one blade is at least about 85 meters.

56. The method of claim 55, wherein the length of the at least one blade is at least about 100 meters.

57. The method of claim 56, wherein the length of the at least one blade is at least about 120 meters.

58. The method of any of claims 39 to 57, wherein determining a payload profile of a payload further comprises:
at least one of scanning or sensing an indicator of the payload to yield the payload profile of the payload.

59. The method of claim 58, wherein the indicator comprises at least one of: (1) a unique code associated with the payload, a portion of the payload, or one or more payload-receiving fixtures associated with the payload; or (2) a parameter of the payload, or a portion of the payload, that is unique to the payload, or the portion of the payload.

60. The method of claim 58 or 59, wherein at least one of associating a plurality of payload-receiving fixtures with the payload based on the determined payload profile or securing the payload with respect to the plurality of payload-receiving fixtures is automated to occur in response to the indicator.

61. The method of any of claims 39 to 60, further comprising:
applying one or more ballasts to the payload in view of the determined payload profile.

62. The method of claim 61, further comprising:
at least one of weighing or balancing the payload,
wherein applying one or more ballast to the payload occurs in view of at least one of the weight, balance, or center of gravity of the payload.

63. The method of any of claims 39 to 62, further comprising:
repeating the actions of one or more claims of claims 39 to 62 for multiple payloads for a single cargo aircraft that makes multiple flights to a same location such that the each respective payload can be associated with and secured with respect to the same, or akin, pluralities of payload-receiving fixtures consistently for the multiple flights.

64. The method of claim 63, wherein the multiple flights occur in a 24-hour day.

65. The method of claim 63 or 64, wherein the multiple flights are at least three flights.

66. The method of any of claims 39 to 65, wherein associating a plurality of payload-receiving fixtures with the payload based on the determined payload profile, securing the payload with respect to the plurality of payload-receiving fixtures occurs, and subsequent loading of the payload onto a cargo aircraft occurs without making an independent determination of the center of gravity of the payload due to the known payload profile.

67. The method of any of claims 39 to 66, wherein the transport vehicle comprises a cargo aircraft.

68. A cargo aircraft, comprising:
a fuselage defining a forward end, an aft end, and an interior cargo bay that spans a majority of a length of the fuselage from the forward end to the aft end; and
one or more pre-formed markings formed in the interior cargo bay, the one or more pre-formed markings being located such that the one or more pre-formed markings designate a desired location at which a particular payload is to be secured for flight, the desired location being dependent on a payload profile of the particular payload.

69. The cargo aircraft of claim 68, wherein the one or more pre-formed markings comprise a series of one or more pre-formed markings, each member of the series of one or more pre-formed markings comprising at least one pre-formed marking for a designated payload that the interior cargo bay is configured to receive, and each member of the series of one or more pre-formed markings being based on a respective payload profile of the payload associated with that series member.

70. The cargo aircraft of claim 68 or 69, wherein the one or more pre-formed markings are configured to allow for similarly configured payloads to be loaded in the interior cargo bay based on the one or more pre-formed markings such that loading of the similarly configured payloads is able to occur without having to make a center of gravity measurement in conjunction with loading the respective payload in the interior cargo bay.

71. The cargo aircraft of any of claims 68 to 70, wherein the one or more pre-formed markings comprise a plurality of measuring marks formed along a length of the interior cargo bay denoting specific locations along the length of the interior cargo bay for placement of a payload.

72. The cargo aircraft of any of claims 68 to 71, further comprising:
one or more rails disposed in the interior cargo bay, the one or more rails extending from the forward end to the aft end of the cargo aircraft, the one or more rails being configured to receive the payload such that the payload is moved along the one or more rails to dispose it the desired location within the cargo bay.

73. The cargo aircraft of claim 72, wherein at least one rail of the one or more rails includes a kinked portion such that a vertical distance between at least a portion of the at least one rail aft of the kinked portion and a plane defined by an interior bottom contact surface of the interior cargo bay in the forward end of the cargo aircraft that is substantially parallel to a centerline of the forward end of the cargo aircraft is greater than a vertical distance between at least a portion of the at least one rail forward of the kinked portion and the plane defined by the interior bottom contact surface of the interior cargo bay in the forward end of the cargo aircraft.

74. The cargo aircraft of claim 72 or 73, wherein at least one rail of the one or more rails extends continuously along an interior bottom contact surface of the cargo bay from the forward end of the cargo aircraft to the aft end of the cargo aircraft.

75. The cargo aircraft of any of claims 72 to 74, wherein at least one rail of the one or more rails further serves as a primary structural beam of the cargo aircraft.

76. The cargo aircraft of any of claims 68 to 75, further comprising a cargo nose door configured to open a portion of the forward end of the cargo aircraft to load the payload into the cargo bay through an opening exposed by opening the cargo nose door.

77. The cargo aircraft of any of claims 68 to 76, wherein the interior cargo bay comprises:
a forward bay portion located in the forward end of the cargo aircraft;
an aft bay portion located in the aft end of the cargo aircraft; and
a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft.

78. The cargo aircraft of any of claims 68 to 77, wherein the payload profile comprises at least one of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload.

79. The cargo aircraft of claim 78, wherein the payload profile comprises at least two of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload.

80. The cargo aircraft of claim 79, wherein the payload profile comprises at least three of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload.

81. The cargo aircraft of any of claims 68 to 80, wherein the interior cargo bay is configured to have a payload disposed therein that has a length of at least about 65 meters.

82. The cargo aircraft of claim 81, wherein the interior cargo bay is configured to have a payload disposed therein that has a length of at least about 75 meters.

83. The cargo aircraft of claim 82, wherein the interior cargo bay is configured to have a payload disposed therein that has a length of at least about 85 meters.

84. The cargo aircraft of claim 83, wherein the interior cargo bay is configured to have a payload disposed therein that has a length of at least about 100 meters.

85. The cargo aircraft of claim 84, wherein the interior cargo bay is configured to have a payload disposed therein that has a length of at least about 120 meters.

86. The cargo aircraft of any of claims 68 to 85,
wherein the interior cargo bay is configured to have a package that includes one or more blades of a wind turbine disposed therein, and
wherein the payload profile comprises at least one of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package.

87. A system for loading a payload onto a cargo transport, comprising:
a series of one or more pre-formed markings formed in an interior cargo bay of a cargo transport, each member of the series of one or more pre-formed markings comprising at least one pre-formed marking for a designated payload that the interior cargo bay is configured to receive, and each member of the series of one or more pre-formed markings being based on a respective payload profile of a payload associated with that series member, the one or more pre-formed markings being located such that the one or more pre-formed markings designate a desired location at which a particular payload is to be secured for transport, the desired location being dependent on a payload profile of the particular payload; and
a payload pre-designation list configured to identify the respective member of the series of one or more pre-formed markings that corresponds to the designated payload, thereby allowing the designated payload to be loaded onto the cargo transport using the respective member of the series of one or more pre-formed markings.

88. The system of claim 87, wherein the one or more pre-formed markings are configured to allow for similarly configured payloads to be loaded in the interior cargo bay based on the one or more pre-formed markings such that loading of the similarly configured payloads is able to occur without having to make a center of gravity measurement in conjunction with loading the respective payload in the interior cargo bay.

89. The system of claim 87 or 88, wherein the one or more pre-formed markings comprise a plurality of measuring marks formed along a length of the interior cargo bay denoting specific locations along the length of the interior cargo bay for placement of a payload.

90. The system of any of claims 87 to 89, further comprising:
a plurality of payload-receiving fixtures configured to receive at least portions of the particular payload.

91. The system of claim 90, further comprising:
a fixture pre-designation list configured to identify at least one of a type of payload with which each payload-receiving fixture of the plurality of payload-receiving fixtures is configured to be used or one or more locations along the payload that the respective payload-receiving fixture is configured to be used, thereby allowing for at least one of a desired payload-receiving fixture of the plurality of payload-receiving fixtures to be coupled to the payload or a desired payload-receiving fixture to be disposed with respect to the payload at one or more designated locations along the payload.

92. The system of claim 91, further comprising:
one or more designated receiving locations identified by way of one or more preformed markings on the payload, the one or more designated receiving locations corresponding to the one or more locations along the payload that the respective payload-receiving fixture is configured to be used.

93. The system of any of claims 90 to 92, further comprising:
one or more ballasts configured to mount to at least one payload-receiving fixture of the plurality of payload-receiving fixtures.

94. The system of claim 93, wherein the at least one payload-receiving fixture of the plurality of payload-receiving fixtures comprises a carriage configured to receive the one or more ballasts.

95. The system of any of claims 87 to 94, further comprising:
one or more rails disposed in the interior cargo bay, the one or more rails extending from the forward end to the aft end of the cargo transport, the one or more rails being configured to receive the payload such that the payload is moved along the one or more rails to dispose it at the desired location within the cargo bay.

96. The system of claim 95, wherein at least one rail of the one or more rails includes a kinked portion such that a vertical distance between at least a portion of the at least one rail aft of the kinked portion and a plane defined by an interior bottom contact surface of the interior cargo bay in the forward end of the cargo transport that is substantially parallel to a centerline of the forward end of the cargo transport is greater than a vertical distance between at least a portion of the at least one rail forward of the kinked portion and the plane defined by the interior bottom contact surface of the interior cargo bay in the forward end of the cargo transport.

97. The system of claim 95 or 96, wherein at least one rail of the one or more rails extends continuously along an interior bottom contact surface of the cargo bay from the forward end of the cargo transport to the aft end of the cargo transport.

98. The system of any of claims 95 to 97, wherein at least one rail of the one or more rails further serves as a primary structural beam of the cargo transport.

99. The system of any of claims 87 to 98, wherein the payload profile comprises at least one of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload.

100. The system of claim 99, wherein the payload profile comprises at least two of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload.

101. The system of claim 100, wherein the payload profile comprises at least three of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload.

102. The system of any of claims 87 to 101,
   wherein the payload comprises a package that includes one or more blades of one or more wind turbines, and
   wherein the payload profile comprises at least one of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package.

What is claimed is:

1. A method of preparing a payload for transport by a transport vehicle, comprising:
   determining a payload profile of a payload, wherein the payload comprises a package that includes one or more blades of one or more wind turbines;
   associating a plurality of payload-receiving fixtures with the payload based on the determined payload profile;
   securing the payload with respect to the plurality of payload-receiving fixtures; and
   selecting each payload-receiving fixture of the plurality of payload-receiving fixtures that is coupled to each blade of the one or more blades based on a pre-designation for that payload-receiving fixture that designates one or more locations along each blade of the one or more blades that the respective payload-receiving fixture is configured to be used,
   wherein each payload-receiving fixture of the plurality of payload-receiving fixtures includes a marking that includes information including the pre-designation designating the one or more locations for that payload-receiving fixture.

2. The method of claim 1, wherein the payload profile comprises at least one of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of a transport vehicle are to use in conjunction with loading the payload onto the transport vehicle.

3. The method of claim 1, wherein the pre-designation for the selected payload-receiving fixture further designates at least one of a type of package in which each payload-receiving fixture is configured to be used, the type of package comprising various configurations of the one or more blades that depend on at least one of dimensions of the one or more blades, shape of the one or more blades, or the payload profile.

4. The method of claim 1,
   wherein the payload profile comprises at least one of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of a transport vehicle to use in conjunction with loading the payload onto the transport vehicle.

5. The method of claim 3, wherein the one or more blades comprises at least two wind turbine blades.

6. The method of claim 1, wherein determining a payload profile of a payload further comprises:
   at least one of scanning or sensing an indicator of the payload to yield the payload profile of the payload.

7. The method of claim 6, wherein the indicator comprises at least one of: (1) a unique code associated with the payload, a portion of the payload, or one or more payload-receiving fixtures associated with the payload; or (2) a parameter of the payload, or a portion of the payload, that is unique to the payload, or the portion of the payload.

8. The method of claim 6, wherein at least one of associating a plurality of payload-receiving fixtures with the payload based on the determined payload profile or securing the payload with respect to the plurality of payload-receiving fixtures is automated to occur in response to the indicator.

9. The method of claim 1, further comprising:
   applying one or more ballasts to the payload in view of the determined payload profile.

10. The method of claim 1, further comprising:
   repeating the actions of claim 1 for multiple payloads for a single cargo aircraft that makes multiple flights to a same location such that the each respective payload can be associated with and secured with respect to the same, or akin, pluralities of payload-receiving fixtures consistently for the multiple flights.

11. The method of claim 1, wherein associating a plurality of payload-receiving fixtures with the payload based on the determined payload profile, securing the payload with respect to the plurality of payload-receiving fixtures occurs, and subsequent loading of the payload onto a cargo aircraft occurs without making an independent determination of the center of gravity of the payload due to the known payload profile.

12. The method of claim 1, wherein the transport vehicle comprises a cargo aircraft.

13. A cargo aircraft, comprising:
a fuselage defining a forward end, an aft end, and an interior cargo bay that spans a majority of a length of the fuselage from the forward end to the aft end;
one or more pre-formed markings formed in the interior cargo bay, the one or more pre-formed markings being located such that the one or more pre-formed markings designate a desired location at which a particular payload is to be secured for flight, the desired location being dependent on a payload profile of the particular payload; and
one or more rails disposed in the interior cargo bay, the one or more rails extending from the forward end to the aft end of the cargo aircraft, the one or more rails being configured to receive the payload such that the payload is moved along the one or more rails to dispose it the desired location within the cargo bay,
wherein at least one rail of the one or more rails includes a kinked portion such that a vertical distance between at least a portion of the at least one rail aft of the kinked portion and a plane defined by an interior bottom contact surface of the interior cargo bay in the forward end of the cargo aircraft that is substantially parallel to a centerline of the forward end of the cargo aircraft is greater than a vertical distance between at least a portion of the at least one rail forward of the kinked portion and the plane defined by the interior bottom contact surface of the interior cargo bay in the forward end of the cargo aircraft.

14. The cargo aircraft of claim 13, wherein the one or more pre-formed markings are configured to allow for similarly configured payloads to be loaded in the interior cargo bay based on the one or more pre-formed markings such that loading of the similarly configured payloads is able to occur without having to make a center of gravity measurement in conjunction with loading the respective payload in the interior cargo bay.

15. The cargo aircraft of claim 13, wherein the one or more pre-formed markings comprise a plurality of measuring marks formed along a length of the interior cargo bay denoting specific locations along the length of the interior cargo bay for placement of a payload.

16. The cargo aircraft of claim 13, wherein at least one rail of the one or more rails extends continuously along an interior bottom contact surface of the cargo bay from the forward end of the cargo aircraft to the aft end of the cargo aircraft.

17. The cargo aircraft of claim 13, wherein at least one rail of the one or more rails further serves as a primary structural beam of the cargo aircraft.

18. The cargo aircraft of claim 13, wherein the interior cargo bay comprises:
a forward bay portion located in the forward end of the cargo aircraft;
an aft bay portion located in the aft end of the cargo aircraft; and
a kinked bay portion disposed between the forward bay portion and the aft bay portion, the kinked bay portion defining a location at which the aft end of the cargo aircraft begins to raise relative to the plane defined by the interior bottom contact surface of the forward end of the interior cargo bay such that an aft-most terminal end of the aft bay portion is disposed above the plane.

19. A cargo aircraft, comprising:
a fuselage defining a forward end, an aft end, and an interior cargo bay that spans a majority of a length of the fuselage from the forward end to the aft end; and
one or more pre-formed markings formed in the interior cargo bay, the one or more pre-formed markings being located such that the one or more pre-formed markings designate a desired location at which a particular payload is to be secured for flight, the desired location being dependent on a payload profile of the particular payload,
wherein the one or more pre-formed markings comprise a plurality of pre-designated payload markings, the plurality of pre-designated payload markings comprising at least one pre-formed marking for each type of payload that the interior cargo bay is configured to receive.

20. The cargo aircraft of claim 19, wherein the one or more pre-formed markings are configured to allow for similarly configured payloads to be loaded in the interior cargo by based on the one or more pre-formed markings such that loading of the similarly configured payloads is able to occur without having to make a center of gravity measurement in conjunction with loading the respective payload in the interior cargo bay.

21. The cargo aircraft of claim 19, wherein the one or more pre-formed markings comprise a plurality of measuring marks formed along a length of the interior cargo bay denoting specific locations along the length of the interior cargo bay for placement of a payload.

22. The cargo aircraft of claim 19, further comprising:
one or more rails disposed in the interior cargo bay, the one or more rails extending from the forward end to the aft end of the cargo aircraft, the one or more rails being configured to receive the payload such that the payload is moved along the one or more rails to dispose it in the desired location within the cargo bay.

23. The cargo aircraft of claim 22, wherein at least one rail of the one or more rails includes a kinked portion such that a vertical distance between at least a portion of the at least one rail aft of the kinked portion and a plane defined by an interior bottom contact surface of the interior cargo bay in the forward end of the cargo aircraft that is substantially parallel to a centerline of the forward end of the cargo aircraft is greater than a vertical distance between at least a portion of the at least one rail forward of the kinked portion and the plane defined by the interior bottom contact surface of the interior cargo bay in the forward end of the cargo aircraft.

24. The cargo aircraft of claim 22, wherein at least one rail of the one or more rails extends continuously along an interior bottom contact surface of the cargo bay from the forward end of the cargo aircraft to the aft end of the cargo aircraft.

25. The cargo aircraft of claim 22, wherein at least one rail of the one or more rails further serves as a primary structural beam of the cargo aircraft.

26. The cargo aircraft of claim 19, wherein the interior cargo bay comprises:
a forward bay portion located in the forward end of the cargo aircraft;
an aft bay portion located in the aft end of the cargo aircraft; and
a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft.

27. The cargo aircraft of claim 19, wherein the payload profile comprises at least one of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of the one or more pre-formed markings to use in conjunction with the payload.

28. The cargo aircraft of claim 19,
wherein the interior cargo bay is configured to have a package that includes one or more blades of a wind turbine disposed therein, and
wherein the payload profile comprises at least one of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of the one or more pre-formed markings to use in conjunction with the package.

29. A system for loading a payload onto a cargo transport, comprising:
a plurality of payload-receiving fixtures each configured to be associated with a payload based on a determined payload profile of the payload and configured to be secured to the payload; and
one or more rails disposed in an interior cargo bay of a cargo transport, wherein one or more pre-formed markings are formed in the interior cargo bay, the one or more pre-formed markings being located such that the one or more pre-formed markings designate a desired location at which the payload is to be secured for flight, the desired location being dependent on the determined payload profile of the payload, wherein the one or more rails extends from a forward bay portion located in a forward end of the cargo aircraft to an aft bay portion located in an aft end of the cargo aircraft, wherein the one or more rails is configured to receive the plurality of payload-receiving fixtures with the payload secured thereto such that the payload is moved along the one or more rails to dispose the payload at the desired location within the cargo bay,
wherein each payload-receiving fixture of the plurality of payload-receiving fixtures includes a support frame, a first payload-receiving recess defined by the support frame, and a second payload-receiving recess defined by the support frame and spaced apart from the first payload-receiving recess,
wherein the first and second payload-receiving recesses each include at least one payload-receiving surface that is complimentary to a surface of the payload such that the payload is configured to rest on the at least one payload-receiving surface.

30. The system of claim 29,
wherein a rail frame extends downwardly away from each rail of the one or more rails, and
wherein the rail frame includes a lower end configured to be one of coupled to or be disposed on an interior bottom contact surface of the interior cargo bay and an upper end disposed opposite of the lower end and configured to receive the plurality of payload-receiving fixtures.

31. The system of claim 30, wherein the rail frame includes a plurality of beams extending between the upper and lower ends that provide structural support to the rail frame.

32. The system of claim 29,
wherein the support frame includes a lower component and a mid-component coupled to the lower component, and
wherein the first payload-receiving recess is defined between the lower component and the mid-component.

33. The system of claim 32, wherein the at least one payload-receiving surface arranged in the first payload-receiving recess is arranged on the lower component.

34. The system of claim 32,
wherein the support frame further includes an upper component arranged above the mid-component, and
wherein the second payload-receiving recess is defined between the mid-component and the upper component.

35. The system of claim 34, wherein the at least one payload-receiving surface arranged in the second payload-receiving recess is arranged on the mid-component.

36. A method of preparing a payload for transport by a transport vehicle, comprising:
determining a payload profile of a payload, wherein the payload comprises a package that includes one or more blades of one or more wind turbines;
associating a plurality of payload-receiving fixtures with the payload based on the determined payload profile;
securing the payload with respect to the plurality of payload-receiving fixtures; and
selecting each payload-receiving fixture of the plurality of payload-receiving fixtures that is coupled to each blade of the one or more blades based on a predetermined profile of the one or more blades, the predetermined profile including a pre-designated style of a respective payload-receiving fixture that is configured to be used with the one or more blades and a pre-designated location that designates one or more locations along the one or more blades that the respective payload-receiving fixture is configured to be used, the pre-designated location being based on the pre-designated style.

37. The method of claim 36, wherein the payload profile comprises at least one of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of a transport vehicle are to use in conjunction with loading the payload onto the transport vehicle.

38. The method of claim 36, wherein the payload profile comprises at least one of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of a transport vehicle to use in conjunction with loading the payload onto the transport vehicle.

39. The method of claim 36, wherein the one or more blades comprises at least two wind turbine blades.

40. The method of claim 36, wherein determining a payload profile of a payload further comprises:
at least one of scanning or sensing an indicator of the payload to yield the payload profile of the payload.

41. The method of claim 40, wherein the indicator comprises at least one of: (1) a unique code associated with the payload, a portion of the payload, or one or more payload-receiving fixtures associated with the payload; or (2) a parameter of the payload, or a portion of the payload, that is unique to the payload, or the portion of the payload.

42. The method of claim 40, wherein at least one of associating a plurality of payload-receiving fixtures with the payload based on the determined payload profile or securing the payload with respect to the plurality of payload-receiving fixtures is automated to occur in response to the indicator.

43. The method of claim 36, further comprising:
applying one or more ballasts to the payload in view of the determined payload profile.

44. The method of claim 36, further comprising:
repeating the actions of claim 36 for multiple payloads for a single cargo aircraft that makes multiple flights to a same location such that the each respective payload can be associated with and secured with respect to the same, or akin, pluralities of payload-receiving fixtures consistently for the multiple flights.

45. The method of claim 36, wherein associating a plurality of payload-receiving fixtures with the payload based on the determined payload profile, securing the payload with respect to the plurality of payload-receiving fixtures occurs, and subsequent loading of the payload onto a cargo aircraft occurs without making an independent determination of the center of gravity of the payload due to the known payload profile.

46. The method of claim 36, wherein the transport vehicle comprises a cargo aircraft.

47. A method of preparing a payload for transport by a transport vehicle, comprising:
determining a payload profile of a payload, wherein the payload comprises a package that includes one or more blades of one or more wind turbines;
associating a plurality of payload-receiving fixtures with the payload based on the determined payload profile;
securing the payload with respect to the plurality of payload-receiving fixtures; and
selecting each payload-receiving fixture of the plurality of payload-receiving fixtures that is coupled to each blade of the one or more blades based on a pre-designation for that payload-receiving fixture that designates one or more locations along each blade of the one or more blades that the respective payload-receiving fixture is configured to be used,
wherein the pre-designation of at least one payload-receiving fixture of the plurality of payload-receiving fixtures includes a designation for a location between a tip and a root of the blade with which the respective payload-receiving fixture is configured to be used.

48. The method of claim 47, wherein the payload profile comprises at least one of: a length of the payload, a width of the payload, a height of the payload, a volume of the payload, a weight of the payload, a density of the payload, a center of gravity of the payload, one or more mass moments of inertia of the payload, information regarding one or more payload-receiving fixtures that are part of the payload, information regarding one or more ballasts to be used in conjunction with the payload, or information regarding which pre-formed marking or markings of a transport vehicle are to use in conjunction with loading the payload onto the transport vehicle.

49. The method of claim 47, wherein the pre-designation for the selected payload-receiving fixture further designates at least one of a type of package in which each payload-receiving fixture is configured to be used, the type of package comprising various configurations of the one or more blades that depend on at least one of dimensions of the one or more blades, shape of the one or more blades, or the payload profile.

50. The method of claim 47, wherein the payload profile comprises at least one of: a number of blades, a length of the package, a width of the package, a height of the package, a volume of the package, a weight of the package, a density of the package, a center of gravity of the package, information regarding one or more payload-receiving fixtures that are part of the package, information regarding one or more ballasts to be used in conjunction with the package, or information regarding which pre-formed marking or markings of a transport vehicle to use in conjunction with loading the payload onto the transport vehicle.

51. The method of claim 47, wherein the one or more blades comprises at least two wind turbine blades.

52. The method of claim 47, wherein determining a payload profile of a payload further comprises:
at least one of scanning or sensing an indicator of the payload to yield the payload profile of the payload.

53. The method of claim 52, wherein the indicator comprises at least one of: (1) a unique code associated with the payload, a portion of the payload, or one or more payload-receiving fixtures associated with the payload; or (2) a parameter of the payload, or a portion of the payload, that is unique to the payload, or the portion of the payload.

54. The method of claim 52, wherein at least one of associating a plurality of payload-receiving fixtures with the payload based on the determined payload profile or securing the payload with respect to the plurality of payload-receiving fixtures is automated to occur in response to the indicator.

55. The method of claim 47, further comprising:
applying one or more ballasts to the payload in view of the determined payload profile.

56. The method of claim 47, further comprising:
repeating the actions of claim 47 for multiple payloads for a single cargo aircraft that makes multiple flights to a same location such that the each respective payload can be associated with and secured with respect to the same, or akin, pluralities of payload-receiving fixtures consistently for the multiple flights.

57. The method of claim 47, wherein associating a plurality of payload-receiving fixtures with the payload based on the determined payload profile, securing the payload with respect to the plurality of payload-receiving fixtures occurs, and subsequent loading of the payload onto a cargo aircraft occurs without making an independent determination of the center of gravity of the payload due to the known payload profile.

58. The method of claim 47, wherein the transport vehicle comprises a cargo aircraft.

* * * * *